(12) United States Patent
Yamaguchi et al.

(10) Patent No.: US 12,532,795 B2
(45) Date of Patent: Jan. 27, 2026

(54) TRAVEL ASSISTANCE SYSTEM FOR AGRICULTURAL MACHINE

(71) Applicant: KUBOTA CORPORATION, Osaka (JP)

(72) Inventors: Kotaro Yamaguchi, Sakai (JP); Yusuke Minakata, Sakai (JP); Shuya Ueda, Sakai (JP); Kuya Kaihori, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 120 days.

(21) Appl. No.: 18/537,164

(22) Filed: Dec. 12, 2023

(65) Prior Publication Data

US 2024/0107931 A1   Apr. 4, 2024

Related U.S. Application Data

(63) Continuation of application No. PCT/JP2022/033093, filed on Sep. 2, 2022.

(30) Foreign Application Priority Data

Sep. 21, 2021 (JP) ................. 2021-153393

(51) Int. Cl.
*A01B 69/04*   (2006.01)
*G05D 1/617*   (2024.01)
(Continued)

(52) U.S. Cl.
CPC ......... *A01B 69/008* (2013.01); *G05D 1/617* (2024.01); *G05D 1/648* (2024.01); *G05D 1/245* (2024.01);
(Continued)

(58) Field of Classification Search
None
See application file for complete search history.

(56) References Cited

U.S. PATENT DOCUMENTS 7,228,214 B2\* 6/2007 Flann ............... G05D 1/0219
701/50
2018/0136664 A1  5/2018 Tomita et al.
(Continued)

FOREIGN PATENT DOCUMENTS

JP  58-217011 A   12/1983
JP  2006-204174 A  8/2006
(Continued)

OTHER PUBLICATIONS

Official Communication issued in International Patent Application No. PCT/JP2022/033093, mailed on Nov. 22, 2022.

*Primary Examiner* — Tamara L Weber
(74) *Attorney, Agent, or Firm* — Keating & Bennett, LLP

(57) ABSTRACT

A travel assistance system for an agricultural machine includes a traveling device included in an agricultural machine, an acquirer to acquire a travel route to be traveled by the agricultural machine and created on a field representing an agricultural field, a corrector to correct the travel route acquired by the acquirer, and a controller configured or programmed to control the traveling device based on the travel route corrected by the corrector. The travel route includes lines connected to each other and the corrector includes a creator to create an auxiliary line extending from an ending portion of a first line of the lines to a starting portion of a second line of the lines connected to the ending portion of the first line, the auxiliary line being inclined relative to the second one of the lines.

18 Claims, 41 Drawing Sheets

(51) Int. Cl.
*G05D 1/648* (2024.01)
*G05D 1/245* (2024.01)
*G05D 1/248* (2024.01)
*G05D 105/15* (2024.01)
*G05D 107/20* (2024.01)

(52) U.S. Cl.
CPC ......... *G05D 1/248* (2024.01); *G05D 2105/15* (2024.01); *G05D 2107/21* (2024.01)

(56) References Cited

U.S. PATENT DOCUMENTS

| | | | |
|---|---|---|---|
| 2021/0405644 A1* | 12/2021 | Berridge | G05D 1/0223 |
| 2023/0104748 A1* | 4/2023 | Appert | G05D 1/221 |
| | | | 701/25 |

FOREIGN PATENT DOCUMENTS

| | | |
|---|---|---|
| JP | 2020-031568 A | 3/2020 |
| WO | 2017/047181 A1 | 3/2017 |

\* cited by examiner

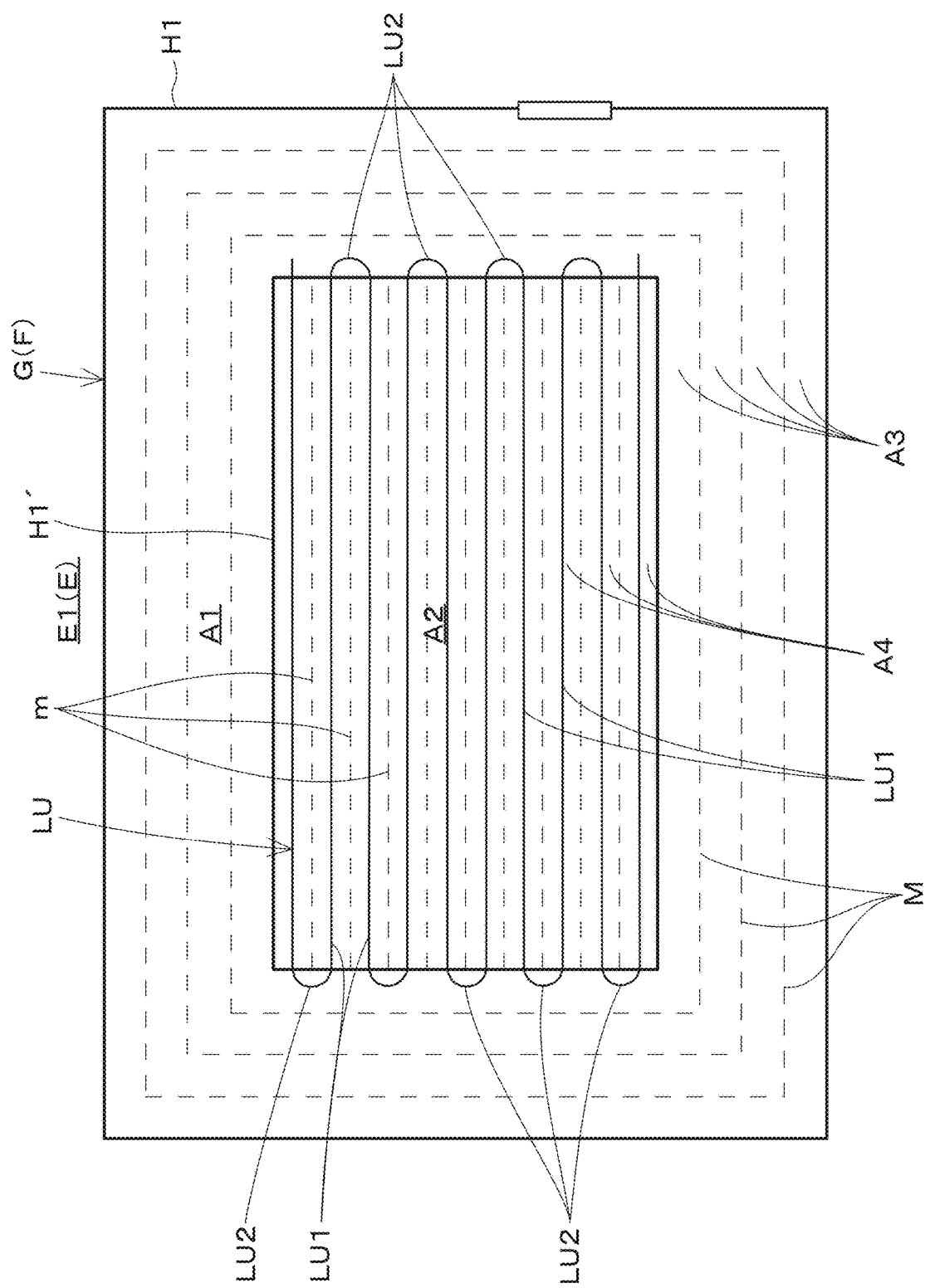

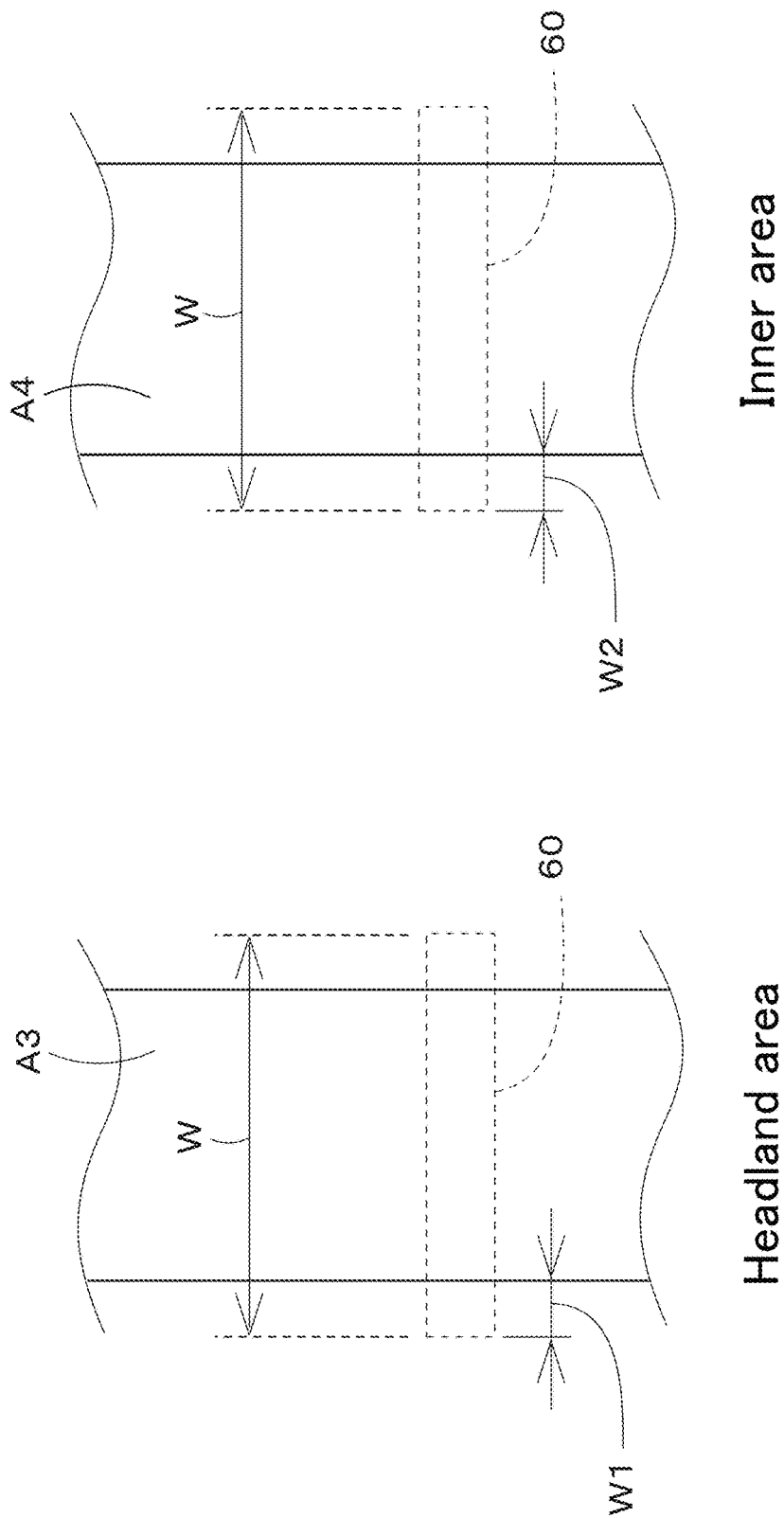

TRAVEL ASSISTANCE SYSTEM FOR AGRICULTURAL MACHINE

CROSS REFERENCE TO RELATED APPLICATIONS

This application is a continuation application of International Application No. PCT/JP2022/033093, filed on Sep. 2, 2022, which claims the benefit of priority to Japanese Patent Application No. 2021-153393, filed on Sep. 21, 2021. The entire contents of each of these applications are hereby incorporated herein by reference.

BACKGROUND OF THE INVENTION

1. Field of the Invention

The present invention relates to a travel assistance system for an agricultural machine such as a tractor.

2. Description of the Related Art

As disclosed in Japanese Unexamined Patent Application Publication No. 2006-204174, when an agricultural machine provided with an agricultural transplanter as a working device performs transplanting work in an agricultural field, the agricultural machine travels back and forth while performing transplanting over the inner area of the agricultural field leaving the headland of the agricultural field unplanted, and then travels in a circumferential direction in the headland while performing transplanting.

SUMMARY OF THE INVENTION

However, when the agricultural machine travels in the circumferential direction in an outer portion of the headland of the agricultural field while performing transplanting, there is an area (off-limits area) where entry is prohibited in advance, such as, an area near a footpath and an area where transplanting work has already been completed (tilled area), and there may not be enough space for the agricultural machine to make a turn. On the other hand, if the agricultural machine terminates the work in the middle of the transplanting to ensure space to make a turn, this may result in generation of a region (unworked region) where the transplanting operation has not been completed.

Example embodiments of the present invention provide travel assistance systems for agricultural machines, which each can prevent or reduce generation of unworked regions and make it possible to perform work efficiently.

A travel assistance system for an agricultural machine according to an aspect of an example embodiment of the present invention includes a traveling device included in an agricultural machine to which a working device is attachable, a first acquirer configured or programmed to acquire a travel route to be traveled by the agricultural machine and created on a field representing an agricultural field, a corrector configured or programmed to correct the travel route acquired by the first acquirer, and a controller configured or programmed to control the traveling device based on the travel route corrected by the corrector, wherein the travel route includes a plurality of lines connected to each other, the corrector is configured or programmed to include a creator configured or programmed to create an auxiliary line extending from an ending portion of a first line of the plurality of lines to a starting portion of a second line of the plurality of lines connected to the ending portion of the first line, the auxiliary line being inclined relative to the second line, and the first acquirer, the corrector, and the creator are defined by any of electrical or electric circuit components or circuitry, the controller or another controller configured or programmed to execute programs, or an external server.

The travel assistance system for an agricultural machine may further include a position detector to detect a position of the agricultural machine. The controller may be configured or programmed to include an automatic-travel controller configured or programmed to control steering and a vehicle speed of the traveling device based on the travel route corrected by the corrector and the position of the agricultural machine detected by the position detector.

The travel assistance system for an agricultural machine may further include a position detector to detect a position of the agricultural machine. The controller may be configured or programmed to include an automatic-steering controller configured or programmed to control steering of the traveling device based on the travel route corrected by the corrector and the position of the agricultural machine detected by the position detector.

A travel assistance system for an agricultural machine according to an aspect of another example embodiment of the present invention includes a first acquirer configured or programmed to acquire a travel route to be traveled by an agricultural machine to which a working device is attachable and created on a field representing an agricultural field, a corrector configured or programmed to correct the travel route acquired by the first acquirer and a display to display the travel route corrected by the corrector; wherein the travel route includes a plurality of lines connected to each other, the corrector is configured or programmed to include a creator configured or programmed to create an auxiliary line extending from an ending portion of a first line of the plurality of lines to a starting portion of a second line of the plurality of lines connected to the ending portion of the first line, the auxiliary line being inclined relative to the second line, and the first acquirer, the corrector, and the creator are defined by any of electrical or electric circuit components or circuitry, the controller or another controller configured or programmed to execute programs, or an external server.

The creator may be configured or programmed to create the auxiliary line such that the auxiliary line is at an acute angle to the second line.

The creator may be configured or programmed to create the auxiliary line such that a starting portion of the auxiliary line intersects the ending portion of the first line and extends straight from the ending portion of the first line and that an ending portion of the auxiliary line curves to extend along the starting portion of the second line. The starting portion of the auxiliary line may be at an acute angle to the second line, and the auxiliary line may be inclined relative to the second line.

The creator may be configured or programmed to create the auxiliary line such that an angle between a starting portion of the auxiliary line and the second line is smaller than an angle between the first line and the second line.

The creator may be configured or programmed to create, when an angle between the first line and the second line is an obtuse angle, the auxiliary line that is inclined such that an angle between a starting portion of the auxiliary line and the second line is smaller than when the angle between the first line and the second line is an acute angle or a right angle.

The travel assistance system for an agricultural machine may further include a second acquirer configured or programmed to acquire specification information of the agricultural machine and/or the working device, and a third acquirer configured or programmed to acquire information of the field. The corrector may be configured or programmed to include a changer configured or programmed to shorten an ending portion of a corresponding one of the plurality of lines based on the specification information acquired by the second acquirer and the information of the field acquired by the third acquirer to prevent the agricultural machine from entering an off-limits area of the field, the off-limits area being an area where the agricultural machine is prohibited from entering. The creator may be configured or programmed to create the auxiliary line such that the auxiliary line extends from the ending portion of the first line shortened by the changer to the starting portion of the second line and is inclined relative to the second line. The second acquirer, the third acquirer, and the changer may be defined by any of electrical or electric circuit components or circuitry, the controller or another controller configured or programmed to execute programs, or an external server.

The travel assistance system for an agricultural machine may further include a definer to define an imaginary first reference position in front of the agricultural machine based on the specification information acquired by the second acquirer. The third acquirer may be configured or programmed to acquire position information of the off-limits area as the information of the field. The changer may be configured or programmed to shorten the ending portion of the corresponding one of the plurality of lines based on the position information of the off-limits area and the first reference position to prevent the first reference position from entering the off-limits area. The definer may be defined by any of electrical or electric circuit components or circuitry, the controller or another controller configured or programmed to execute programs, or an external server.

The definer and the changer may be configured or programmed such that, when an angle between the first line and the second line is an acute angle less than a predetermined angle, the definer defines an imaginary second reference position in front of the first reference position, and the changer shortens the ending portion of the corresponding one of the plurality of lines based on position information of the plurality of lines, the position information of the off-limits area, and the second reference position. An amount by which the corresponding one of the plurality of lines is shortened by the changer based on the second reference position may be greater than an amount by which the corresponding one of the plurality of lines is shortened by the changer based on the first reference position.

The creator may be configured or programmed to, when an amount by which the corresponding one of the plurality of lines is shortened by the changer is equal to or more than a predetermined amount, create a plurality of the auxiliary lines which are adjacent to each other.

The third acquirer may be configured or programmed to acquire, as position information of the off-limits area of the information of the field, position information of a region other than the agricultural field and/or position information of a region of the agricultural field where the working device has performed work.

The creator may be configured or programmed to create the auxiliary line that is inclined such that a starting portion of the auxiliary line is perpendicular or substantially perpendicular to the ending portion of the first line, an intermediate portion of the auxiliary line curves toward the starting portion of the second line, and an ending portion of the auxiliary line curves to extend along the second line.

The creator may be configured or programmed to create the auxiliary line such that, when the agricultural machine is located at a starting portion of the auxiliary line, a working range of the working device and a starting portion of a unit work section in which the working device performs work along the second line overlap each other.

The travel assistance system for an agricultural machine may further include a route creator configured or programmed to define the plurality of lines on the field to create the travel route. The route creator may be configured or programmed to create the first line and the second line such that an ending portion of a unit work section in which the working device performs work along the first line coincides with or overlaps a starting portion of a unit work section in which the working device performs work along the second line. The route creator may be defined by any of electrical or electric circuit components or circuitry, the controller or another controller configured or programmed to execute programs, or an external server.

The travel assistance system for an agricultural machine may further include a route creator configured or programmed to define the plurality of lines on the field to create the travel route. The route creator may be configured or programmed to create the travel route along which the agricultural machine is to travel in the agricultural field in a predetermined circumferential direction. A starting portion of each of the plurality of lines may be connected to an ending portion of an adjacent one of the plurality of lines included in the same loop of the travel route to obtain the travel route with a plurality of loops. The route creator may be defined by any of electrical or electric circuit components or circuitry, the controller or another controller configured or programmed to execute programs, or an external server.

The route creator may be configured or programmed to create the travel route such that the agricultural machine travels inner loops of the plurality of loops first.

The above and other elements, features, steps, characteristics and advantages of the present invention will become more apparent from the following detailed description of the example embodiments with reference to the attached drawings.

BRIEF DESCRIPTION OF THE DRAWINGS

A more complete appreciation of example embodiments of the present invention and many of the attendant advantages thereof will be readily obtained as the same becomes better understood by reference to the following detailed description when considered in connection with the accompanying drawings described below.

FIG. 6A illustrates travel lines, unit work sections and the like.

FIG. 6B illustrates inner lines and the like.

FIG. 7 illustrates unit work sections different from FIG. 6A.

FIG. 9 illustrates reference positions, a working range, and the like.

FIG. 16 illustrates the positional relationship between a working range, a first auxiliary work section, an unworked region, and the like.

DETAILED DESCRIPTION OF THE EXAMPLE EMBODIMENTS

Figure 1:
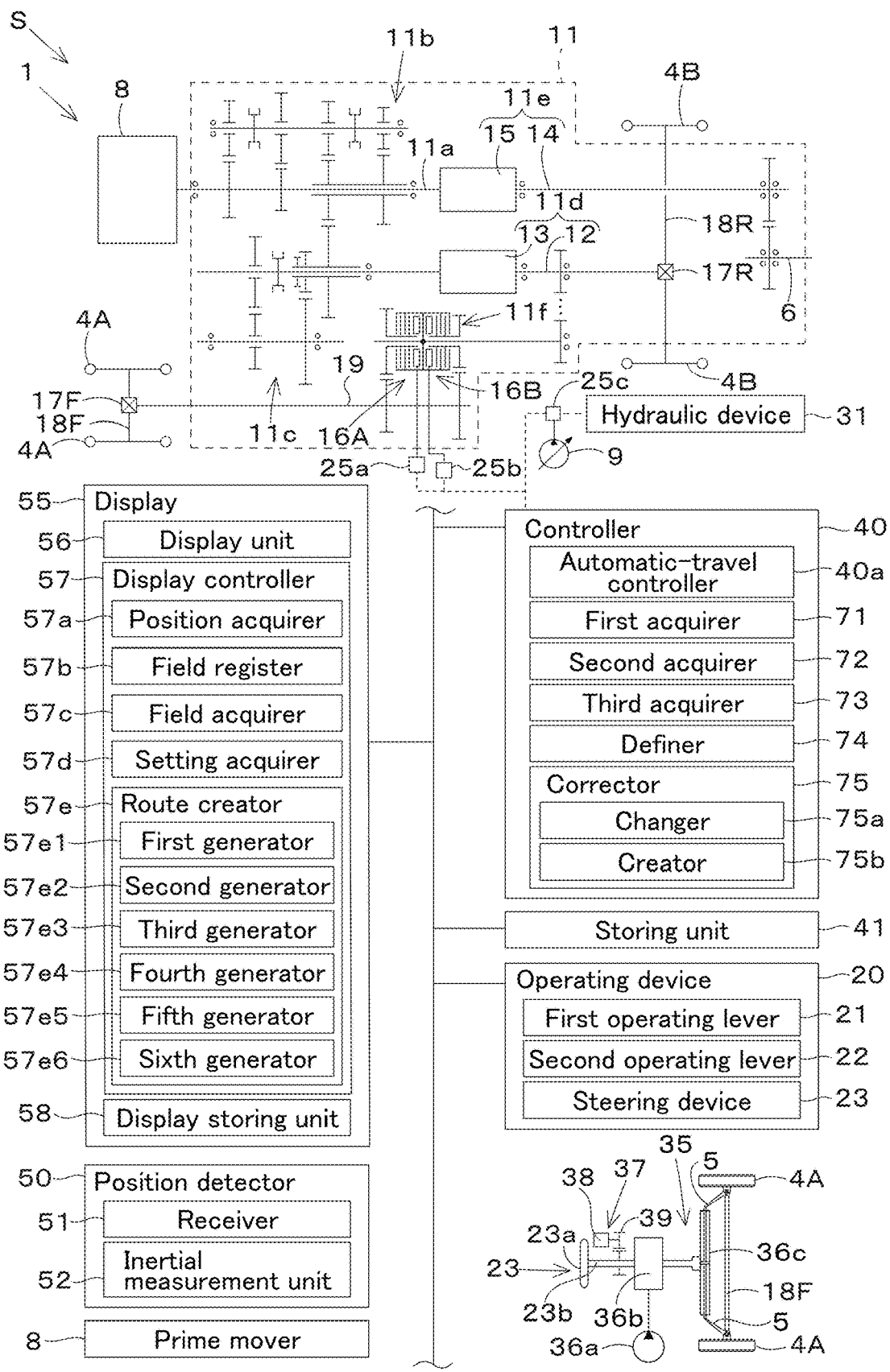
FIG. 1 shows a block diagram of an agricultural machine according to a first example embodiment.

The example embodiments will now be described with reference to the accompanying drawings, wherein like reference numerals designate corresponding or identical elements throughout the various drawings. The drawings are to be viewed in an orientation in which the reference numerals are viewed correctly.

The following description discusses example embodiments of the present invention with reference to the drawings.

First Example Embodiment

FIG. 1 shows an example embodiment of a travel assistance system S for an agricultural machine 1. The travel assistance system S for an agricultural machine 1 is a system to support the travel and work of an agricultural machine 1, and is a system that can prevent or reduce the generation of unworked regions Ed and make it possible to perform work efficiently.

Figure 25:
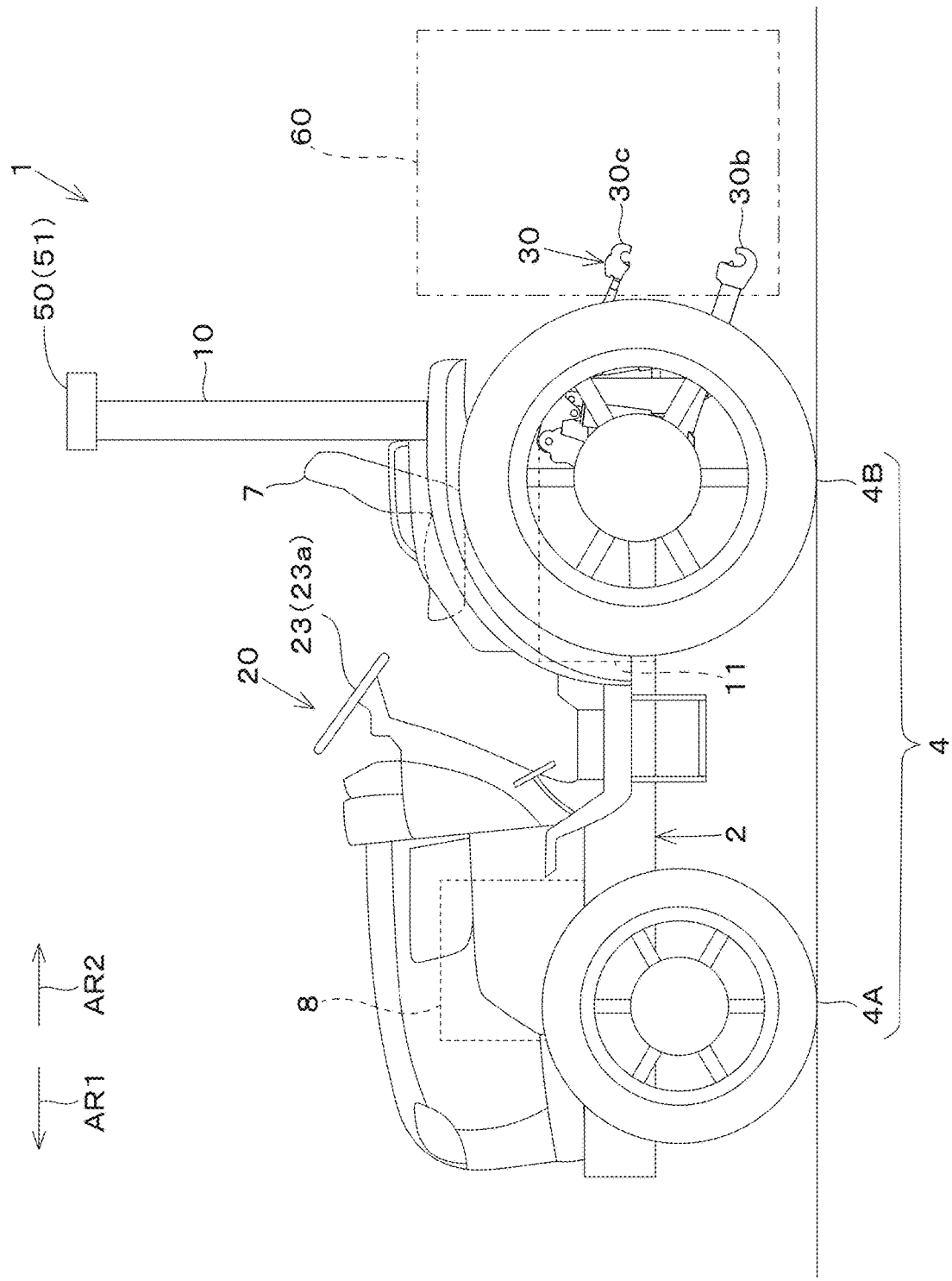
FIG. 25 is a side view of an agricultural machine.

As shown in FIG. 25, in the case of the present example embodiment, the agricultural machine 1 is a tractor with a working device 60 attached. Note that the agricultural machine 1 is not limited to a tractor, provided that the agricultural machine 1 can be equipped with a working device 60. Examples include a rice transplanter and a combine. For convenience of description, the following description discusses a case where the agricultural machine 1 is a tractor, for example. The front side of the operator (driver) seated in an operator's seat 7 of the agricultural machine 1 (direction indicated by arrow AR1 in FIG. 25) is referred to as front, the rear side of the operator (direction indicated by arrow AR2 in FIG. 25) is referred to as rear, the left side of the operator (near side in FIG. 25) is referred to as left, and the right side of the operator (far side in FIG. 25) is referred to as right. A horizontal direction that is perpendicular or substantially perpendicular to the front-back direction of the agricultural machine 1 is referred to as the width direction.

As shown in FIGS. 1 and 25, the agricultural machine 1 includes a vehicle body 2, a prime mover 8, a first hydraulic pump 9, a transmission 11, and a linkage 30. The vehicle body 2 includes a traveling device 4 and is capable of traveling. The traveling device 4 includes front wheels 4A and rear wheels 4B. The front wheels 4A and the rear wheels 4B may be of the tire type or of the crawler type.

As shown in FIG. 1, the front wheels 4A are connected by an arm (knuckle arms) 5 that changes the orientation of the front wheels 4A. The vehicle body 2 can perform straight travel in which the vehicle body 2 travels straight and perform turning travel in which the vehicle body 2 turns, by causing the knuckle arms 5 to change the orientation of the front wheels 4A. In other words, the agricultural machine 1 can perform a multi-point turn by combining several turning travels, i.e., by traveling forward while orienting the front wheel 4A to one of the opposite sides in the width direction and traveling backward while orienting the front wheels 4A to the other of the opposite sides in the width direction. Note that the vehicle body 2 need only be capable of performing straight travel and turning travel, and may be configured to perform straight travel and turning travel by changing the rotation speed of the front wheel 4A and the rear wheel 4B on one side (left side) and the rotation speed of the front wheel 4A and the rear wheel 4B on the other side (right side) instead of, or in addition to, the above configuration.

The vehicle body 2 includes a PTO shaft 6 through which power from the prime mover 8 is outputted and the operator's seat 7 where the operator is seated.

The prime mover 8 includes a diesel engine, an electric motor, and/or the like, which in the present example embodiment includes a diesel engine, for example. The transmission 11 can change the driving force of the traveling device 4 by changing speed stages and can also switch forward and backward travels of the traveling device 4. The first hydraulic pump 9 is a device provided in the vehicle body 2 and delivers hydraulic fluid. The first hydraulic pump 9 is connected to the prime mover 8, for example, and delivers hydraulic fluid by the power outputted from the prime mover 8.

The linkage 30 is swingably provided on the vehicle body 2 and connects the working device 60 to the vehicle body 2. Specifically, the linkage 30 is located at the rear of the vehicle body 2. The linkage 30 can be swung by a hydraulic device 31, which is driven by hydraulic fluid delivered by the first hydraulic pump 9. The working device 60 can be attached to and detached from the rear of the linkage 30. The linkage 30, by linking the working device 60, allows the vehicle body 2 to tow the working device 60.

The working device 60 is attachable to the vehicle body 2. In the case where the agricultural machine 1 is a tractor, the working device 60 is connected to the vehicle body 2 via the linkage 30. The working device 60 may be actuated by power inputted from an external source, e.g., from PTO shaft 6. Alternatively, the working device 60 may include a hydraulic device (not shown) driven by hydraulic fluid delivered by the first hydraulic pump 9, and may be actuated by the hydraulic device. The working device 60 may be a cultivator which performs cultivation, a ridger to make ridges, a fertilizer spreader to spread fertilizer, an agricultural chemical spreader to spread agricultural chemicals for pest control, a seed spreader for seeding, a transplanter to plant crops (seedlings), a harvester to harvest crops, a mower to mow grass or the like, a tedder to ted grass or the like, a rake to rake grass or the like, a baler to bale grass or the like, or the like. That is, with the linkage 30, it is possible to select one of the various types of working devices 60 as described above and connect it to the vehicle body 2.

Note that, for convenience of description, the following description discusses an example case in which the widthwise center of the working device 60 and the widthwise center of the agricultural machine 1 are aligned with each other in the width direction, and excludes the cases in which the widthwise center of the working device 60 and the widthwise center of the agricultural machine 1 are misaligned (offset) in the width direction. Note, however, that example embodiments of the present invention are also applicable to cases where the widthwise center of the working device 60 and the widthwise center of the agricultural machine 1 are misaligned (offset) in the width direction. Example embodiments of the present invention are applicable by, for example, changing the position of the agricultural machine 1 (vehicle body position VP) as appropriate in the steps performed by the controller 40 and/or the like (described later).

The transmission 11 is described in detail below. As shown in FIG. 1, the transmission 11 includes a main shaft (propeller shaft) 11a, a main transmission portion 11b, an auxiliary transmission portion 11c, a shuttle portion 11d, a PTO power transmitting portion 11e, and a front transmission portion 11f. The propeller shaft 11a is rotatably supported by a housing case (transmission case) of the transmission 11, and the power from the crankshaft of the prime mover 8 is transmitted to the propeller shaft 11a. The main transmission portion 11b includes a plurality of gears and a shifter that changes the connection of the gears. The main transmission portion 11b changes the rotation inputted from the propeller shaft 11a outputs it (changes speed stages) by changing the connection (mesh) of the gears via a shifter as appropriate.

The auxiliary transmission portion 11c, similarly to the main transmission portion 11b, includes a plurality of gears and a shifter that changes the connection of the gears. The auxiliary transmission portion 11c changes the rotation inputted from the main transmission portion 11b and outputs it (changes speed stages) by changing the connection (mesh) of the gears via a shifter as appropriate.

The shuttle portion 11d includes a shuttle shaft 12 and a reverser 13. The power outputted from the auxiliary transmission portion 11c is transmitted to the shuttle shaft 12 via gear(s) and/or the like. The reverser 13 includes, for example, a hydraulic clutch, and switches the direction of rotation of the shuttle shaft 12, i.e., forward and backward travels of the agricultural machine 1, by engaging or disengaging the hydraulic clutch. The shuttle shaft 12 is connected to a rear wheel differential 17R. The rear wheel differential 17R rotatably supports a rear axle 18R on which the rear wheels 4B are attached.

The PTO power transmitting portion 11e includes a PTO propeller shaft 14 and a PTO clutch 15. The PTO propeller shaft 14 is rotatably supported and can receive power from the propeller shaft 11a. The PTO propeller shaft 14 is connected to the PTO shaft 6 via gear(s) and/or the like. The PTO clutch 15 includes, for example, a hydraulic clutch. The PTO clutch 15 is switched between a state in which the power from the propeller shaft 11a is transmitted to the PTO propeller shaft 14 and a state in which the power from the propeller shaft 11a is not transmitted to the PTO propeller shaft 14, by engaging or disengaging the hydraulic clutch.

The front transmission portion 11f includes a first clutch 16A and a second clutch 16B. The first clutch 16A and the second clutch 16B can receive power from the propeller shaft 11a, for example, receive power from the shuttle shaft 12 via gear(s) and transmission shaft(s). Power from the first clutch 16A and the second clutch 16B can be transmitted to a front axle 18F via the front transmission shaft 19. Specifically, the front transmission shaft 19 is connected to a front wheel differential 17F, which rotatably supports the front axle 18F on which the front wheels 4A are attached.

The first clutch 16A and the second clutch 16B include hydraulic clutches, for example. A fluid passage is connected to the first clutch 16A, and is connected to a first actuation valve 25a which is supplied with hydraulic fluid delivered by the first hydraulic pump 9. The first clutch 16A is switched between the engaged and disengaged states depending on the opening of the first actuation valve 25a. A fluid passage is connected to the second clutch 16B, and is connected to a second actuation valve 25b. The second clutch 16B is switched between the engaged and disengaged states depending on the opening of the second actuation valve 25b. The first actuation valve 25a and the second actuation valve 25b are each, for example, a two-way switching valve with a solenoid valve, which switches between the engaged and disengaged states by energizing or deenergizing the solenoid of the solenoid valve.

If the clutch 16A is in the disengaged state and the clutch 16B is in the engaged state, the power from the shuttle shaft 12 is transmitted to the front wheels 4A through the clutch 16B. With this, the front wheels 4A and the rear wheels 4B are driven by power (four-wheel drive (4WD) and the front wheels 4A and the rear wheels 4B have approximately the same rotational speed (4WD equal speed state). On the other hand, if the clutch 16A is in the engaged state and the clutch 16B is in the disengaged state, four-wheel drive is achieved and the rotation speed of the front wheels 4A is higher than that of the rear wheels 4B (4WD speed-increasing state). When the clutch 16A and the clutch 16B are in the disengaged state, the power from the shuttle shaft 12 is not transmitted to the front wheels 4A, resulting in a two-wheel drive (2WD) in which the rear wheels 4B are driven by power.

As shown in FIG. 1, the agricultural machine 1 includes an operating unit 20 to operate the agricultural machine 1. The operating unit 20 is located in the vicinity of the operator's seat 7 and is configured to operate the prime mover 8, the transmission 11, the traveling device 4, and/or the like. The operating unit 20 includes, for example, a first operating lever 21, a second operating lever 22, and a steering device 23. The first operating lever 21 and the second operating lever 22 can be held by the operator to pivot. The first operating lever 21 can be used to control the raising/lowering of the linkage 30, and the second operating lever 22 can be used to operate the working device 60 connected to the linkage 30.

The steering device 23 can be used to perform manual steering of the vehicle body 2 (operated by the operator to steer the vehicle body 2), and can be used to operate the vehicle body 2 to travel straight and turn. As shown in FIG. 25, the steering device 23 is located in front of the operator's seat 7. As shown in FIG. 1, the steering device 23 includes a steering handle (steering wheel) 23a and a steering shaft (rotary shaft) 23b that rotatably supports the steering wheel 23a. The steering device 23 includes an assist mechanism (power steering system) 35. The assist mechanism 35 assists in the rotation of the steering shaft 23b (steering wheel 23a) using hydraulic pressure and/or the like. The assist mechanism 35 includes a second hydraulic pump 36a, an auxiliary control valve 36b to be supplied with hydraulic fluid delivered by the second hydraulic pump 36a, and a steering cylinder 36c to be actuated by the auxiliary control valve 36b. The auxiliary control valve 36b is a three-way switching valve that can be switched by the movement of, for example, a spool, and is switched according to the steering direction (direction of rotation) of the steering shaft 23b. The steering cylinder 36c is connected to knuckle arms 5 which change the orientation of the front wheels 4A.

Therefore, when the operator holds and operates the steering wheel 23a, the switching position and the opening of the auxiliary control valve 36b change according to the direction of rotation of the steering wheel 23A, and the steering cylinder 36c extends or retracts to the left or right according to the switching position and the opening of the auxiliary control valve 36b, thus changing the steering direction of the front wheels 4A. In other words, it is possible to change the direction of travel of the vehicle body 2 to the left or right by manual steering using the steering wheel 23a.

Figure 2:
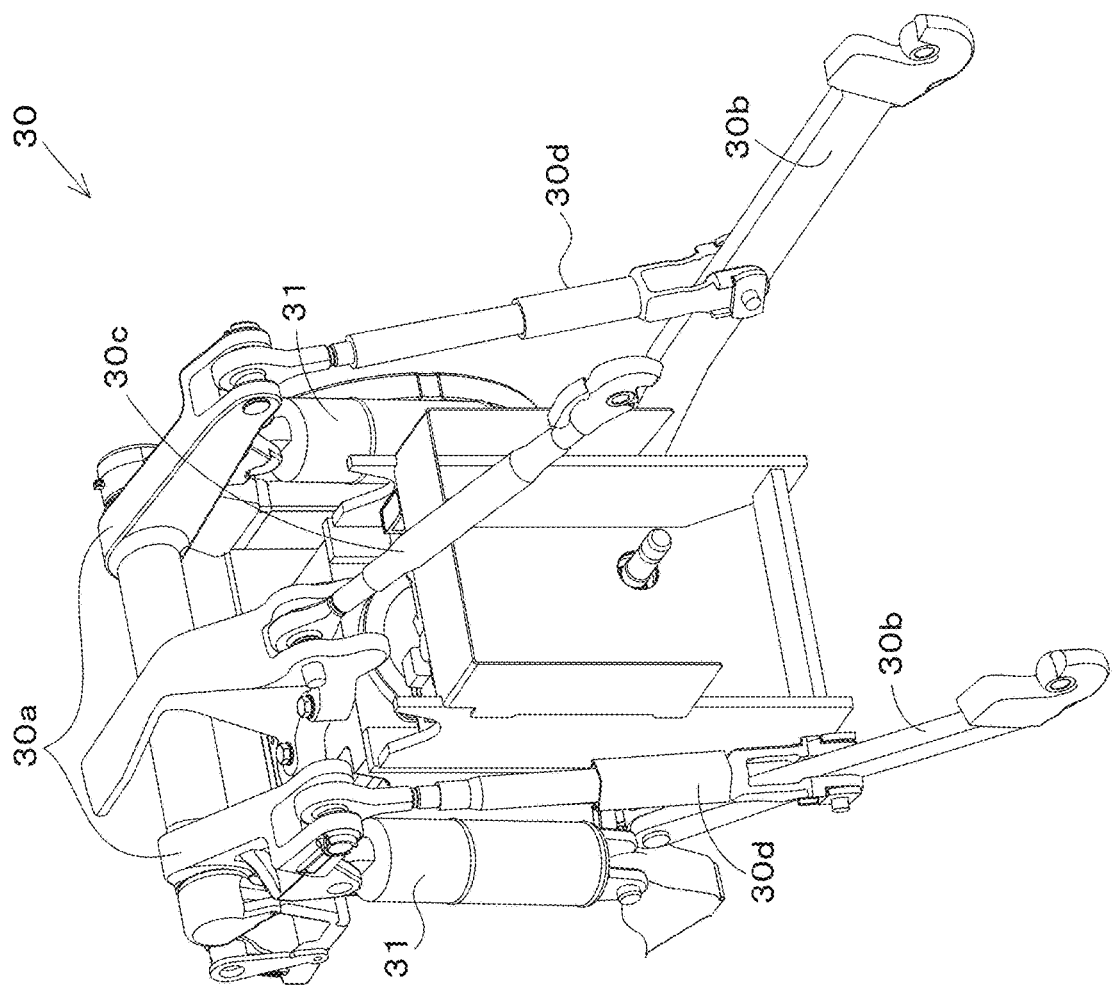
FIG. 2 illustrates a linkage.

As shown in FIG. 2, the linkage 30 includes lift arm(s) 30a, lower link(s) 30b, a top link 30c, lift rod(s) 30d, and lift cylinder(s) 31. The front end of each lift arm 30a is supported by the upper rear portion of the case (transmission case) that houses the transmission 11 such that the lift arm 30a is swingable upward and downward. Each lift arm 30a swings (ascends and descends) by driving a corresponding lift cylinder 31. Each lift cylinder 31 is a hydraulic device including a hydraulic cylinder. The lift cylinder 31 is connected to a first hydraulic pump 9 via a control valve 25c. The control valve 25c is a solenoid valve, etc., which changes the opening to change the flow rate of hydraulic fluid to cause the lift cylinders 31 to extend or retract.

The front end of each lower link 30b is supported by the lower rear portion of the transmission 11 such that the lower link 30b is swingable upward and downward. The front end of the top link 30c is supported, at a location higher than the lower link(s) 30b, on the rear of the transmission 11 such that the top link 30c is swingable upward and downward. Each lift rod 30d connects a corresponding lift arm 30a and a corresponding lower link 30b. The working device 60 is connected to the rear of the lower link(s) 30b and the top link 30c. When the lift cylinder(s) 31 is driven (extends or retracts), the lift arm(s) 30a is raised or lowered, and the lower link(s) 30b connected to the lift arm(s) 30a via the lift rod(s) 30d is raised or lowered. With this, the linkage 30 can switch between a non-working state in which the working device 60 is swung up about the front of the lower link(s) 30b and a working state in which the working device 60 is swung downward about the front of the lower link(s) 30b. The non-working state is the state in which the linkage 30 has raised the working device 60 and the working device 60 is not working. The working state is the state in which the linkage 30 has lowered the working device 60 and the working device 60 is working.

As shown in FIG. 1, the travel assistance system S for the agricultural machine 1 includes a controller 40 and a storing unit (storage and/or memory) 41. The controller 40 and the storing unit 41 are provided in the agricultural machine 1. The controller 40 includes electrical/electronic circuit(s), program(s) stored in a CPU, and/or the like. The controller 40 is configured or programmed to control various devices of the agricultural machine 1. Specifically, the controller 40 can be configured or programmed to control hydraulic device(s) (lift cylinder(s)) 31, control the working device 60, and change the output of the first hydraulic pump 9, etc. The storing unit 41 includes a non-volatile memory and/or the like, which stores various information and/or the like related to the control by the controller 40. Specifically, for example, the controller 40 is configured or programmed to change the opening of the control valve 25c to change the flow rate of hydraulic fluid supplied to the lift cylinder(s) 31 using program(s) and/or the like stored in the storing unit 41, to cause the lift cylinder(s) 31 to extend or retract. Thus, the controller 40 is configured or programmed to control the extension/retraction of the lift cylinder(s) (hydraulic device) 31, making it possible to switch the linkage 30 between the working and non-working states.

As shown in FIGS. 1 and 25, the travel assistance system S for the agricultural machine 1 includes a position detector (positioning device) 50. The position detector 50 can detect its own position (measured position information including latitude and longitude) using a satellite positioning system (positioning satellite(s)) such as D-GPS, GPS, GLONASS, Beidou, Galileo, MICHIBIKI, etc. That is, the position detector 50 receives satellite signal(s) (e.g., position(s) of positioning satellite(s), time of transmission, correction information, etc.) transmitted from positioning satellite(s) and detects the position of the agricultural machine 1 (e.g., latitude and longitude), i.e., vehicle body position VP, based on the satellite signal(s). Note that in the present example embodiment, the vehicle body position VP is calculated such that the vehicle body position VP coincides with the position of the position detector (positioning device) 50 detected by the position detector (positioning device) 50, which may be, for example, the center, the front end, the rear end, or any other location on the agricultural machine 1.

As shown in FIG. 1, the position detector 50 includes a receiver 51 and an inertial measurement unit (IMU) 52. The receiver 51 is a device that includes an antenna, etc., and receives satellite signals transmitted from positioning satellites. The receiver 51 is attached to the agricultural machine 1 separately from the inertial measurement unit 52. As shown in FIG. 25, in the present example embodiment, the receiver 51 is attached to the top of a ROPS 10 on the vehicle body 2. Note that the location of the receiver 51 is not limited to the above location, but may be in the center of a hood, or may be, if a protection structure such as a cabin is provided on the vehicle body 2, an upper portion of the protection structure.

The inertial measurement unit 52 includes an acceleration sensor to detect acceleration, a gyroscope sensor to detect angular velocity, and/or the like. The inertial measurement unit 52 is located in or on the agricultural machine 1, for example, located below the operator's seat 7, and is capable of detecting the roll angle, pitch angle, yaw angle, etc. of the agricultural machine 1.

Note that in the example embodiment described above, the case where the agricultural machine 1 includes the position detector 50 is discussed as an example. However, the travel assistance system S for the agricultural machine 1 need only include the position detector 50 to detect the position of the agricultural machine 1 (vehicle body position VP), and the position detector 50 does not need to be provided on the agricultural machine 1. That is, the position detector 50 may be, for example, a position detector included in a portable terminal such as a smartphone (multi-function cell phone), a tablet device, or the like carried by the operator seated on the operator's seat 7.

As shown in FIG. 1, the steering device 23 includes an automatic steering mechanism 37. The automatic steering mechanism 37 performs automatic steering of the vehicle body 2. The automatic steering mechanism 37 includes a steering motor 38 and a gear mechanism 39. The steering motor 38 is a motor whose direction of rotation, rotation speed, and rotation angle etc. can be controlled. The gear mechanism 39 includes a gear on the steering shaft 23b that rotates with the steering shaft 23b and a gear on the rotary shaft of the steering motor 38 that rotates with the rotary shaft. As the rotary shaft of the steering motor 38 rotates, the steering shaft 23b automatically rotates (turns) through the gear mechanism 39 to change the steering direction of the front wheels 4A.

As shown in FIG. 1, the controller 40 is configured or programmed to include an automatic-travel controller 40a to control the automatic travel of the agricultural machine 1. The automatic-travel controller 40a includes electrical/electronic circuit(s) in the controller 40, program(s) stored in a CPU, and/or the like. When the automatic-travel controller 40a starts the automatic travel, the automatic-travel controller 40a controls the steering motor 38 of the automatic steering mechanism 37 such that the agricultural machine 1 travels along a predetermined travel route L. Furthermore, when the automatic-travel controller 40a starts the automatic travel, the automatic-travel controller 40a controls the vehicle speed (travel speed) of the agricultural machine 1 by automatically changing the speed stage of the transmission 11, the rotation speed of the prime mover 8, and/or the like.

When the automatic-travel controller 40a starts the automatic travel, the automatic-travel controller 40a controls different travel speeds for when the agricultural machine 1 travels straight and for when the agricultural machine 1 turns. For example, when the agricultural machine 1 travels straight, the automatic-travel controller 40a sets the travel speed to speed $\alpha$. On the other hand, when the agricultural machine 1 turns, the automatic-travel controller 40a sets the travel speed to speed $\beta$ which is slower than the speed $\alpha$ ($\beta<\alpha$). Note that the automatic-travel controller 40a may divide a straight portion of a travel route L into a plurality of sections and set different travel speeds for the respective sections. The control of travel speed is not limited to the above configuration.

Figure 3:
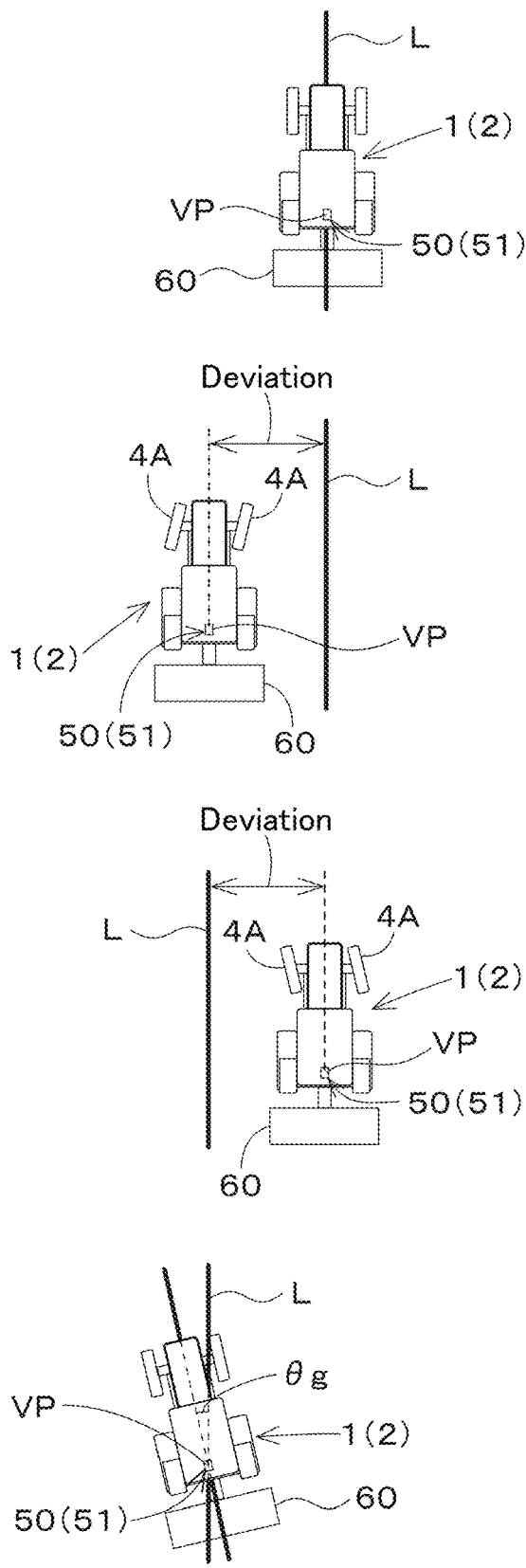
FIG. 3 illustrates automatic travel.

The control of the automatic steering mechanism 37 by the automatic-travel controller 40a is described below. If the deviation of the position of the agricultural machine 1 (vehicle body position VP) from the travel route L is less than a specified value as shown in the upper portion of FIG. 3, the automatic-travel controller 40a maintains the rotation angle of the rotary shaft of steering motor 38. If the deviation of the vehicle body position VP from the travel route L is equal to or greater than the specified value and the agricultural machine 1 is located leftward of the travel route L, the automatic-travel controller 40a rotates the rotary shaft of the steering motor 38 so that the agricultural machine 1 is steered right. If the deviation of the vehicle body position VP from the travel route L is equal to or greater than the specified value and the agricultural machine 1 is located rightward of the travel route L, the automatic-travel controller 40a rotates the rotary shaft of steering motor 38 so the agricultural machine 1 is steered left.

Note that, in the above example embodiment, the steering angle of the steering device 23 is changed based on the deviation of the position of the agricultural machine 1 (vehicle body position VP) from the travel route L. As shown in the lower portion of FIG. 3, when the orientation of the travel route L and the orientation of the agricultural machine 1 (vehicle body 2) in the direction of travel (orientation of the vehicle body 2) are different, that is, if the angle $\theta g$ of the orientation of the vehicle body 2 relative to the travel route L is equal to or greater than a specified value, the automatic-travel controller 40a may set the steering angle so that the angle $\theta g$ is zero (the orientation of the vehicle body 2 matches the orientation of travel route L).

The automatic-travel controller 40a may set the final steering angle for automatic steering based on the steering angle determined based on the deviation (position deviation) and the steering angle determined based on the orientation (orientation deviation). The setting of the steering angle for automatic steering in the above example embodiment is merely an example, and does not imply any limitation.

As shown in FIG. 1, the travel assistance system S for the agricultural machine 1 includes a display 55. The display 55 is communicatively connected to the controller 40 to display various information about the agricultural machine 1 to assist in travel and work performed by the agricultural machine 1. In the present example embodiment, the display 55 is a travel assistance apparatus located in the vicinity of, for example, the operator's seat 7. The display 55 is communicatively connected to device(s) in or on the agricultural machine 1 in a wired or wireless manner, and can transmit and receive information to and from the device(s). Specifically, for example, a display controller 57 of the display 55 and the controller 40 of the agricultural machine 1 are connected communicably.

As shown in FIG. 1, the display 55 includes a display unit 56, a display controller 57, and a display storing unit (storage and/or memory) 58. The display unit 56 includes a liquid crystal panel, a touchscreen, or some other panel, and can display a variety of information to assist the agricultural machine 1 in traveling and working, such as a field F representing an agricultural field G. The display unit 56 can display various information about the agricultural machine 1 and the working device 60 as well as information to assist the agricultural machine 1 in traveling.

The display controller 57 includes electrical/electronic circuit component(s) or circuitry in the display 55, program(s) stored in the display storing unit 58 described later, and/or the like. The display controller 57 is configured or programmed to cause the display unit 56 to display a screen which visualizes information stored in the display storing unit 58.

The display storing unit 58 includes a non-volatile memory and/or the like and stores various information about the agricultural machine 1 and the working device 60.

Note that, in the example embodiment described above, the display 55 is a travel assistance apparatus located in the vicinity of the operator's seat 7. However, the display 55 need only include the display unit 56, the display controller 57, and the display storing unit 58. The display 55 may be a computer such as a personal computer (PC), a smartphone (multi-function cell phone), or a tablet terminal.

As shown in FIG. 1, the travel assistance system S for the agricultural machine 1 includes a position acquirer 57a, a field register 57b, and a field acquirer 57c. In the present example embodiment, the position acquirer 57a, the field register 57b, and the field acquirer 57c include electrical/electronic circuit component(s) or circuitry, program(s) stored in the display 55, and/or the like. The display controller 57 of the display 55 may also be configured or programmed to function as the position acquirer 57a, the field register 57b, and the field acquirer 57c. Note that in the present example embodiment, although the display controller 57 of the display 55 may be configured or programmed to also function as the position acquirer 57a, the field register 57b, and the field acquirer 57c, the position acquirer 57a, the field register 57b, and the field acquirer 57c may be included in the controller 40 or in an external server or the like communicably connected to the controller 40 or the display controller 57. The configuration is not limited to the above configuration.

The position acquirer 57a acquires a plurality of measured points when the agricultural machine 1 travels in a circumferential direction in the agricultural field G. Specifically, in the present example embodiment, the position acquirer 57a acquires the positions of the agricultural machine 1 (vehicle body positions VP) detected by the position detector 50 as a plurality of measured points. The position acquirer 57a acquires data expressed in position (latitude and longitude) and/or data expressed in a coordinate (X-axis and Y-axis) system, of the plurality of measured points VP.

Note that the position acquirer 57a need only be capable of acquiring multiple measured points. The position acquirer 57a may be configured to connect the display 55 and a memory device such as a memory that stores position information of multiple measured points in advance and acquire the position information of the multiple measured points from the memory device. The method of acquiring measured points is not limited to the methods described above.

Figure 4:
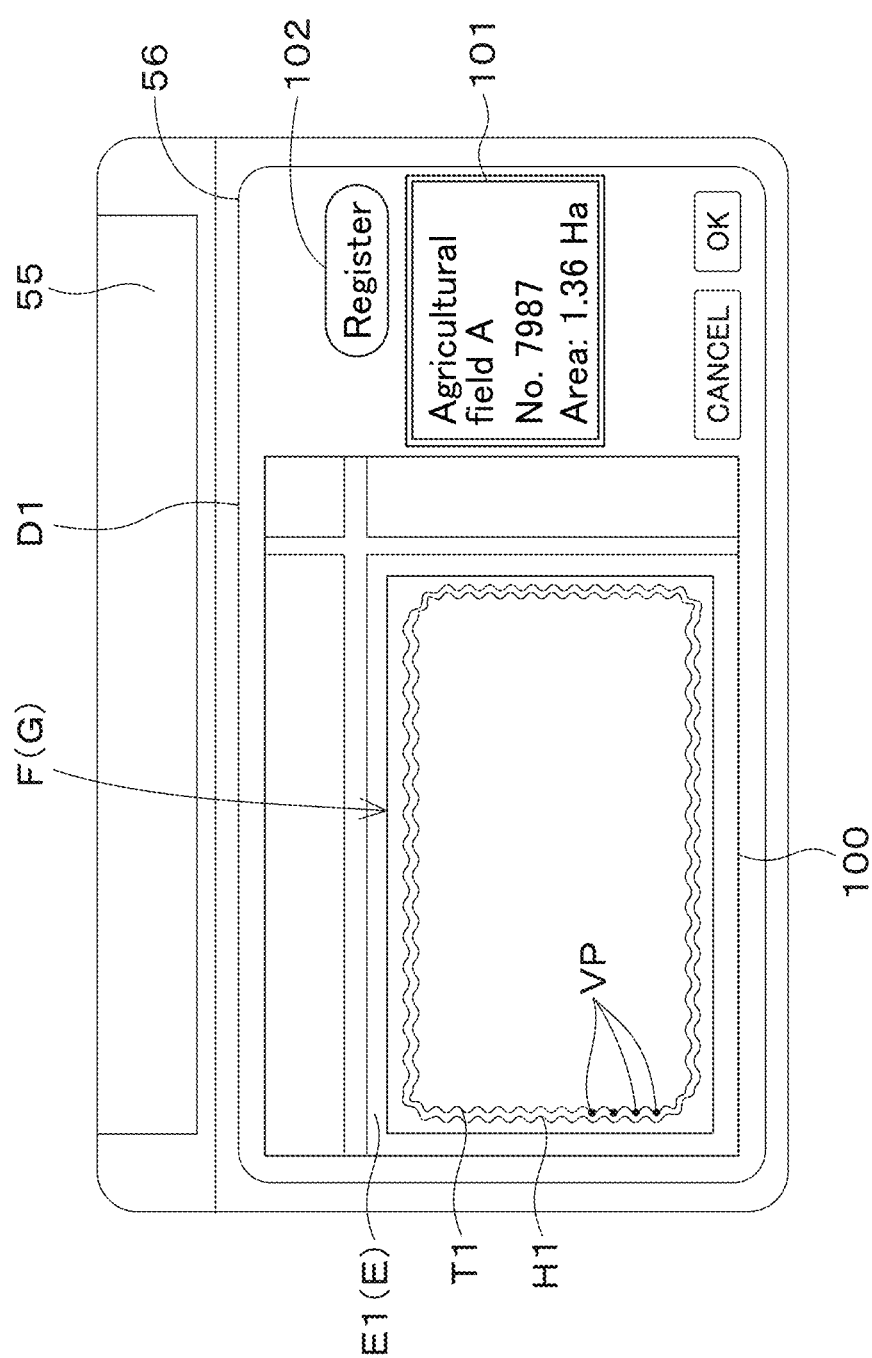
FIG. 4 shows an example of a field registration screen.
Figure 6A:
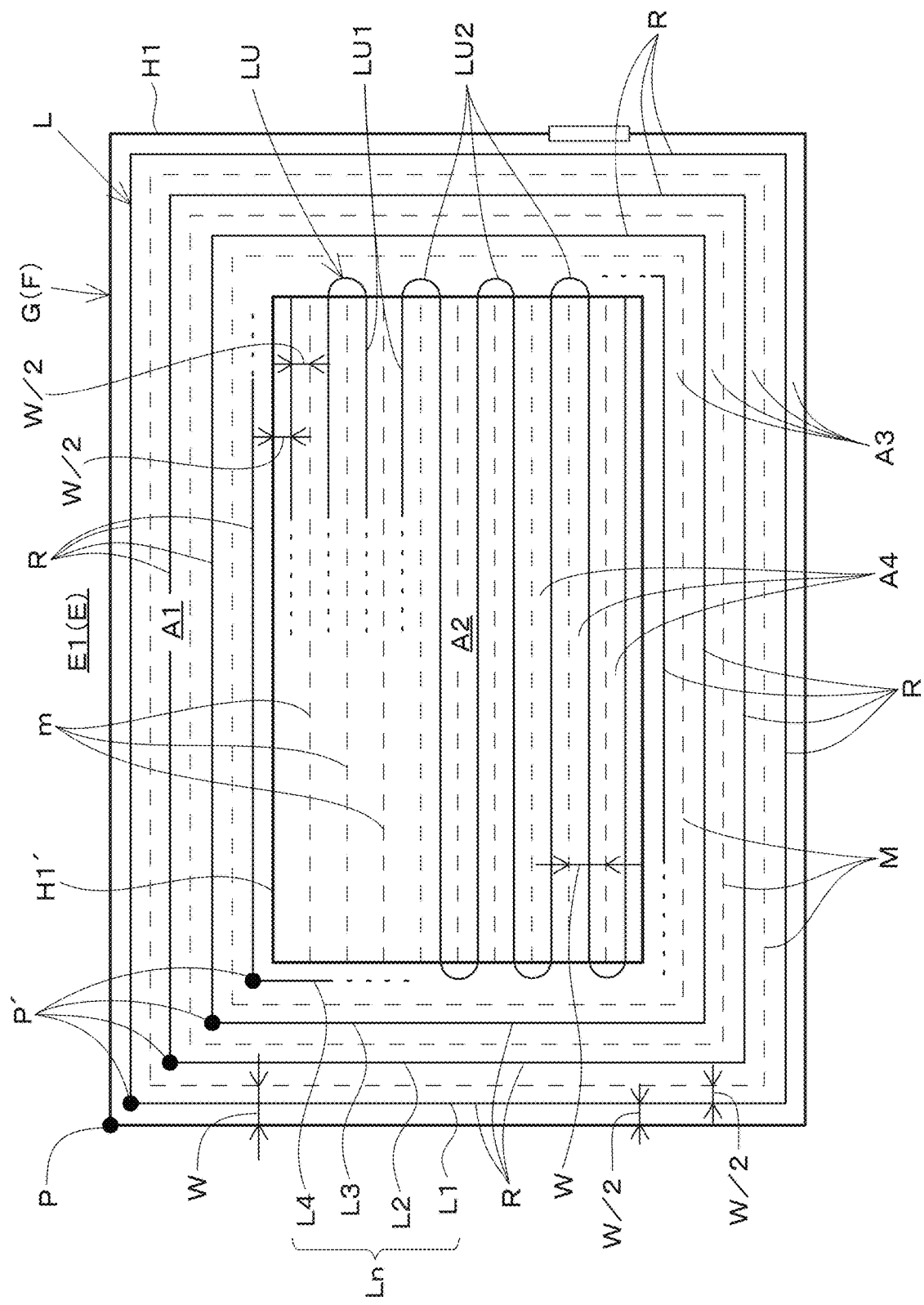

The field register 57b registers the contour H1 of a certain agricultural field G as a field F to be displayed by the display unit 56. For example, the field register 57b registers a position corresponding to the contour H1 of a certain agricultural field G. As shown in FIGS. 4, 6A, and 6B, the contour H1 of the agricultural field G is the outer boundary H1 that separates the agricultural field G from a region E1 outside the agricultural field G (e.g., an area where a footpath and/or a fence is/are provided around the perimeter of the agricultural field G). When the operator performs a predetermined operation on the display 55, the display controller 57 causes the display unit 56 to display a field registration screen D1 as shown in FIG. 4. The field registration screen D1 displays a field display section 100 displaying the field F including the agricultural field G and vehicle body position(s) VP of the agricultural machine 1, and a first information display section 101 displaying agricultural field identification information such as the name of the agricultural field G (agricultural field name) and agricultural field management number. The field F is associated with position information such as latitude, longitude and/or a coordinate system (X-axis and Y-axis) as well as image data representing the agricultural field G.

When the display unit 56 displays the field registration screen D1, the operator operates the agricultural machine 1 to cause the agricultural machine 1 to travel in a circumferential direction in the agricultural field G. The position acquirer 57a acquires the vehicle body position VP detected by the position detector 50 at predetermined intervals, stores such a vehicle body position VP in the display storing unit 58 upon each detection, and displays the vehicle body position VP on the field display section 100 upon each detection (in FIG. 4, only some vehicle body positions VP are displayed for convenience).

When the agricultural machine 1 finished traveling in the circumferential direction in the agricultural field G and the operator selects a register button 102, the field register 57b calculates a travel path T1 of the agricultural machine 1 based on the multiple vehicle body positions VPs stored. As shown in FIG. 4, the display controller 57 displays the travel path T1 on the field F in the field display section 100. In examples such as FIG. 4, the travel path of the agricultural machine 1 is a line T1 that returns to the first detected position VP after passing through multiple vehicle body positions VP in the order of detection (order of acquisition).

Figure 5A:
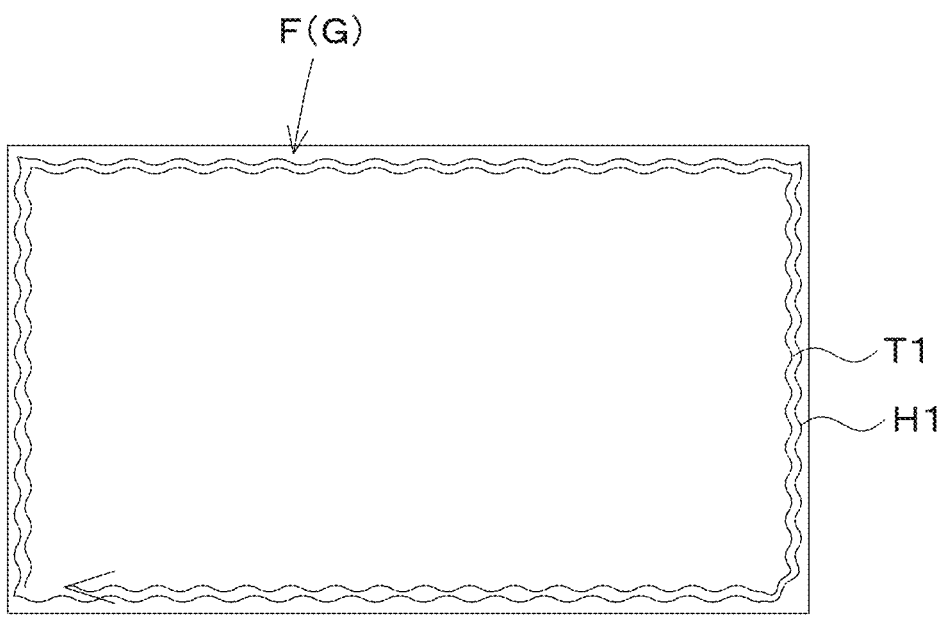
FIG. 5A illustrates determining the contour of an agricultural field from measured points.

The vehicle body position VP is the GPS position of the position detector 50, and the travel path T1 is the path along which the GPS position has moved. Therefore, the field register 57b displaces the travel path T1 outward by an amount equal to the lateral distance from the GPS position of the agricultural machine 1 to the outer edge of the working device 60 (in FIG. 5A, the left edge of the working device 60, because the agricultural machine 1 travels in the circumferential direction in the agricultural field G in a clockwise direction) to obtain a line H1 between the travel path T1 and the outline of the field F. In the present example embodiment, the GPS position of the position detector 50 is at the center of the agricultural machine 1, and the widthwise center of the agricultural machine 1 coincides with the widthwise center of the working device 60. Therefore, the displacement amount above is equal to half the outer width (dimension in the width direction) of the working device 60 or half the working width W of the working device 60 (dimension in the width direction of a working range N over which the working device 60 has some effect on the agricultural field G). Note that the following description is, for simplicity of description, based on the assumption that the outer width of the working device 60 and the working width W of the working device 60 are the same. As another example, a line H1 may be created between the travel path T1 and the outline of the field F by using, as the displacement amount, a value that is smaller or larger, by a certain amount, than the distance in the width direction from the GPS position of the agricultural machine 1 to the outer edge of the working device 60.

The field register 57*b* uses the line H1 created as described above as the contour (outline) of the agricultural field G, and registers (stores) the field F indicated by the contour H1 in the display storing unit 58. In so doing, the field register 57*b* registers the agricultural field identification information, such as the name (agricultural field name) and/or the agricultural field management number of the agricultural field G, in the display storing unit 58 such that the agricultural field name and/or the agricultural field management number are associated with the field F. A plurality of the fields F etc. can be registered in the display storing unit 58. When the field register 57*b* registers a field F, the display controller 57 causes the field F (contour H1 of agricultural field G) to be displayed.

Figure 5B:
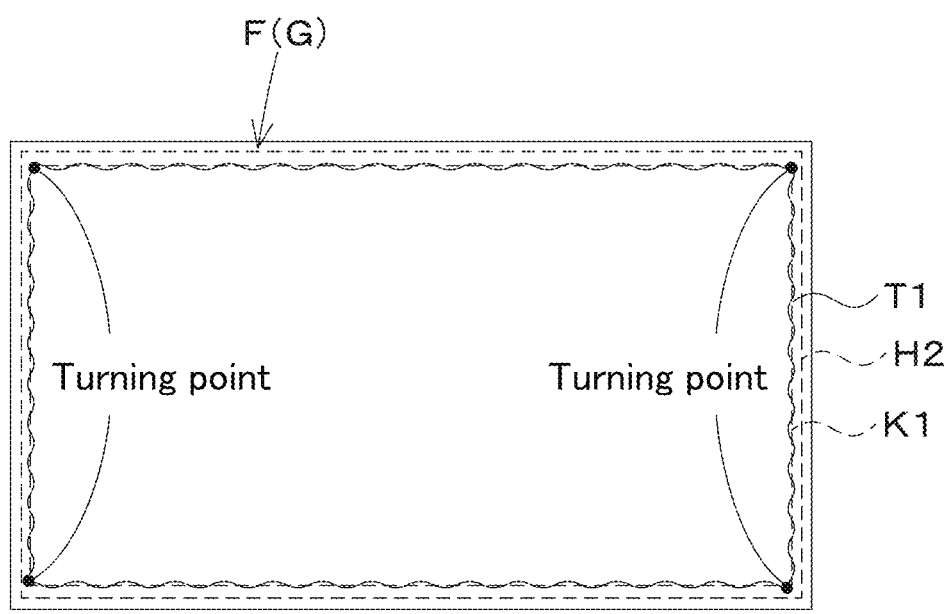
FIG. 5B illustrates determining the contour of an agricultural field from turning points.

The method of registering an agricultural field G (field F) described above is merely an example and does not imply any limitation. As another example, the following method may be used. The field register 57*b*, as shown in FIG. 5B, calculates turning points from the travel path T1 of the agricultural machine 1 and creates a line K1 passing through the turning points. Then, the line K1 may be displaced outward by the aforementioned displacement amount to obtain a line H2 between the travel path T1 and the outline line of the field F, the line H2 may be used as the contour K2 of the agricultural field G and the field F, and the field F may be registered in the display storing unit 58.

Figure 5C:
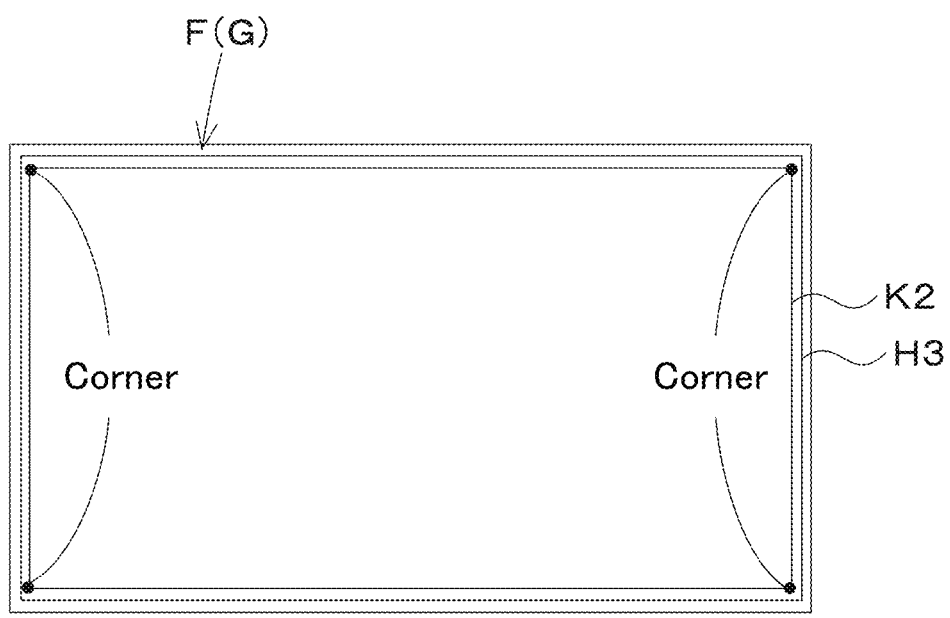
FIG. 5C illustrates determining the contour of an agricultural field from corners of the agricultural field.

A method by which the operator designates the corners of the agricultural field G by operating a predetermined switch or the like as the agricultural machine 1 travels in the circumferential direction, as shown in FIG. 5C, may be used. In this case, the field register 57*b* creates a line K2 that passes through the corners of the agricultural field G in the designated order and then returns to the first designated corner. The line K2 may then be displaced outward by the aforementioned displaced amount to obtain a line H3 between the travel path T1 and the outline of the field F, the line H3 may be used as the contour K4 of the agricultural field G and the field F, and the field F may be registered in the display storing unit 58.

Furthermore, the contours H1, H2, H3 of the agricultural field G and the field F may be, for example, data expressed in position (latitude, longitude), in a coordinate (x-axis, y-axis) system, and/or in some other manner.

As described earlier, the display 55 may cause the field register 57*b* to register multiple fields F.

The field acquirer 57*c* acquires one of the fields F that represents a certain agricultural field G in performing work and/or the like. In the present example embodiment, the field acquirer 57*c* acquires the position information of the contour H1 of the field F registered by the field register 57*b* as information of the field F. Note that the information of field F is not limited to the position information of the contour H1 of the field F, but may include other information. The field acquirer 57*c* acquires data expressed in position (latitude and longitude) and/or data expressed in a coordinate (x-axis and y-axis) system, of the contour H1.

Note that the field acquirer 57*c* need only be capable of acquiring the field F. The field acquirer 57*c* may be configured to connect the display 55 and a memory device such as a memory that stores the field F in advance and acquire the field F from the storing device. The method of acquiring the field F is not limited to the methods described above.

As shown in FIG. 1, the travel assistance system S for the agricultural machine 1 is configured or programmed to include a setting acquirer 57*d* and a route creator 57*e*. In the present example embodiment, the setting acquirer 57*d* and the route creator 57*e* may include electrical/electronic circuit component(s) or circuitry, program(s) stored in the display 55, and/or the like, and the display controller 57 of the display 55 functions also as the setting acquirer 57*d* and the route creator 57*e*. Note that, in the present example embodiment, although the display controller 57 of the display 55 is configured or programmed to also function as the setting acquirer 57*d* and the route creator 57*e*, the setting acquirer 57*d* and the route creator 57*e* may be included in the controller 40 or in an external server communicably connected to the controller 40 or the display controller 57. The configuration is not limited to the above configuration.

Figure 8:
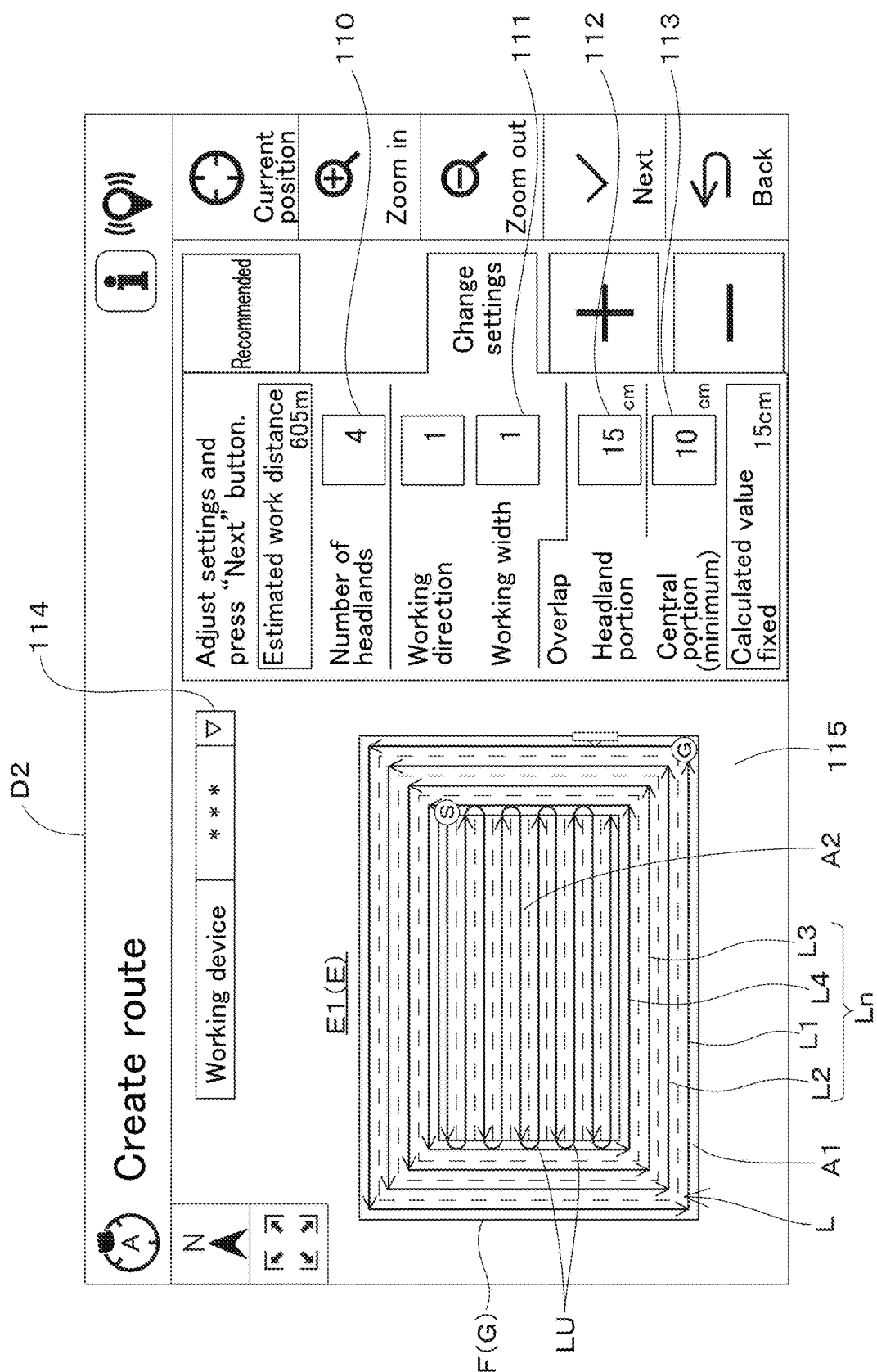
FIG. 8 is a first diagram showing an example of a settings screen.

The setting acquirer 57*d* acquires settings information relating to the creation of the travel route L. Specifically, when the operator (driver) performs a predetermined operation on the display 55, the display controller 57 displays a settings screen D2 on the display unit 56, as shown in FIG. 8. The settings screen D2 includes a headland number input section 110, a first width input section 111, a second width input section 112, a third width input section 113, a machine input section 114, and a route display section 115. The headland number input section 110 receives input of the number of headlands. In the examples shown in FIGS. 6A and 8, the number of headlands is "4" and four route portions are created as go-around lines Ln along which work is to be done on a headland (headland area) A1 in the agricultural field G.

Figure 9:
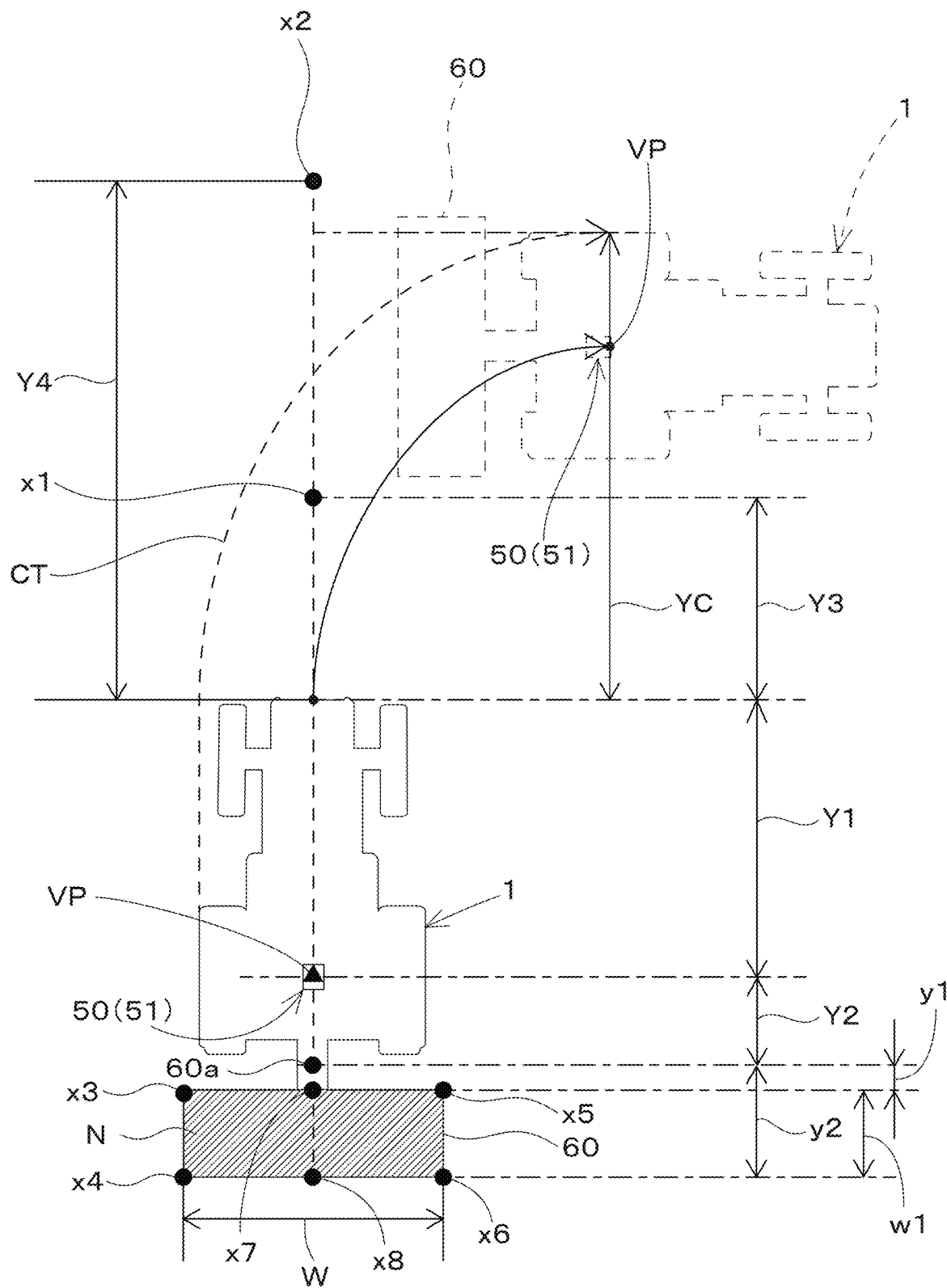

The first width input section 111 receives input of the working width W of the working device 60. As shown in FIG. 9, the working width W is the width (working width) over which the working device 60 does work against the ground in, for example, the agricultural field G.

The second width input section 112 receives input of an overlap (first overlap) W1 which is an amount by which a work zone A3 at each go-around line Ln overlaps an adjacent outer work zone A3, as shown in FIG. 7.

The third width input section 113 receives input of an overlap (second overlap) W2 which is an amount by which an inner work zone A4 at each inner line LU overlaps an adjacent inner work zone A4, as shown in FIG. 7.

The machine input section 114 receives input of information about the working device 60 which is towed by the agricultural machine 1 to perform work in the agricultural field G, as shown in FIG. 8. In the present example embodiment, the machine input section 114 receives input of the model information of the working device 60.

As shown in FIG. 8, the route display section 115 displays the field F acquired by the field acquirer 57*c*. The route display section 115 can also display the created travel route L on the field F.

The setting acquirer 57*d* acquires, as settings information relating to the creation of the travel route L, the working width W received at the width input section 111, the number of headlands received at the headland number input section 110, the first overlap W1 received at the second width input section 112, and the second overlap W2 received at the third width input section 113, of the information entered on the settings screen D2.

The setting acquirer 57*d* also acquires the specification information of the working device 60. Specifically, the setting acquirer 57*d* acquires the specification information of the working device 60 from information pre-stored in the display storing unit 58, based on the model information of the working device 60 received at the machine input section 114. The display storing unit 58 stores the model information of the working device 60 and the specification information of the working device 60 in the form of a table in which the model information and the specification information are associated with each other. For example, as shown in FIG. 9, the stored specification information of the working device 60 includes the dimension in the front-back direction (working length w1) of the range (working range N) over which the working device 60 does work on the ground in, for example, the agricultural field G, the distance y1 from a connected portion 60*a* connected to the linkage 30 to the front edge of the working range N, and the distance y2 from the connected portion 60*a* to the rear edge of the working range N. Thus, the setting acquirer 57*d* can acquire the working length w1, the distance y1 from the connected portion 60*a* to the front edge of the working range N, and the distance y2 from the connected portion 60*a* to the rear edge of the working range N, based on the model information of the working device 60 received at the machine input section 114.

Note that the information entered on the settings screen D2 (such as the working width W, the first overlap W1, the second overlap W2, and the model information of the working device 60) is stored in the display storing unit 58 such that the information is associated with the field F.

The route creator 57*e* creates a travel route L on which the vehicle body 2 is to travel. Specifically, the route creator 57*e* creates a travel route L on the field F acquired by the field acquirer 57*c*. The travel route L created by the route creator 57*e* is stored in the display storing unit 58 such that the travel route L is associated with the field F. In the present example embodiment, the route creator 57*e* can create, on the field F, a travel route L on which the agricultural machine 1 is to travel in a circumferential direction in the agricultural field G based on the settings information acquired by the setting acquirer 57*d*.

The following details the creation of the travel route L by the route creator 57*e*, and the travel route L.

As shown in FIG. 6A, the route creator 57*e* creates go-around lines Ln (n: headland number [loop number], n=1, 2, 3 . . . n) on which work is done in the headland (headland area) A1 of the agricultural field G, as go-around portions of the travel route L. The route creator 57*e* need only create at least a travel route L for the agricultural machine 1 to travel in the circumferential direction in the agricultural field G, and, in the present example embodiment, the route creator 57*e* may create, in addition to go-around line(s) Ln which is/are go-around portion(s) of a travel route L in the agricultural field G, inner line(s) LU which is/are portion(s) of the travel route L for the working device 60 to do work in an area (inner area A2) located inward of the headland area(s) A1.

As shown in FIG. 6A, the go-around lines Ln are portions of the travel route L on which the agricultural machine 1 travels in the circumferential direction in the headland area A1. The agricultural machine 1 travels on the go-around lines Ln in a predetermined circumferential direction, which is, in the example shown in FIG. 6A, etc., is a counterclockwise direction. However, the circumferential direction in which the agricultural machine 1 travels is not limited to the counterclockwise direction, but may be a clockwise direction. A configuration in which the agricultural machine 1 travels in different circumferential directions on different loops may be used.

The agricultural machine 1 travels on inner loops first and then outer loops. The number of the go-around lines Ln, i.e., the number of loops, corresponds to the number of headlands A1 in the agricultural field G (the number of headlands). That is, if the number of headlands is four, the number of go-around lines Ln is four, i.e., there are four route portions which are adjacent to each other from the center of the field F outward, as shown in FIG. 6A. If the number of headlands is five, then the go-around lines Ln are five route portions which are adjacent to each other from the center of the field F outward.

Note that, in the following description, the outermost one of the go-around lines Ln is referred to as the first go-around line L1, the second outermost one is referred to as the second go-around line L2, the third outermost one is referred to as the third go-around line L3 . . . and nth outermost one is referred to as the nth go-around line Ln (n=1, 2, 3 . . . n). Note that in FIG. 6A, the portion of the fourth go-around line L4 that overlaps an inner line LU is not illustrated.

As shown in FIGS. 6A and 6B, the inner line LU includes, for example, straight portions LU1 connecting the opposite ends of the inner area A2 in the longitudinal direction, and curved portion(s) LU2 connecting adjacent straight portions LU1. Each straight portion LU1 is a route portion along which the agricultural machine 1 travels and the working device 60 does work, and each curved portion LU2 is a route portion along which the agricultural machine 1 travels from one straight portion LU1 to another straight portion LU1. That is, the agricultural machine 1 traveling on the inner line LU moves back and forth between one end and the opposite end of the inner area A2, and makes a turn at each curved portion LU2 to move from one straight portion LU1 to the adjacent straight portion LU1.

As shown in FIG. 1, the route creator 57*e* includes a first generator 57*e*1, a second generator 57*e*2, a third generator 57*e*3, a fourth generator 57*e*4, a fifth generator 57*e*5, and a sixth generator 57*e*6. The first generator 57*e*1 creates adjacent go-around lines Ln corresponding to the number of headlands (n=1, 2, 3 . . . n) based on the contour H1 of the field F displayed by the display 55, the number of headlands, and a first distance. It is noted here that the first distance in the creation of the go-around lines Ln is the working width W or the distance obtained by subtracting, from the working width W, the width two times as large as the first overlap W1. In the present example embodiment, as shown in FIG. 6A, the first distance is the same as the working width W. Note that, as shown in FIG. 7, the first distance may be the distance obtained by subtracting, from the working width W, the width two times as large as the first overlap W1.

The first generator 57*e*1, for example, acquires feature points P on the contour H1 based on the information of the field F acquired by the field acquirer 57*c*, and creates go-around line(s) Ln based on the feature points P. In the present example embodiment, the feature points P on the contour H1 are turning points on the contour H1. After calculating the turning points (feature points P) on the contour H1, the first generator 57*e*1 shifts the feature points P inward in the field F based on the first distance and the number of headlands to create go-around line(s) Ln passing through the shifted feature points P'. The first generator 57*e*1 creates the go-around lines Ln in the order from the outermost first go-around line L1 to inner go-around line(s) Ln.

As shown in FIG. 6A, each go-around line Ln (travel route L) includes a plurality of lines R connected to each other. Each line R is connected to its adjacent other lines in the same loop to form a loop route portion (a go-around line Ln). In other words, the travel route L includes a plurality of lines R. Each line R is a straight portion or a substantially straight route portion connecting one feature point P' to another feature point P'. For example, the agricultural machine 1 travels straight when it is located on any of the lines R. On the other hand, when the agricultural machine 1 moves from one line (first line) R1 to another line (second line) R2 connected to the line R1, the agricultural machine 1 performs a turn or a multi-point turn, etc. at the feature point P' between the one line R1 and the other line R2. Note that, in the following description, one of the lines R may be referred to as the first line R1, and another of the line R (the other line) to which the agricultural machine 1 moves from the first line R1 may be referred to as the second line R2.

As shown in FIGS. 6A and 6B, the second generator 57e2 creates a plurality of outer work zones A3 in the headland area A1 that correspond to the go-around lines Ln and that have the same width as the first distance. The second generator 57e2 creates, on the field F, a pair of boundaries M that are on the opposite sides of a corresponding line R in a direction intersecting the line R and that are parallel to the line R.

As shown in FIG. 6A, the third generator 57e3 sets the headland area A1 and the inner area A2 based on the innermost go-around line Ln. Specifically, for example, the third generator 57e3 shifts the innermost go-around line Ln inward by half the first distance to create an inner boundary H1' which is the boundary M between the headland area A1 and the inner area A2. The third generator 57e3 sets the area enclosed by the inner boundary H1' as the inner area A2, and sets the area enclosed by the outer boundary H1 and the inner boundary line H1' as the headland area A1.

The distance between each of the pair of boundaries M and a corresponding go-around line Ln is half the first distance, and the distance between the pair of boundaries M is the same as the first distance. In other words, as shown in FIG. 6B, each outer work zone A3 is an area in the form of an endless strip, in which a go-around line Ln extends along the widthwise center of the strip. The outer work zones A3 are located adjacent to each other such that they correspond to the headlands. With this, the second generator 57e2 creates the plurality of outer work zones A3 each surrounded by a pair of boundaries M. It is noted here that, in the present example embodiment, the agricultural machine 1 travels along the plurality of loops such that the agricultural machine 1 travels inner loops first and then outer loops, and the working device 60 does work in the outer work zones A3 such that the working device 60 does work in inner loops first and then outer loops.

Figure 10:
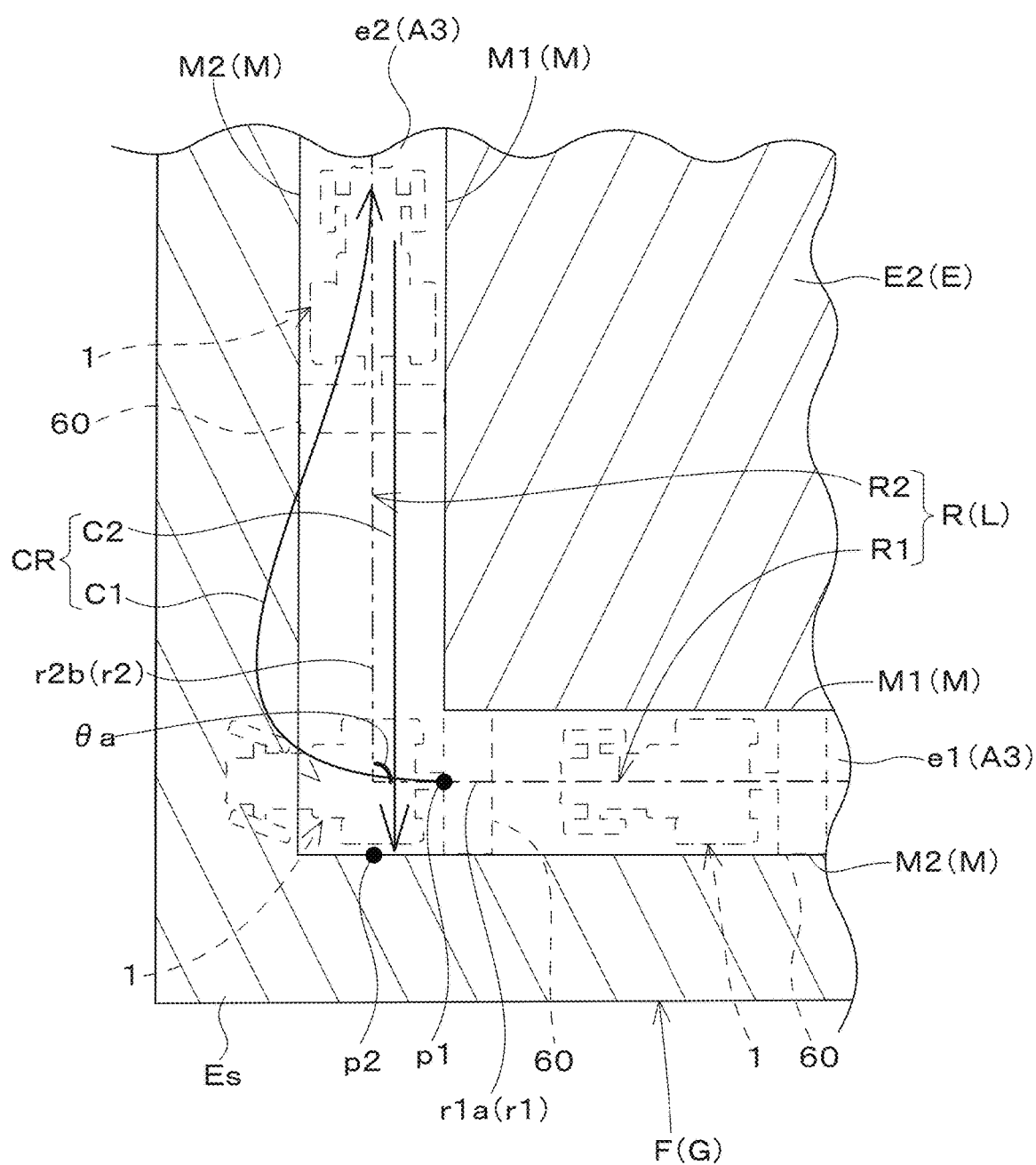
FIG. 10 illustrates the creation of a turning portion.

As shown in FIG. 10, the fourth generator 57e4 generates, on each go-around line Ln, turning portions CR for the agricultural machine 1 to turn or perform a multi-point turn on the go-around line Ln (n: headland number [loop number], n=1, 2, 3 . . . n). The fourth generator 57e4 generates turning portions CR at the feature points P' of the go-around line Ln to correct the go-around line Ln. That is, each end portion (ending portion r1, starting portion r2) of each of the plurality of lines R is connected to an end portion (ending portion r1, starting portion r2) of another of the plurality of lines R by a turning portion CR. Note that in the following description, the term "(ending, starting) portion" such as the ending portion r1 and the starting portion r2 refers to a portion that includes an endpoint, and the term "(ending, starting) point" such as an ending point and a starting point refers to an endpoint itself.

The fourth generator 57e4 does not need to generate turning portions CR for all the feature points P' on each go-around line Ln, and may be configured to generate turning portion(s) CR for feature point(s) P' that satisfy predetermined condition(s). For example, the fourth generator 57e4 may be configured to, when the angle θa between one line (first line) R1 of a go-around line Ln and another line (second line) R2 connected to the one line R1 is equal to or greater than a predetermined angle, generate a turning portion CR at the feature point P' between the one line R1 and the other line R2. It is noted here that the angle θa between the first line R1 and the second line R2 is the smaller of the angles between the first line R1 and the second line R2.

As shown in FIG. 10, each turning portion CR is a route portion connecting a work ending point p1 of the first line R1 at which the working device 60 ends working and a work starting point p2 of the second line R2. The work ending point p1 is the point at which the agricultural machine 1 stops moving and the working device 60 ends working, and the work starting point p2 is the point at which the agricultural machine 1 starts moving and the working device 60 starts working. The turning portion CR is a route portion that includes a portion C1 where the agricultural machine 1 turns and a portion C2 where the agricultural machine 1 moves backward.

Note that in the present example embodiment, the work ending point p1 is the point with which the front edge of the working range N of the working device 60 coincides when the working device 60 ends working. The work starting point p2 is the point with which the rear edge of the working range N of the working device 60 coincides when the working device 60 starts working.

The following discusses, as shown in FIG. 10, one (first line, R1) of the go-around lines Ln. The work ending point p1 is set on the first line R1 based on the shorter of the pair of boundaries M (boundary M1) corresponding to the first line R1, in the ending portion r1a (one of the end portions that is closer to the second line R2) of the first line R1. Specifically, the work ending point p1 is set such that the ending point of the boundary M1 and the front edge of the working range N of the working device 60 coincide with each other in the direction of extension of the first line R1. Therefore, the work ending point p1 is set at the position on the first line R1 that corresponds to the ending point of the first boundary M1. Note that in the following description, the shorter one of the boundaries M corresponding to one of the go-around lines Ln is referred to as the first boundary M1, and the longer of such boundaries M is referred to as the second boundary M2.

The work starting point p2 is set on the extension of the second line R2 based on the longer one (second boundary M2) of the pair of boundaries M corresponding to the first line R1 in the ending portion r1a (one of the end portions that is closer to the second line R2) of the first line R1. Specifically, the work starting point p2 is set such that the rear edge of the working range N of the working device 60 coincides with the second boundary M2. In the present example embodiment, the work starting point p2 is set at the intersection of the extension of the second line R2 and the second boundary M2, because the work starting point p2 is the point with which the rear edge of the working range N of the working device 60 coincides when the working device 60 starts work.

Thus, as shown in FIG. 10, the ending portion of the section in which the working device 60 performs work along the first line R1 (first unit work section e1) coincides with the ending portion r1a of the first line R1, the starting portion of the section in which the working device 60 performs work along the second line R2 (second unit work section e2) coincides with the starting portion r2b of the second line R2, and the ending portion r1a of the first line R1 coincides with the first boundary M1 of the second line R2.

With this, a travel route L can be created such that the ending portion of the first unit work section e1 and the starting portion of the second unit work section e2 coincides with each other. That is, the agricultural machine 1 can perform work while preventing or reducing the generation of unworked regions Ed by traveling along the travel route L created by the route creator 57e.

Note that the route creator 57e need only be capable of creating a travel route L such that the ending portion of the first unit work section e1 and the starting portion of the second unit work section e2 coincide with each other or overlap each other, and the method of creating the route is not limited to the methods described above. In drawings other than FIG. 10, the turning portion CR is not illustrated for simplicity.

In the present example embodiment, the display controller 57 sets the turning portion CR based on the positional relationship between the vehicle body position VP and the working range N acquired by the setting acquirer 57d and the position information of boundaries M. However, the setting method is not limited to the method described above, and the position(s) and route(s) are not limited to the those described above. For simplicity of description, in the following description, the starting point of each of the lines R of a go-around line Ln is referred to as the work starting point p2, and the ending point of each of the lines R is referred to as the work ending point p1.

As shown in FIGS. 6A and 6B, the fifth generator 57e5 creates the inner line LU. Specifically, as shown in FIGS. 6A and 6B, the fifth generator 57e5 sets straight portions LU1 connecting the opposite ends in the longitudinal direction as an inner line LU. The fifth generator 57e5 creates the straight portions LU1 which are spaced apart from each other at a predetermined second distance. It is noted here that the second distance in the creation of straight portions LU1 is the working width W or the distance obtained by subtracting, from the working width W, the distance twice as large as the second overlap W2. In the present example embodiment, as shown in FIG. 6A, a case in which the second distance is the same as the working width W is discussed. Note that, as shown in FIG. 7, the second distance may be the distance obtained by subtracting, from the working width W, the distance twice as large as the second overlap W2.

The fifth generator 57e5 also creates a curved portion LU2 as a portion of the inner line LU by connecting adjacent straight portions LU1. When the agricultural machine 1 moves along a straight portion LU1 and reaches a curved portion LU2, the controller 40 controls the linkage 30 to raise the working device 60 to the non-working posture. When the agricultural machine 1 moves along the curved portion LU2 and reaches another straight portion LU1, the controller 40 controls the linkage 30 to lower the working device 60 to the working posture.

As shown in FIGS. 6A and 6B, the sixth generator 57e6 creates a plurality of inner work zones A4 in the inner area A2 that correspond to the straight portions LU1 and that have the same width as the second distance. The sixth generator 57e6 creates a pair of boundaries m that are on the opposite sides of a corresponding straight portion LU1 in a direction intersecting the straight portion LU1 and that are parallel to the straight portion LU1. Specifically, the distance between each of the pair of boundaries m and the straight portion LU1 is half the second distance, and the distance between the pair of boundaries m is the same as the second distance. In other words, as shown in FIG. 6B, each inner work section A4 is a strip-shaped area which extends from one end of the agricultural field G to the opposite end of the agricultural field G and in which a straight portion LU1 extends along the widthwise center. With this, the sixth generator 57e6, creates a plurality of inner work zones A4 each enclosed by a pair of boundaries m and the inner boundary H1'.

The travel assistance system S for the agricultural machine 1 is capable of, by correcting the specification information of the agricultural machine 1 and/or the working device 60, information of the field F, and the travel route L, preventing the agricultural machine 1 from traveling in an area where the agricultural machine 1 is prohibited from entering (such an area is "off-limits area E"), while preventing or reducing the generation of unworked regions Ed, thus improving work efficiently. In the present example embodiment, the travel assistance system S for the agricultural machine 1 corrects the travel route L while the agricultural machine 1 is traveling along the travel route L. The off-limits area E includes, for example, a region E1 other than the agricultural field G. The region E1 other than the agricultural field G is an area (external area) in which a footpath and/or a fence is/are provided around the perimeter of the agricultural field G. The off-limits area E includes the area of the agricultural field G where the working device 60 has completed its work. The area where the work has been completed is a worked region E2 which is on a loop preceding the loop where the agricultural machine 1 is currently located and in which the working device 60 has already performed work.

As shown in FIG. 1, the travel assistance system S for the agricultural machine 1 is configured or programmed to include a first acquirer 71, a second acquirer 72, a third acquirer 73, a definer 74, and a corrector 75. In the present example embodiment, the first acquirer 71, the second acquirer 72, the third acquirer 73, the definer 74, and the corrector 75 may include electrical/electronic circuit component(s) or circuitry, program(s) stored in the controller 40, and/or the like, and the controller 40 may also be configured or programmed to function as the first acquirer 71, the second acquirer 72, the third acquirer 73, the definer 74, and the corrector 75. Note that in the present example embodiment, the controller 40 may be configured or programmed to function also as the first acquirer 71, the second acquirer 72, the third acquirer 73, the definer 74, and the corrector 75. However, the first acquirer 71, the second acquirer 72, the third acquirer 73, the definer 74, and the corrector 75 may be included in the display controller 57 or in an external server communicably connected to the controller 40 or the display controller 57. The configuration is not limited to the above configuration.

The first acquirer 71 acquires the travel route L. In the present example embodiment, the first acquirer 71 acquires the travel route L created by the route creator 57e and stored in the display storing unit 58. Thus, the first acquirer 71 can acquire a travel route L which is created on the field F and along which the agricultural machine 1 is to travel.

The second acquirer 72 acquires specification information of the agricultural machine 1 and/or the working device 60. In the present example embodiment, the storing unit 41 pre-stores the specification information of the agricultural machine 1, and the second acquirer 72 acquires the specification information of the agricultural machine 1 from the storing unit 41.

For example, the storing unit 41 stores, as the specification information of the agricultural machine 1, the distance Y1 from the vehicle body position VP to the front end of the agricultural machine 1 (the distal end the hood) and the distance Y2 from the vehicle body position VP to the rear end of the agricultural machine 1 (the rear end of the linkage 30), as shown in FIG. 9. Thus, the second acquirer 72 can acquire the distance Y1 from the vehicle body position VP to the front end of the agricultural machine 1 and the distance Y2 from the vehicle body position VP to the rear end of the agricultural machine 1, based on the model information of the agricultural machine 1 received at the machine input section 114.

The second acquirer 72 acquires the specification information of the working device 60 entered on the settings screen D2 displayed by the display 55, stored in the storing unit 41 and associated with the field F. The second acquirer 72 acquires, as the specification information of the working device 60, the working width W, the dimension in the front-back direction (work length w1) of the range (working range N) over which the working device 60 does work on the ground in, for example, the agricultural field G, the distance y1 from the connected portion 60a connected to the linkage 30 to the front edge of the working range N, and the distance y2 from the connected portion 60a to the rear edge of the working range N.

In the present example embodiment, the second acquirer 72 acquires, from the display storing unit 58, the working width W, the working length w1, the distance y1 from the connected portion 60a connected to the linkage 30 to the front edge of the working range N, and the distance y2 from the connected portion 60a to the rear edge of the working range N, which are acquired by the setting acquirer 57d and stored in the display storing unit 58 in association with the field F. This allows the second acquirer 72 to acquire the relative positions of the vehicle body position VP and the point(s) on the working range N of the working device 60 (front left point, front right point, rear left point, rear right point) based on the working width W, the distance y1 from the connected portion 60a to the front edge of the working range N, and the distance y2 from the connected portion 60a to the rear edge of the working range N.

Note that in the present example embodiment, the second acquirer 72 acquires information stored in the storing unit 41 or information previously stored in the display storing unit 58. However, the settings screen D2 may receive input of specification information of the agricultural machine 1 and/or the working device 60 and the second acquirer 72 may acquire such inputted specification information. The source of such information is not limited to those described above.

The automatic-travel controller 40a controls the traveling device 4 based on the travel route L, and the third acquirer 73 acquires information about the field F in which the agricultural machine 1 moves. The third acquirer 73 also acquires the position information of the off-limits area(s) E. In the present example embodiment, the third acquirer 73 acquires, as the information of the field F, the position information of the contour H1 of the field F registered by the field register 57b, the position information of the boundaries M generated by the second generator 57e2, and the position information of the outer work zone(s) A3 created by the third generator 57e3. The third acquirer 73 acquires data of the contour H1, the boundaries M, and the outer work zone(s) A3 expressed in position (latitude and longitude) and/or in a coordinate (x-axis and y-axis) system.

The third acquirer 73 acquires the area in which a footpath and/or a fence is/are provided around the perimeter of the agricultural field G (external region E1), based on the position information of the contour H1 of the field F. The third acquirer 73 acquires the position information of the external region E1 by distinguishing between the area within the contour H1 and the area outside the contour H1, based on the acquired position information of the field F and the position information of the contour H1.

Furthermore, the third acquirer 73 acquires the worked region(s) E2 based on the position information of the contour H1 of the field F, the boundaries M generated by the second generator 57e2, the outer work zone(s) A3 created by the third generator 57e3, and the vehicle body position VP acquired by the position acquirer 57a, as the information of the field F. The third acquirer 73 determines which outer work zone A3 is the outer work zone A3 in which the agricultural machine 1 is located, based on the vehicle body position VP acquired by the position acquirer 57a. It is noted here that the working device 60 does work in inner outer work zones A3 first and then outer ones, and therefore the third acquirer 73 determines that the outer work zone(s) A3 located inward of the outer work zone A3 where the agricultural machine 1 is located is/are worked region(s) E2. The third acquirer 73 can also determine that the outer work zone(s) A3 located outward of the outer work zone A3 where the agricultural machine 1 is located is/are planned work area(s) Es where the work is to be performed. With this, the third acquirer 73 can acquire the position information of the worked region(s) E2 based on the worked region(s) E2 and the position information of the boundaries M included in the information of the field F.

Note that the off-limits area(s) E acquired by the third acquirer 73 may be any point or region of the field F where the agricultural machine 1 is prohibited from entering, and is not limited to the external region E1 and the worked region(s) E2. For example, the off-limits area E may be an area of an obstacle, a building, or other area on the field F.

The definer 74 defines information that the corrector 75 uses to correct the travel route L. The definer 74 defines point(s) (reference position(s)) and region(s) (monitored region(s)) that the corrector 75 uses to detect and process the outer boundary H1, inner boundary H1', boundaries M, and areas (such as off-limits area(s) E) on the field F based on the specification information acquired by the second acquirer 72. The definer 74 defines imaginary reference position(s) on the outline of the agricultural machine 1 and the working device 60 and its surrounding area, etc. In the present example embodiment, the definer 74 defines the following points as reference position(s), which may include, for example: a first reference position x1, a second reference position x2, a third reference position x3, a fourth reference position x4, a fifth reference position x5, a sixth reference position x6, a seventh reference position x7, and an eighth reference position x8.

The definer 74 also defines the position information of the first reference position x1, the second reference position x2, the third reference position x3, the fourth reference position x4, the fifth reference position x5, the sixth reference position x6, the seventh reference position x7, and the eighth reference position x8 using data expressed in latitude and longitude and/or in a coordinate (X and Y axis) system. Thus, the definer 74 can define the relative distances between (i) the vehicle body position VP and (ii) the first reference position x1, the second reference position x2, the third reference position x3, the fourth reference position x4, the fifth reference position x5, the sixth reference position x6, the seventh reference position x7, or the eighth reference position x8 by defining the position information of the first reference position x1, the second reference position x2, the third reference position x3, the fourth reference position x4, the fifth reference position x5, the sixth reference position x6, the seventh reference position x7, and the eighth reference position x8.

As shown in FIG. 9, the first reference position x1 is an imaginary reference position defined in front of the agricultural machine 1. In the present example embodiment, the definer 74 defines the first reference position x1 at a location in front of the agricultural machine 1 and inward of the outer edge CT of the turning path of the agricultural machine 1. That is, the distance Y3 from the front of the agricultural machine 1 to the first reference position x1 is shorter than the outer edge CT of the turning path of the agricultural machine 1 (Y3<CT). The definer 74 defines the first reference position x1 on an imaginary line extending in the front-back direction at the widthwise center of the agricultural machine 1. That is, the first reference position x1 is located in front of the vehicle body position VP detected by the position detector 50 and coincides with the vehicle body position VP in the width direction.

As shown in FIG. 9, the second reference position x2 is an imaginary reference position defined forward of the agricultural machine 1. The definer 74 defines the second reference position x2 at a location forward of the first reference position x1. In the present example embodiment, the definer 74 defines the second reference position x2 at a location forward of the agricultural machine 1 and outward of the outer edge CT of the turning path of the agricultural machine 1. That is, the distance Y4 from the front of the agricultural machine 1 to the second reference position x2 is longer than the outer edge CT of the turning path of the agricultural machine 1 (Y4>CT). The definer 74 defines the second reference position x2 on an imaginary line. That is, the second reference position x2 is located forward of the vehicle body position VP detected by the position detector 50, coincides with the vehicle body position VP in the width direction, and is located farther away from the vehicle body position VP than the first reference position x1 is (Y4>Y3).

As shown in FIG. 9, the third reference position x3, the fourth reference position x4, the fifth reference position x5, the sixth reference position x6, the seventh reference position x7, and the eighth reference position x8 are imaginary reference positions defined with regard to the working device 60. In the present example embodiment, the third reference position x3, the fourth reference position x4, the fifth reference position x5, the sixth reference position x6, the seventh reference position x7, and the eighth reference position x8 are each located at an end of the working range N (front left, front right, rear left, rear right) of the working device 60 and the locations that correspond to the front and rear centers of the working range N of the working device 60. Specifically, the definer 74 defines the reference position x3 at the location corresponding to the left end of the front edge of the working range N. The definer 74 defines the fifth reference position x5 at the location corresponding to the right end of the front edge of the working range N. The definer 74 defines the fourth reference position x4 at the location corresponding to the left end of the rear edge of the working range N. The definer 74 defines the sixth reference position x6 at the location corresponding to the right end of the rear edge of the working range N. The definer 74 defines the seventh reference position x7 at the front center of the working range N. The definer 74 defines the eighth reference position x8 at the rear center of the working range N.

Note that the first reference position x1, the second reference position x2, the third reference position x3, the fourth reference position x4, the fifth reference position x5, the sixth reference position x6, the seventh reference position x7, and the eighth reference position x8 are arbitrary points. However, the reference positions are not limited to arbitrary points, and reference positions need only be references based on which the distance between (i) the agricultural machine 1 and the working device 60 and (ii) the outer boundary H1, inner boundary H1', boundaries M, and regions, etc., is determined, and may be an arbitrarily shaped region (monitored region). For example, the definer 74 may define a monitored region based on the outline of the agricultural machine 1 and the working device 60, etc. The definer 74 may define, instead of the third reference position x3, the fourth reference position x4, the fifth reference position x5, the sixth reference position x6, the seventh reference position x7, and the eighth reference position x8, an area defined by a rectangular or substantially rectangular shape connecting the third reference position x3, the fourth reference position x4, the fifth reference position x5, the sixth reference position x6, the seventh reference position x7, and the eighth reference position x8, i.e., an area corresponding to the working range N, as the monitored region.

As shown in FIG. 1, the corrector 75 corrects the travel route L acquired by the first acquirer 71. Specifically, the corrector 75 is configured or programmed to include a changer 75a and a creator 75b. A correction made by the changer 75a (first correction) and the correction by the creator 75b (second correction) correct the travel route L acquired by the first acquirer 71.

The changer 75a performs the first correction, i.e., a correction to shorten the ending portion r1 of a corresponding one of the lines R based on the specification information of the agricultural machine 1 and the working device 60 and the information of the field F to prevent the agricultural machine 1 from entering the off-limits area E of the field F where the agricultural machine 1 is prohibited from entering. The first correction by the changer 75a is described below using an example case where the agricultural machine 1 goes from one of the lines R (first line R1) to another line connected to the first line (second line R2).

Figure 11A:
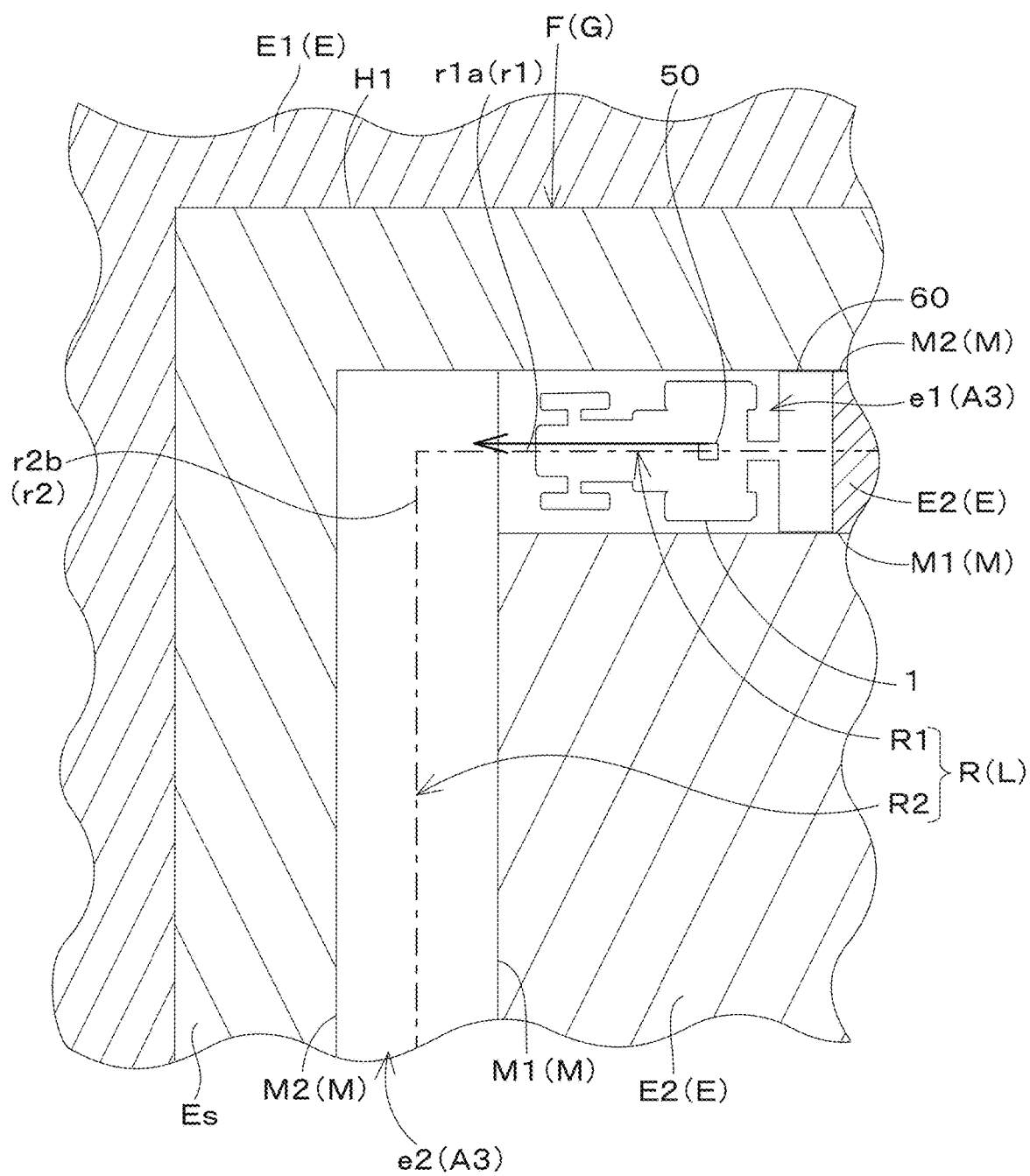
FIG. 11A is a first diagram showing an agricultural machine traveling on a travel route and approaching an off-limits area.

The changer 75a shortens the ending portion r1a of the first line R1 when the agricultural machine 1 is moving on the first line R1, as shown in FIG. 11A. In the present example embodiment, the ending point of each of the lines R is a work ending point p1. Therefore, as shown in FIGS. 11B, 12A, 13A, and 14A, the changer 75a moves (shifts) the work ending point p1 toward the starting portion r2 (work starting point p2) of that line to shorten the ending portion r1a of the first line R1. Specifically, the changer 75a shortens the ending portion r1a of the first line R1 according to the angle θa between the first line R1 and the second line R2.

Note that in the following description, the amount by which the changer 75a moves the work ending point p1 toward the starting portion r2b (work starting point p2) of the line, i.e., the amount (length) by which the ending portion r1a of the first line R1 is shortened, is referred to as a shortening amount Q.

Figure 11B:
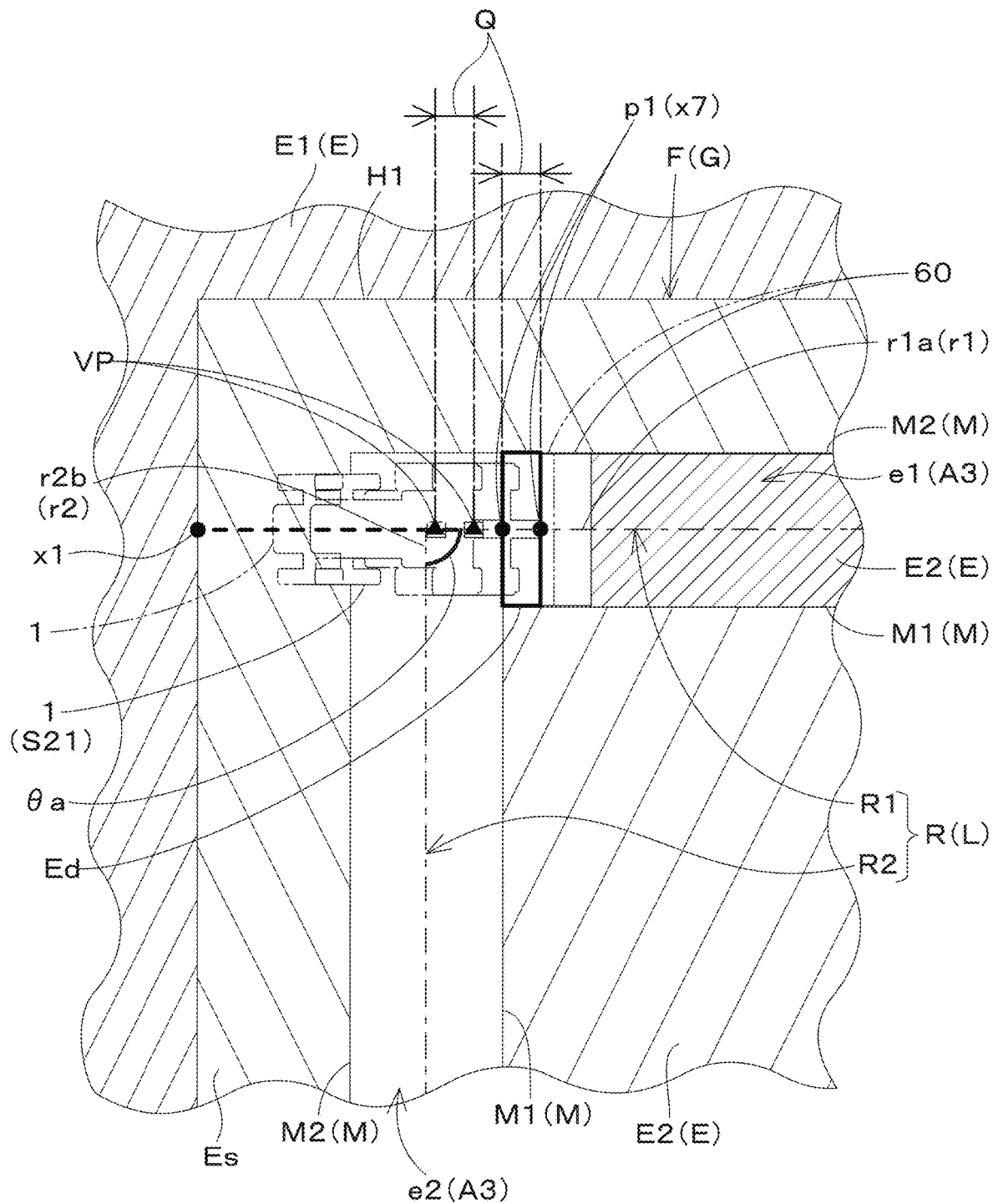
FIG. 11B illustrates shortening a line.
Figure 12A:
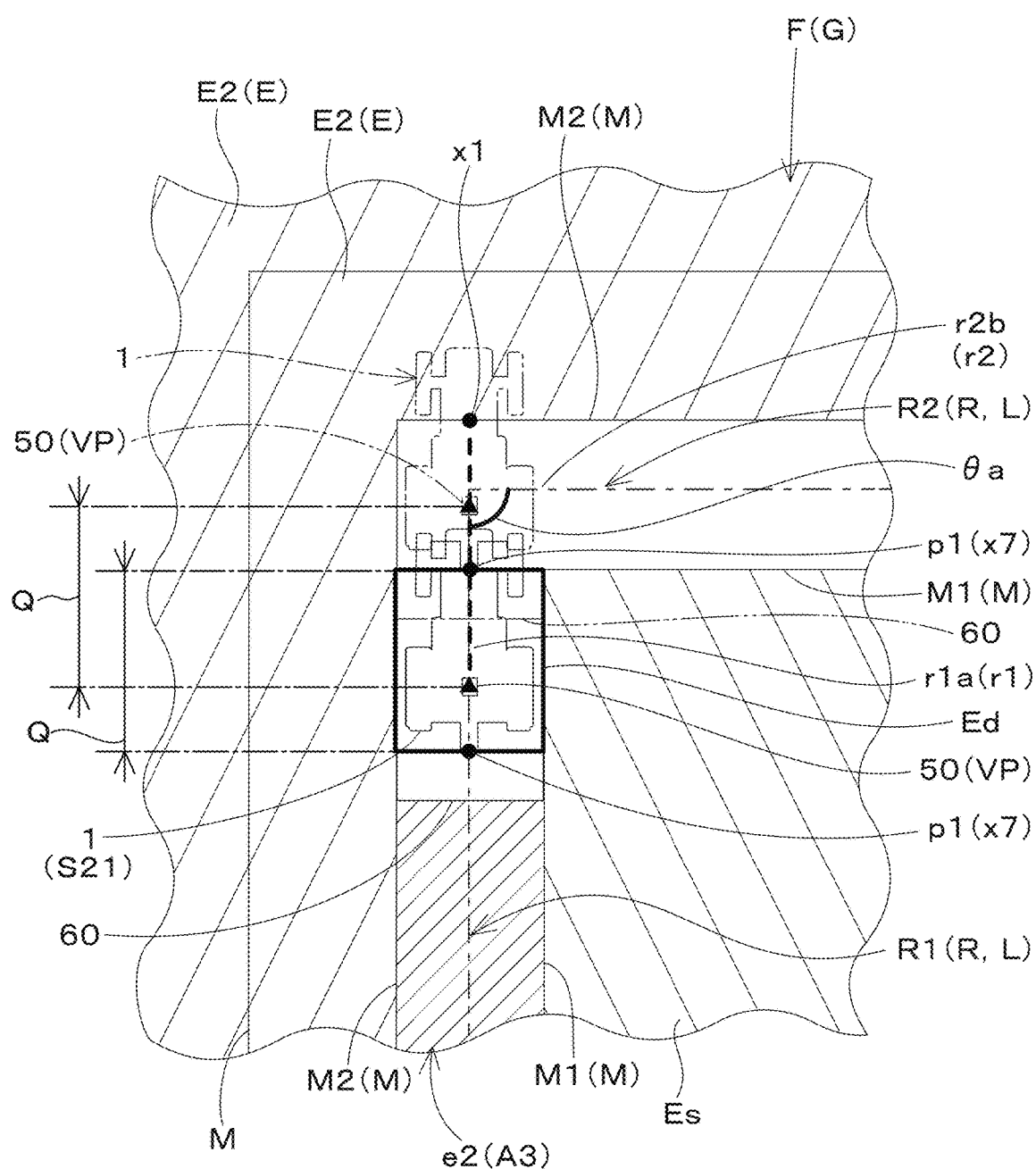
FIG. 12A is a second diagram which illustrates an agricultural machine traveling on a travel route and approaching an off-limits area.
Figure 14A:
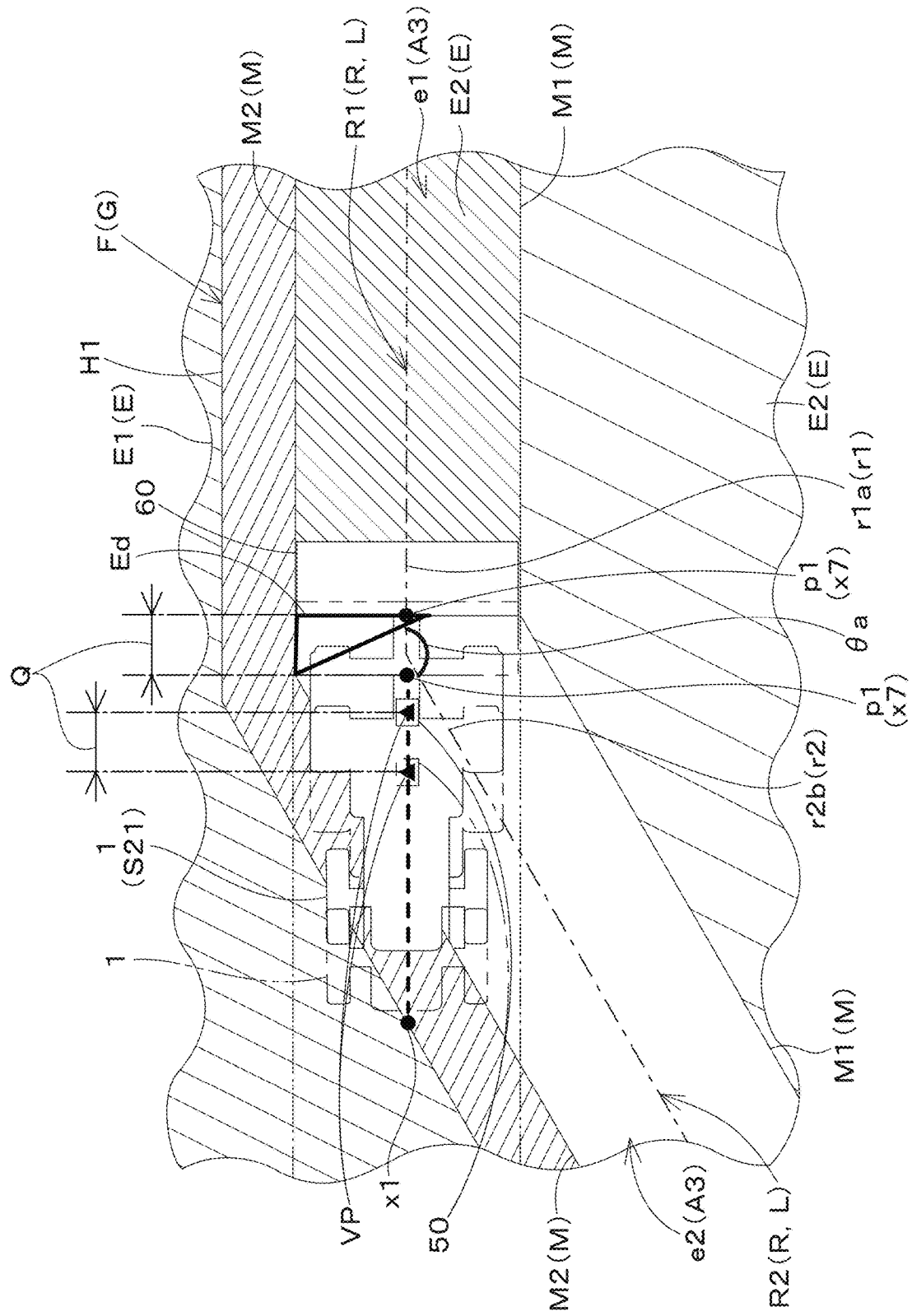
FIG. 14A is a fourth view which illustrates an agricultural machine traveling on a travel route and approaching an off-limits area.

Specifically, as shown in FIGS. 11B, 12A, and 14A, if the angle θa between the first line R1 and the second line R2 is equal to or greater than a predetermined angle (threshold), the changer 75a shortens the ending portion r1 of a corresponding one of the lines R based on the position information of the off-limits area E and the first reference position x1. In the present example embodiment, the changer 75a shortens the ending portion r1 of the corresponding one of the lines R based on the position information of the off-limits area E and the first reference position x1 if the angle θa between the first line R1 and the second line R2 is about 70° or more, for example.

In the case where the agricultural machine 1 is traveling on the first line R1, when the first reference position x1 is located at the boundary M of the off-limits area E or in the off-limits area E, the changer 75a moves the work ending point p1 to the seventh reference position x7 of the agricultural machine 1 at that location, in a direction toward the starting portion (not shown) (work starting point p2) of the first line R1. With this, the vehicle body position VP corresponding to the work ending point p1 corrected by the changer 75a moves toward the starting portion (toward the work starting point p2) of the first line R1 by the same amount as the shortening amount Q from the vehicle body position VP corresponding to the work ending point p1 before the correction.

Figure 13A:
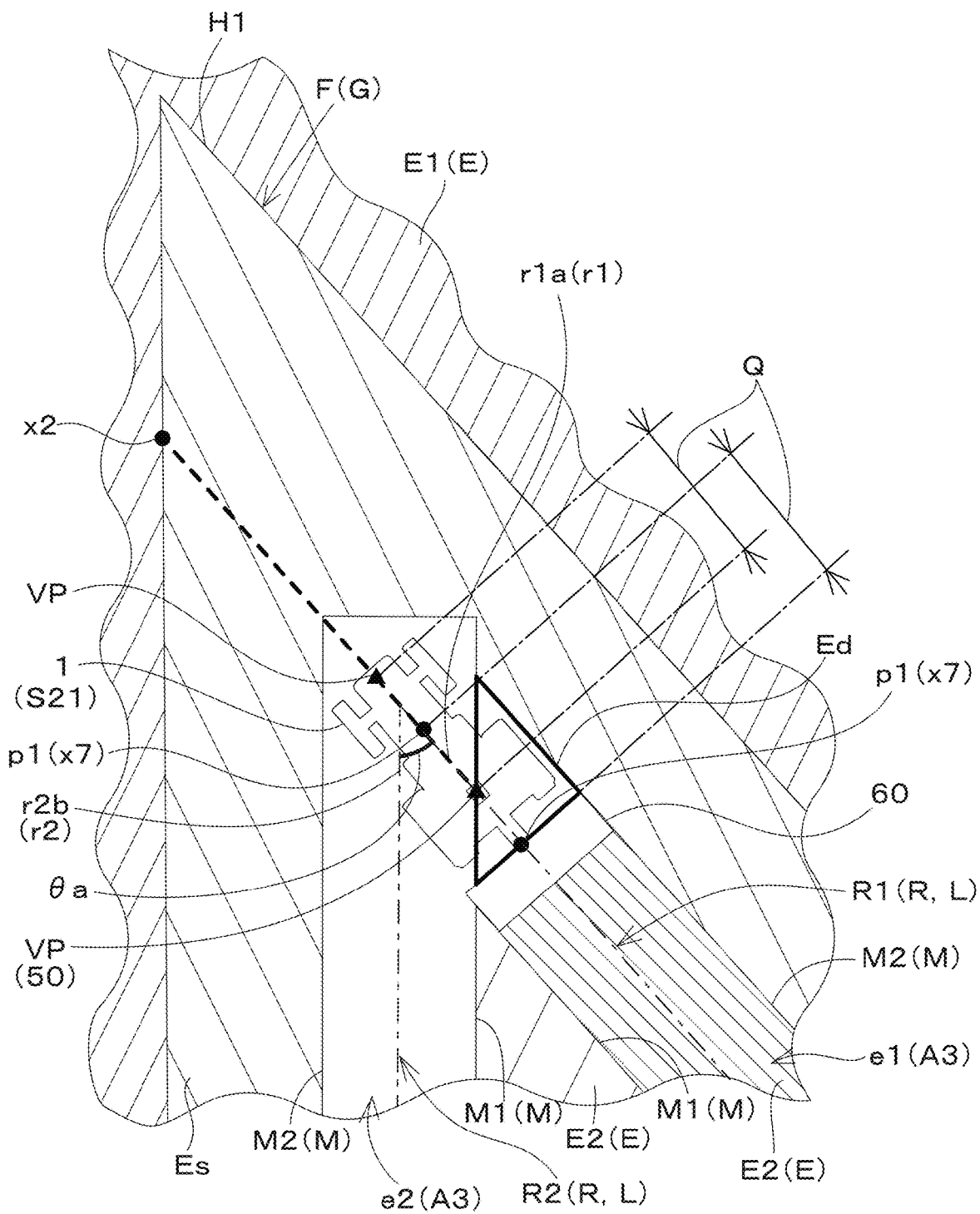
FIG. 13A is a third diagram which illustrates an agricultural machine traveling on a travel route and approaching an off-limits area.

On the other hand, as shown in FIG. 13A, if the angle θa between the first line R1 and the second line R2 is less than the predetermined angle (threshold), the changer 75a shortens the ending portion r1 of the corresponding one of the lines R based on the position information of the off-limits area E and the second reference position x2. Specifically, in the case where the agricultural machine 1 is traveling on the first line R1, when the second reference position x2 is located at the boundary M of the off-limits area E or in the off-limits area E, the changer 75a moves the work ending point p1 to the seventh reference position x7 of the agricultural machine at that location, in a direction toward the starting portion of the first line R1 (work starting point p2). With this, the vehicle body position VP corresponding to the work ending point p1 corrected by the changer 75a moves toward the starting portion (work starting point p2) of the first line R1 by the same amount as the shortening amount Q from the vehicle body position VP corresponding to the work ending point p1 before the correction. Note that, because the second reference position x2 is more distant from the front edge of the working range N (the straight line passing through the third reference position x3, the fifth reference position x5, and the seventh reference position x7) than the first reference position x1 is, the shortening amount Q by which the changer 75a shortens the corresponding one of the lines R based on the second reference position x2 is longer than the shortening amount Q by which the changer 75a shorten the corresponding one of the lines R based on the first reference position x1.

In the above-described manner, the changer 75a moves the ending portion r1 of corresponding one or more of the lines R of the travel route Ls created by the route creator 57e and acquired by the first acquirer 71, in the direction toward the starting portion r2 (work starting point p2). Therefore, as the changer 75a moves the work ending point p1 toward the starting portion r2 of the line R, the agricultural machine 1 will stop its travel and finish its work at a location short of the work ending point before the correction, based on the corrected line R. With this, a space results between the first unit work section e1 corresponding to the first line R1 corrected by the changer 75a and the second unit work section e2 corresponding to the second line R2. The space is the same as the amount of movement of the work ending point p1 (shortening amount Q) and is an unworked region Ed. The size of the unworked region Ed varies with the shortening amount Q.

Note that the above threshold is stored in advance in the storing unit 41, and the changer 75a acquires the threshold from the storing unit 41. The above threshold is not limited to about 70°, but may be about 60°, or may be changeable desirably by operating the display 55, for example. The threshold is set based on whether it is possible to ensure the area where the agricultural machine 1 can make a turn, in the vicinity of the ending portion r1a of the first line R1 and the starting portion r2b of the second line R2.

The changer 75a need only shorten the ending portion r1 of a corresponding one of the lines R to prevent the agricultural machine 1 from entering the off-limits area E of the field F where the agricultural machine 1 is prohibited from entering, based on the specification information and on the information of the field F. The method of correction to shorten the ending portion r1 of the corresponding one of the lines R is not limited to the method described above.

Figure 11C:
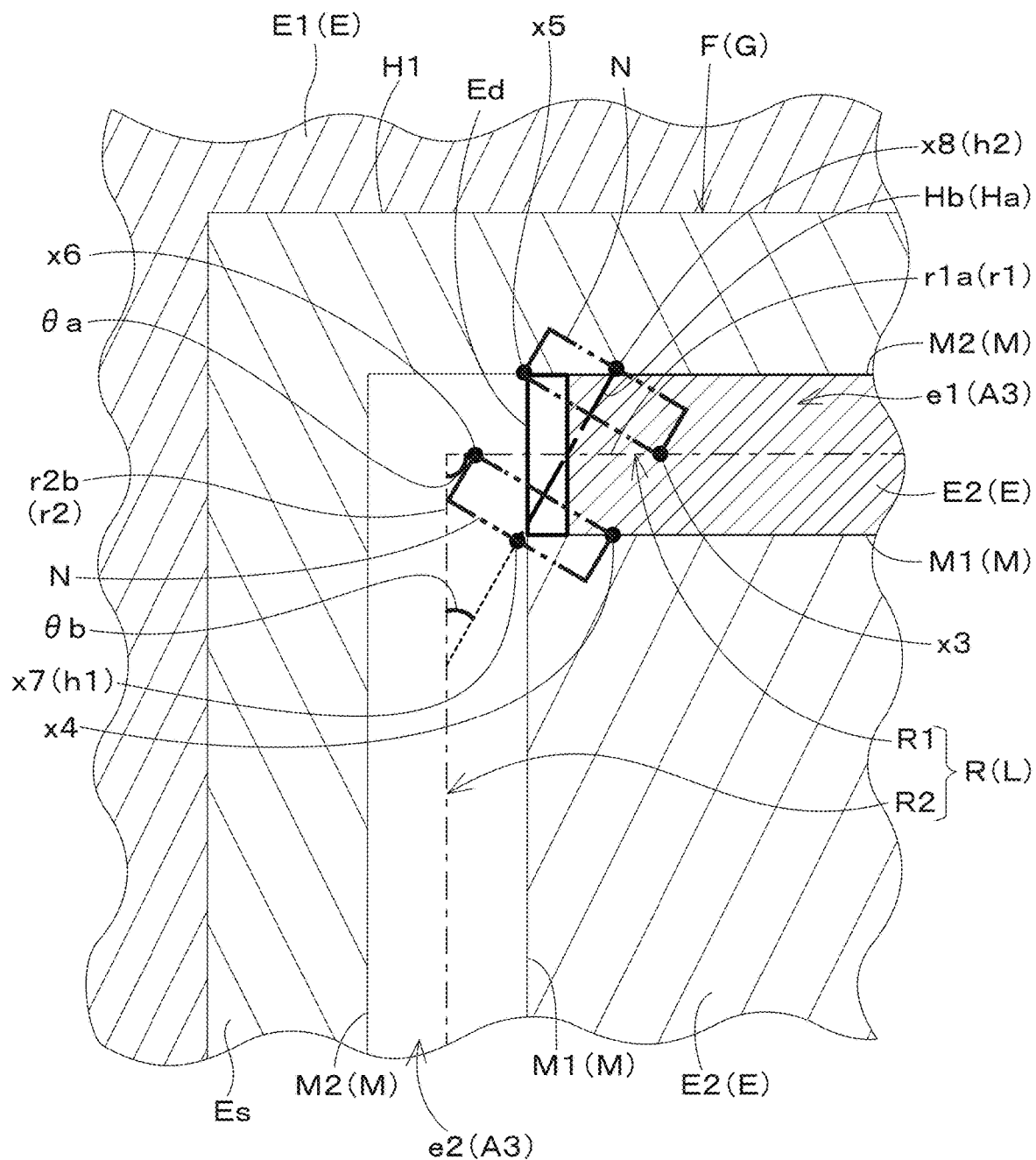
FIG. 11C is a first diagram illustrating the creation of an auxiliary line.

It is noted here that the creator 75b performs a correction (second correction) to create an auxiliary line Ha which extends from the ending portion r1a of the first line R1 (one of the lines R shortened by the changer 75a) to the starting portion r2b of the second line R2 (another line connected to the ending portion r1a of the first line R1) and which is inclined relative to the second line R2. The creator 75b can eliminate the unworked region Ed resulting from the correction by the changer 75a by performing the above correction, because the agricultural machine 1 travels the auxiliary line Ha and performs work (auxiliary work). Specifically, as shown in FIGS. 11H to 11J, the creator 75b creates a correction route portion H that includes the auxiliary line Ha, which has its starting point connected to the ending point of the first line R1, and that has its ending point connected to the starting point of the second line R2.

The creator 75b creates the auxiliary line Ha such that the auxiliary line Ha and the second line R2 define an acute angle. The creator 75b creates the auxiliary line Ha such that the angle (inclination angle) θb between the starting portion Hb of the auxiliary line Ha and the second line R2 is smaller than the angle θa between the first line R1 and the second line R2.

Figure 12B:
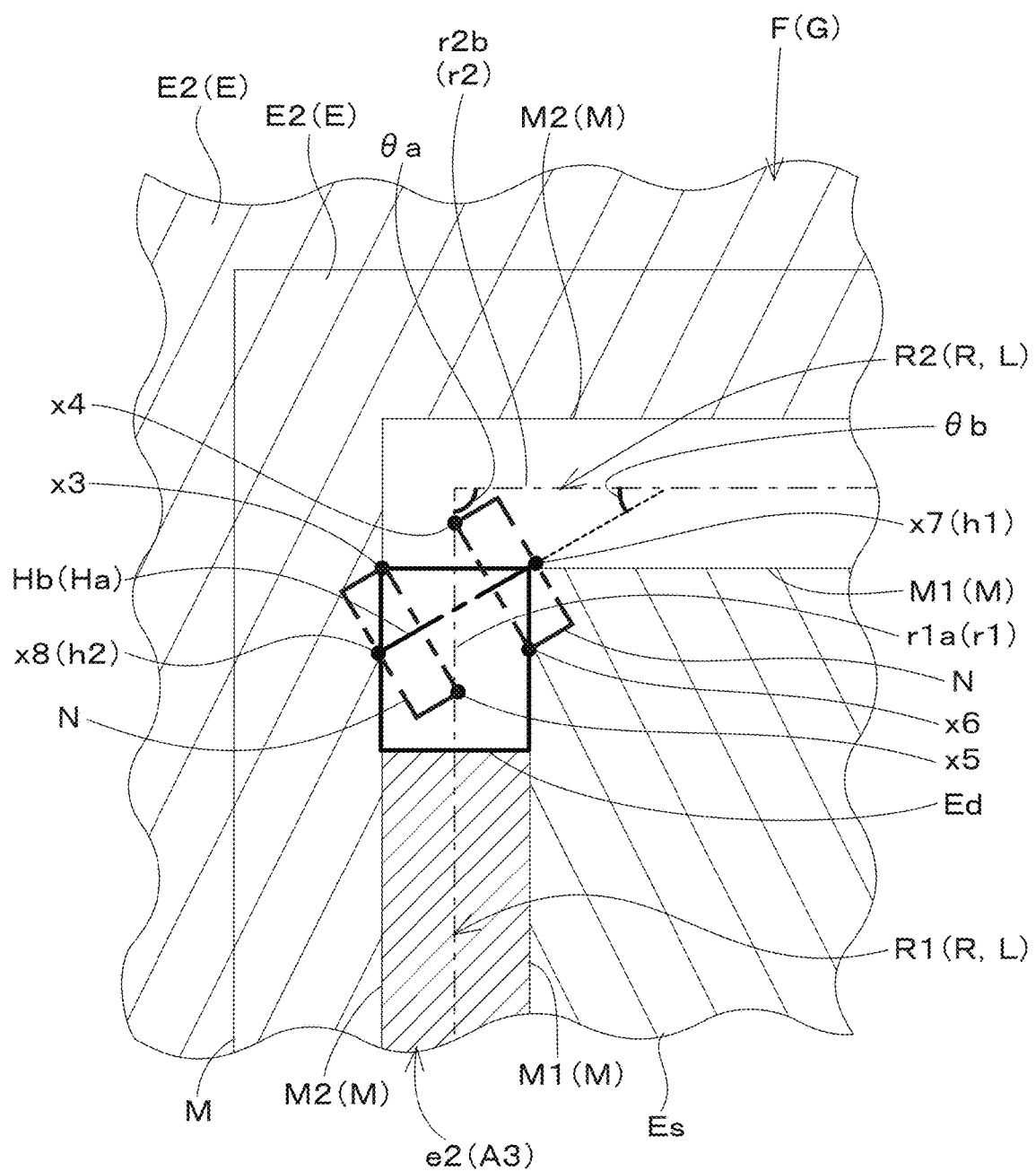
FIG. 12B is a second diagram illustrating the creation of an auxiliary line.
Figure 13B:
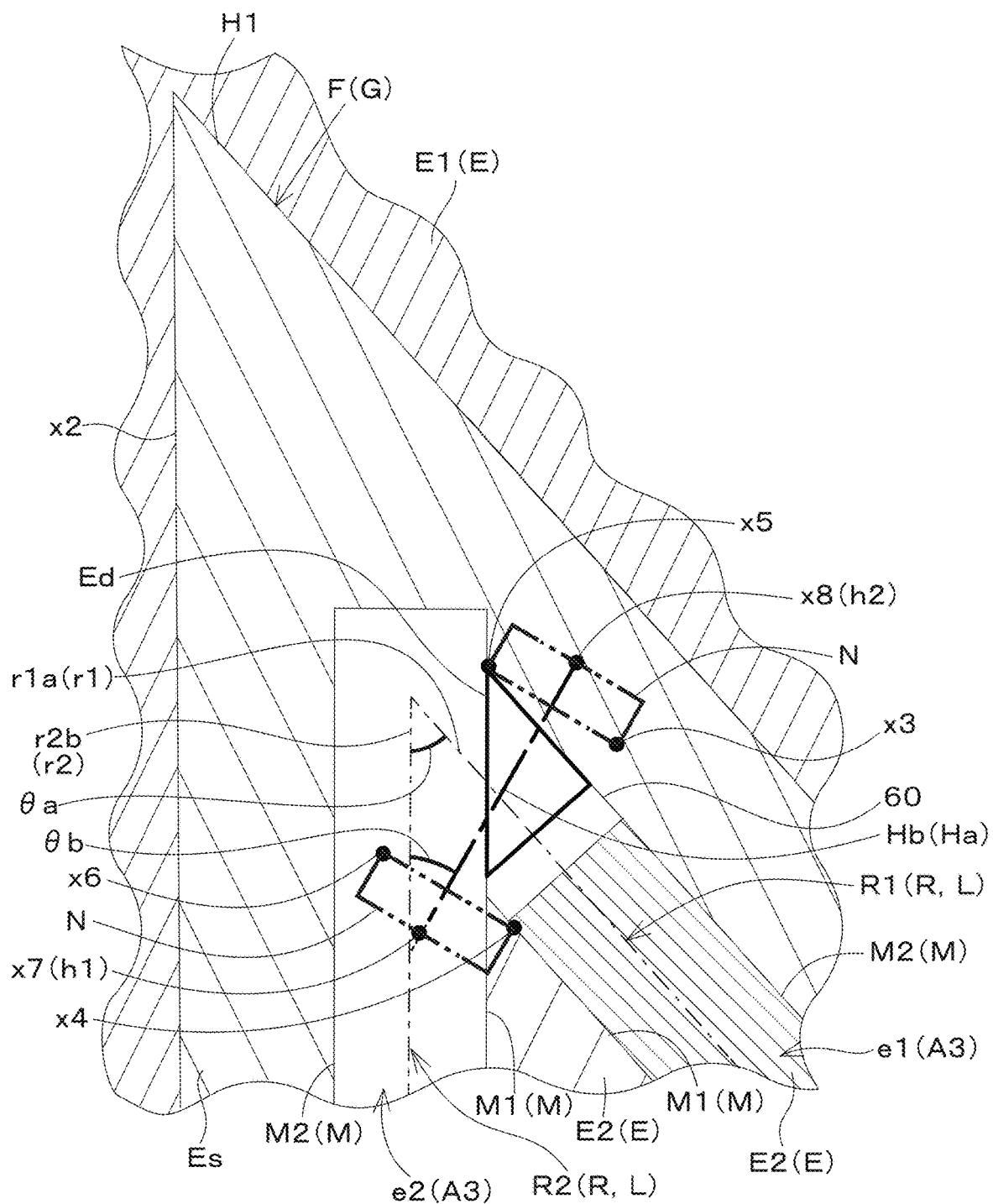
FIG. 13B is a third diagram illustrating the creation of an auxiliary line.
Figure 14B:
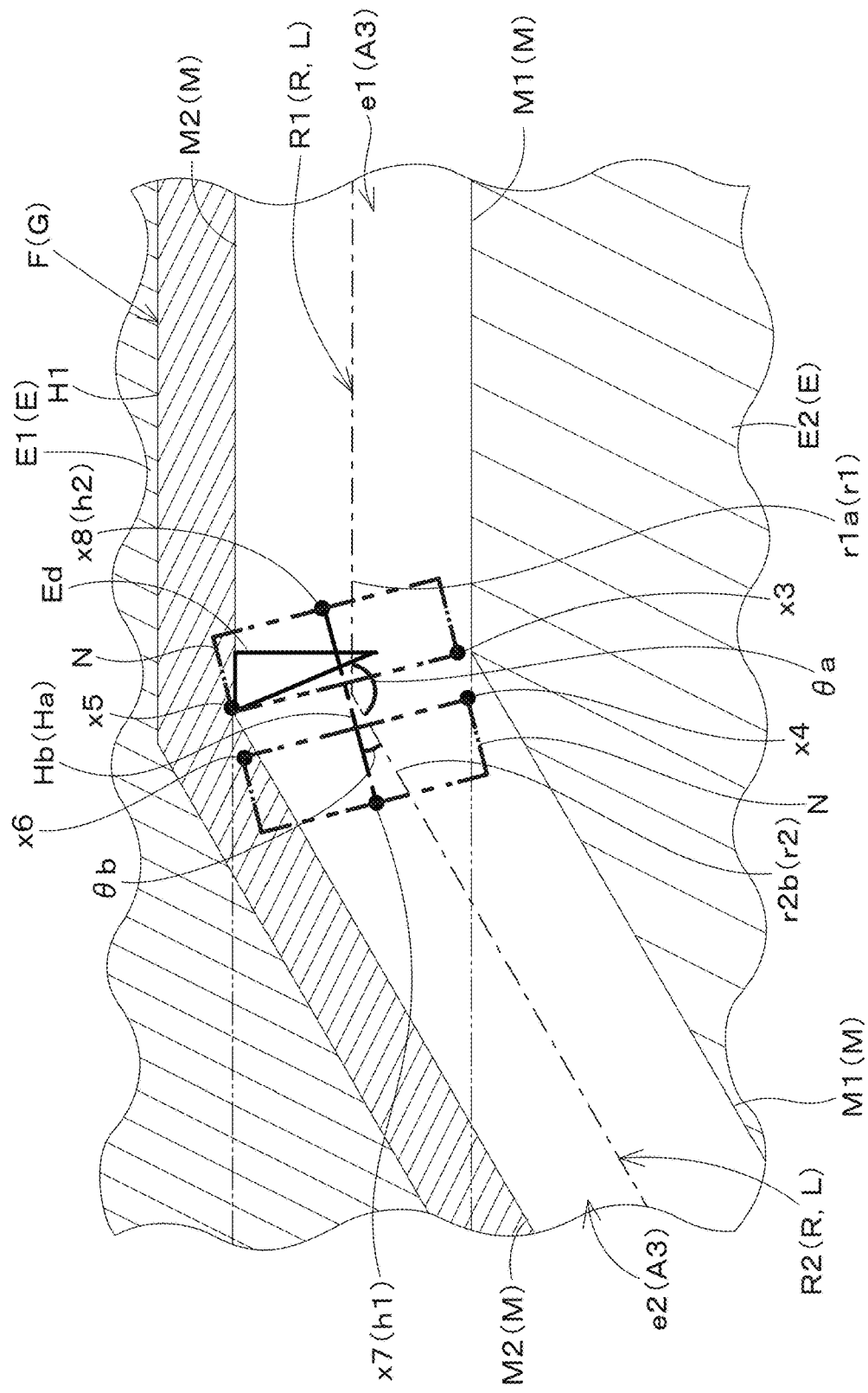
FIG. 14B is a fourth diagram illustrating the creation of an auxiliary line.

The creator 75b creates the auxiliary line Ha at different inclination angles θb between the case where the angle θa between the first line R1 and the second line R2 is an acute or right angle (θa≤90°) (see FIGS. 11C, 12B, and 13B) and the case where the angle θa between the first line R1 and the second line R2 is an obtuse angle (θa>90°) (see FIG. 14B). In the present example embodiment, if the angle θa between the first line R1 and the second line R2 is an acute or right angle (θa≤90°), the creator 75b creates the auxiliary line Ha such that the inclination angle θb is about 30°, for example. On the other hand, if the angle θa between the first and second lines R1 and R2 is an obtuse angle (θa>90°), the creator 75b creates the auxiliary line Ha such that the inclination angle θb is about 15°, for example.

The creator 75b creates the auxiliary line Ha such that the angle (inclination angle) θb between the starting portion Hb of the auxiliary line Ha and the second line R2 is smaller than the angle θa between the first line R1 and the second line R2. Note that if the first line R1 and the second line R2 define an obtuse angle (θa>90°), the creator 75b need only create the auxiliary line Ha such that the angle θb between the starting portion Hb of the auxiliary line Ha and the second line R2 is smaller than in the case where the first line R1 and the second line R2 define an acute or right angle ($\theta a \leq 90°$). The inclination angle $\theta b$ is not limited to about 30° and about 15°, for example. For example, the creator 75*b* may create the auxiliary line Ha such that the inclination angle $\theta b$ is about 25° if the angle $\theta a$ between the first line R1 and the second line R2 is an acute or right angle ($\theta a \leq 90°$), for example. The creator 75*b* may create the auxiliary line Ha such that the inclination angle $\theta b$ is about 10° if the angle $\theta a$ between the first line R1 and the second line R2 is an obtuse angle ($\theta a > 90°$), for example.

As shown in FIGS. 11H, 11I, and 11J, the auxiliary line Ha includes an auxiliary work line defining the starting portion Hb, and a transition line defining an ending portion Hc. In other words, the auxiliary work line Hb defines a starting portion of the auxiliary line Ha, and the transition line Hc defines an ending portion of the auxiliary line Ha.

The auxiliary work line Hb is at an acute angle $\theta b$ to the second line R2, and intersects the first line R1. The auxiliary work line Hb is mainly a line along which the agricultural machine 1 travels and the working device 60 performs work for the unworked region Ed. As shown in FIGS. 11C, 12B, 13B, and 14B, the creator 75*b* defines the starting point h2 and the ending point h1 of the auxiliary work line Hb such that the working range N when the working device 60 is located at the starting point h2 of the auxiliary work line Hb and the working range N when the working device 60 is located at the ending point h1 of the auxiliary work line Hb each overlap the unworked region Ed.

In the present example embodiment, as shown in FIGS. 11C, 12B, 13B, and 14B, the creator 75*b* defines the starting point h2 and the ending point h1 of the auxiliary work line Hb based on the third reference position x3, the fourth reference position x4, the fifth reference position x5, and the sixth reference position x6 defined by definer 74, the boundary M, and the inclination angle $\theta b$. Specifically, the creator 75*b* defines, as the starting point h2 of the auxiliary work line Hb, a position that corresponds to the eighth reference position x8 when (i) the reference position on the second boundary M2 that is opposite the ending point of the first boundary M1 coincides with the third reference position x3 or the fifth reference position x5 and (ii) a straight line passing through the seventh reference position x7 and the eighth reference position x8 is inclined at an inclination angle $\theta b$ to the second line R2.

On the other hand, as shown in FIGS. 11C, 12B, 13B, and 14B, the creator 75*b* defines, as the ending point h1 of the auxiliary work line Hb, the position corresponding to the seventh reference position x7 when (i) the fourth reference position x4 or the sixth reference position x6 is located on the first boundary M1 and (ii) the seventh reference position x7 is located on a straight line that passes through the starting point h2 and that is inclined at an inclination angle $\theta b$ to the second line R2.

Figure 16:
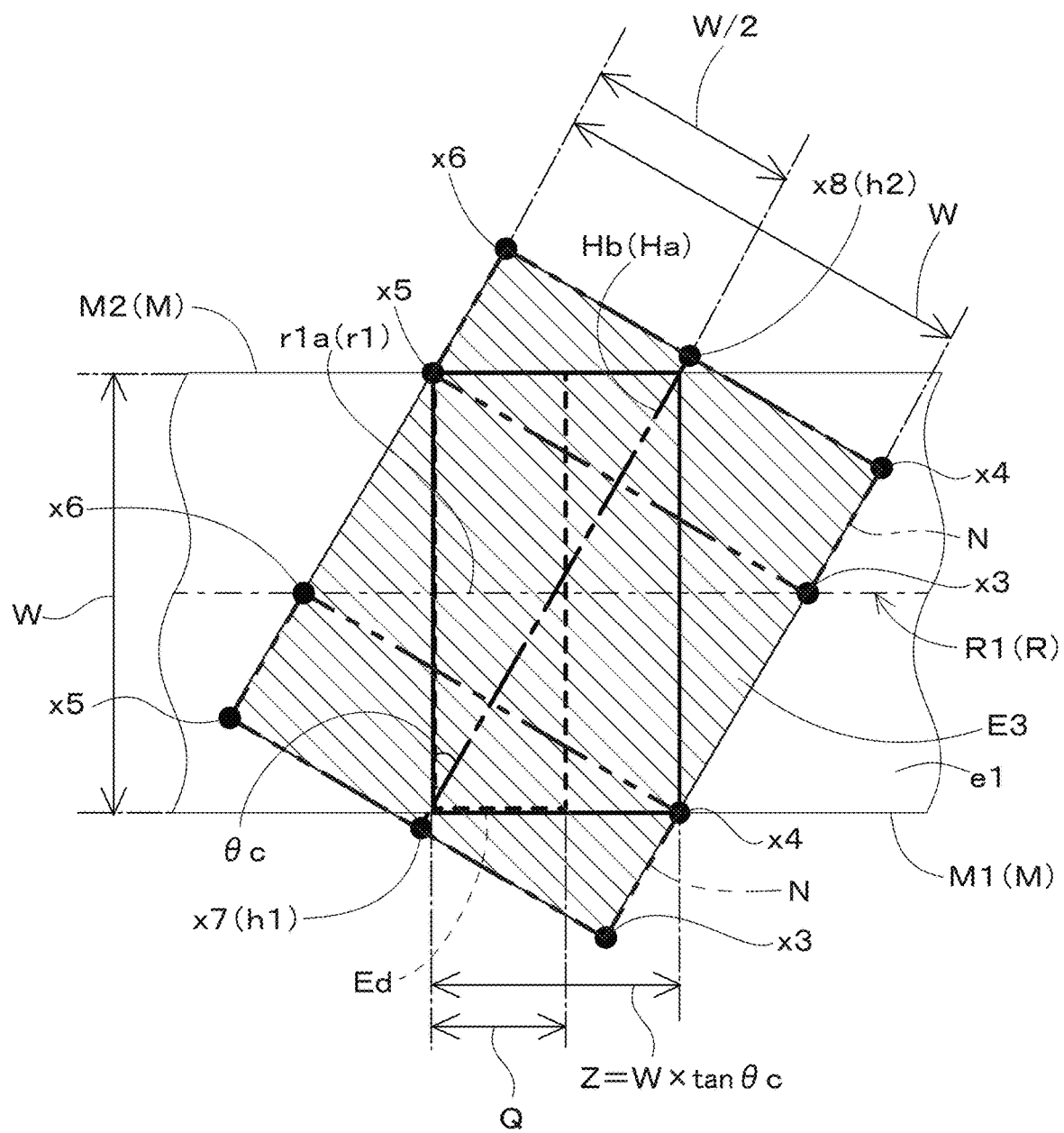

With this, the working range N when the working device 60 is located at the starting point h2 of the auxiliary work line Hb, and the working range N when the working device 60 is located at the ending point h1 of the auxiliary work line Hb, are located outward of the unworked region Ed. Therefore, as shown in FIG. 16, the unit work section corresponding to the auxiliary work line Hb (first auxiliary work section E3) covers the unworked region Ed. In other words, the creator 75*b* creates the auxiliary line Ha such that, when the agricultural machine 1 is located at the starting portion (auxiliary work line) Hb of the auxiliary line Ha, the working range N of the working device 60 and the starting portion of the unit work section e2 in which the working device 60 performs work along the second line R2 (second unit work section) overlap each other.

As shown in FIGS. 11H, 11I, and 11J, the transition line Hc extends from the ending point h1 of the auxiliary work line Hb and connects to the starting portion r2*b* of the second line R2. In other words, the transition line Hc is a line on which the agricultural machine 1, after the agricultural machine 1 travels along the auxiliary work line Hb and the working device 60 performs work for the unworked region Ed, moves from the auxiliary work line Hb to the second line R2. Specifically, the creator 75*b* connects the starting point h4 of the transition line Hc with the ending point h1 of the auxiliary work line Hb to create the transition line Hc such that the ending point h3 of the transition line Hc joins the second line R2. That is, the transition line Hc is a line that curves to extend along the starting portion r2 of the second line R2.

Thus, as shown in FIGS. 11C, 12B, 13B, and 14B, the creator 75*b* creates the auxiliary line Ha such that the starting portion (auxiliary work line) Hb of the auxiliary line Ha intersects the ending portion r1*a* of the first line R1 and extends straight from the ending portion r1 of the first line R1, and that the ending portion (transition line) Hc of the auxiliary line Ha curves to extend along the starting portion r2*b* of the second line R2.

Note that when the agricultural machine 1 travels on the transition line Hc and the working device 60 reaches the ending point h3 of the transition line Hc, the automatic-travel controller 40*a* stops the agricultural machine 1 and brings the linkage 30 from the working posture into the non-working posture. In other words, the linkage is in the working posture while the agricultural machine 1 travels on the transition line Hc, and therefore the unit work section (second auxiliary work section) E4 that corresponds to the transition line Hc is created in the agricultural field G.

Figure 11D:
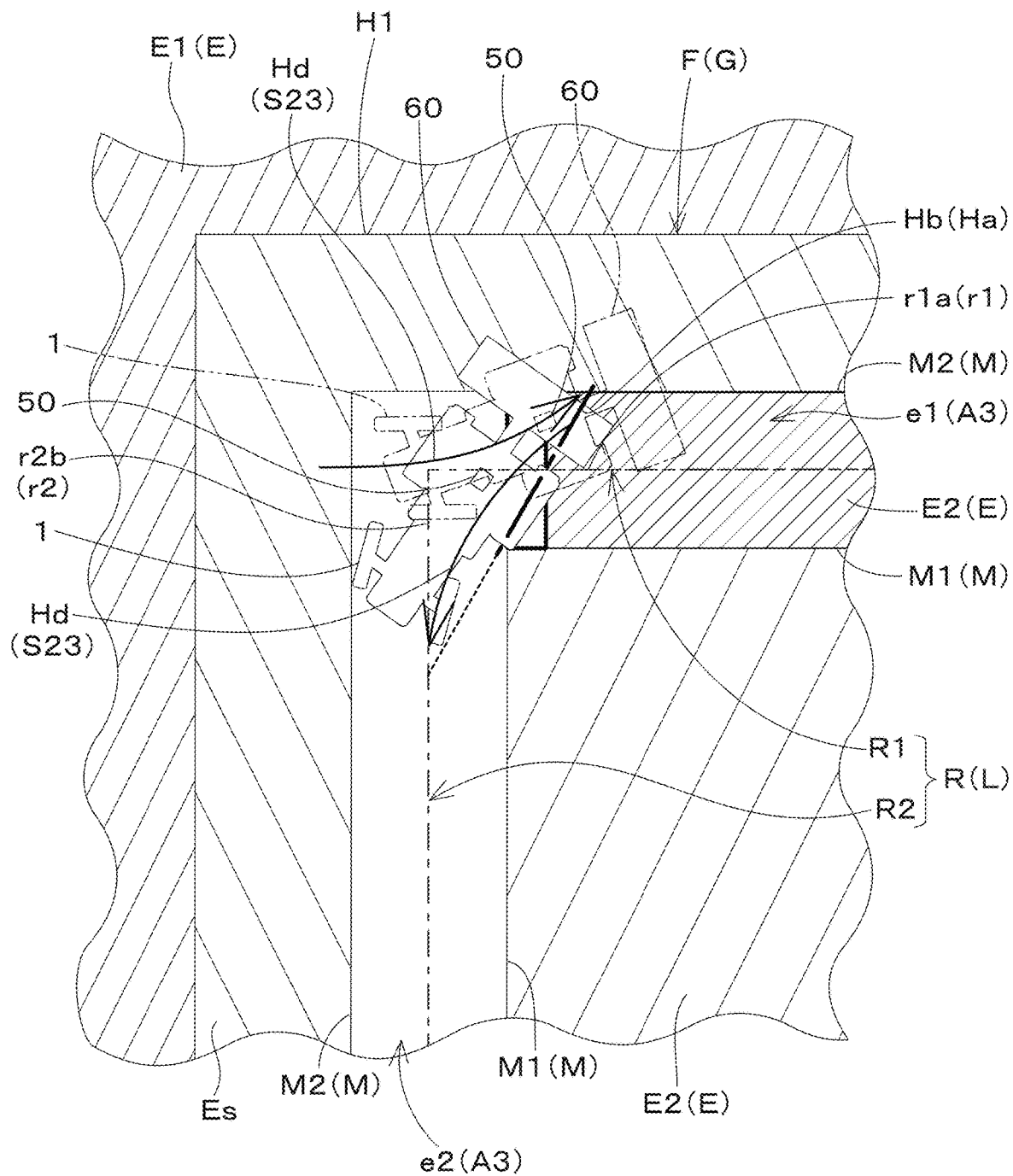
FIG. 11D illustrates an agricultural machine traveling on a connecting line.

As shown in FIG. 11D, in the present example embodiment, the creator 75*b* creates, in addition to the auxiliary line Ha, a connecting line Hd that connects the ending portion r1 (work ending point p1) of the first line R1 and the starting portion (auxiliary work line) Hb of the auxiliary line Ha, as a portion of the correction route portion H. The connecting line Hd is a line on which the agricultural machine 1 changes its direction and moves from the first line R1 to the second line R2, and the working device 60 reaches the starting point h2 of the auxiliary work line Hb. In the present example embodiment, at the starting point of the connecting line Hd, the agricultural machine 1 performs a turn. Specifically, at the starting point of the connecting line Hd, the agricultural machine 1 performs a multi-point turn and moves to the starting point h2 of the auxiliary work line Hb.

Note that, in the above mentioned example embodiment, the case where the creator 75*b* creates the auxiliary line Ha and the connecting line Hd as the correction route portion H, and creates the auxiliary work line Hb and the transition line Hc as the auxiliary line Ha, is discussed. However, the creator 75*b* need only create the portion of the auxiliary line Ha in the above mentioned example embodiment that corresponds to the auxiliary work line Hb. The creator 75*b* may be configured to not create the transition line Hc or the connecting line Hd in advance, and the automatic-travel controller 40*a* may be configured to control the traveling device 4 to autonomously travel from the ending portion r1*a* of the first line R1 to the starting point h2 of the auxiliary work line Hb, and from the ending point h1 of the auxiliary work line Hb to the second line R2.

Figure 15:
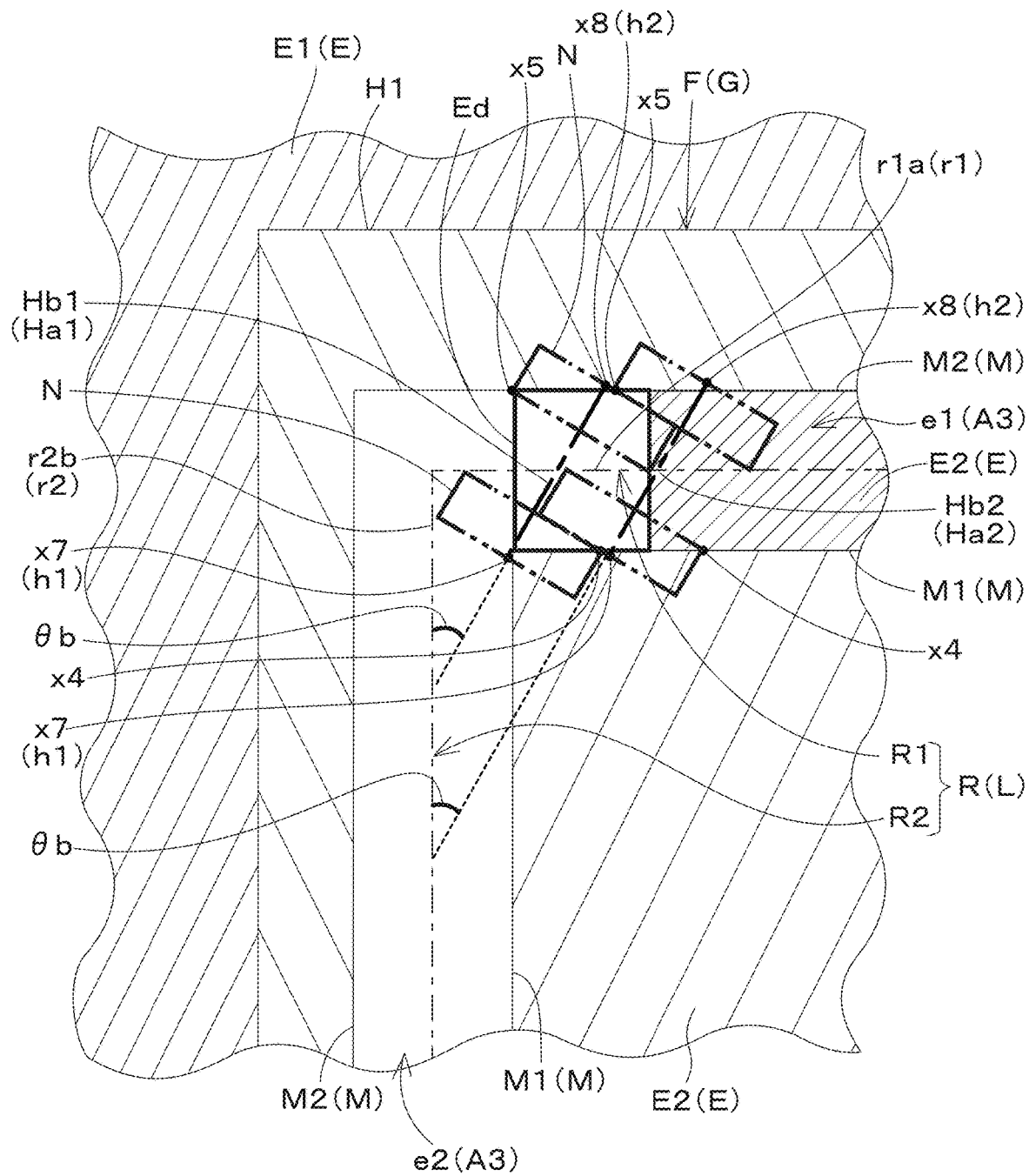
FIG. 15 illustrates the creation of a plurality of auxiliary lines.

As shown in FIG. 15, if the shortening amount Q by which a line is shortened by the changer 75*a* is equal to or greater than a predetermined value, the creator 75b creates a plurality of adjacent auxiliary lines Ha. As shown in FIG. 16, in the present example embodiment, if the amount by which the changer 75a moves the work ending point p1 toward the starting portion r2 (work starting point p2) of the line (shortening amount Q), that is, the dimension of the unworked region Ed in the direction of extension of the first line R1 resulting from the correction by the changer 75a, is more than the calculated characteristic length Z (Q>Z=W× tan θc) which is the product of the working width W and the tangent of the angle θc between the starting portion r2 (auxiliary work line Hb) of the auxiliary line Ha and the first line R1, the creator 75b creates a plurality of adjacent auxiliary lines Ha such that the sum of the characteristic lengths Z regarding the auxiliary lines Ha exceeds the shortening amount Q.

The creator 75b creates the auxiliary line Ha closer to the ending portion r1 (work ending point p1) of the first line R1 first and then creates auxiliary line(s) Ha closer to the starting portion r2 (work starting point p2 side). The following is an example in which the creator 75b creates two auxiliary lines Ha, and, for the convenience of description, the auxiliary line Ha closer to the ending portion r1 of the first line R1 if referred to as the auxiliary line Ha1, and the auxiliary line Ha closer to the starting point is referred to as the auxiliary line Ha2. The auxiliary work line Hb of the first auxiliary line Ha1 is referred to as the first auxiliary work line Hb1 and the auxiliary work line Hb of the second auxiliary line Ha2 is referred to as the second auxiliary work line Hb2. Note that, since the creator 75b creates the transition lines Hc corresponding to the first auxiliary work line Hb1 and the second auxiliary work line Hb2 in the same manner as described above, the creation of the transition lines Hc is not described here.

First, the creator 75b defines, as the starting point h2 of the first auxiliary work line Hb1, a position corresponding to the eighth reference position x8 when (i) the position of the second boundary M2 opposite the ending point of the first boundary M1 coincides with the third reference position x3 or the fifth reference position x5, and (ii) a straight line passing through the seventh reference position x7 and the eighth reference position x8 is inclined at an inclination angle θb to the second line R2.

As shown in FIG. 15, the creator 75b defines the position corresponding to the seventh reference position x7 as the ending point h1 of the first auxiliary work line Hb1 when (i) the fourth reference position x4 or the six reference position x6 is located on the boundary M1 and (ii) the seventh reference position x7 is located on a straight line that passes through the starting point h2 of the auxiliary work line Hb1 and that is inclined at an inclination angle θb to the second line R2.

Next, the creator 75b defines the position corresponding to the eighth reference position x8 as the starting point h2 of the second auxiliary work line Hb2 when, assuming that the intersection of the rear edge of the working range N at the starting point h2 of the first auxiliary work line Hb1 (the straight line passing through the fourth reference position x4, the sixth reference position x6, and the eighth reference position x8) and the second boundary M2 is a reference point, (i) the intersection coincides with the third reference position x3 or the fifth reference position x5 and (ii) a straight line passing through the seventh reference position x7 and the eight reference position x8 is inclined at an inclination angle θb to the second line R2.

As shown in FIG. 15, the creator 75b defines the position corresponding to the seventh reference position x7 as the ending point h1 of the second auxiliary work line Hb2 when (i) the fourth reference position x4 or the sixth reference position x6 is located on the first boundary M1 and (ii) the seventh reference position x7 is located on a straight line that passes through the starting point h2 of the auxiliary work line Hb2 and that is inclined at an inclination angle θb to the second line R2.

Figure 17A:
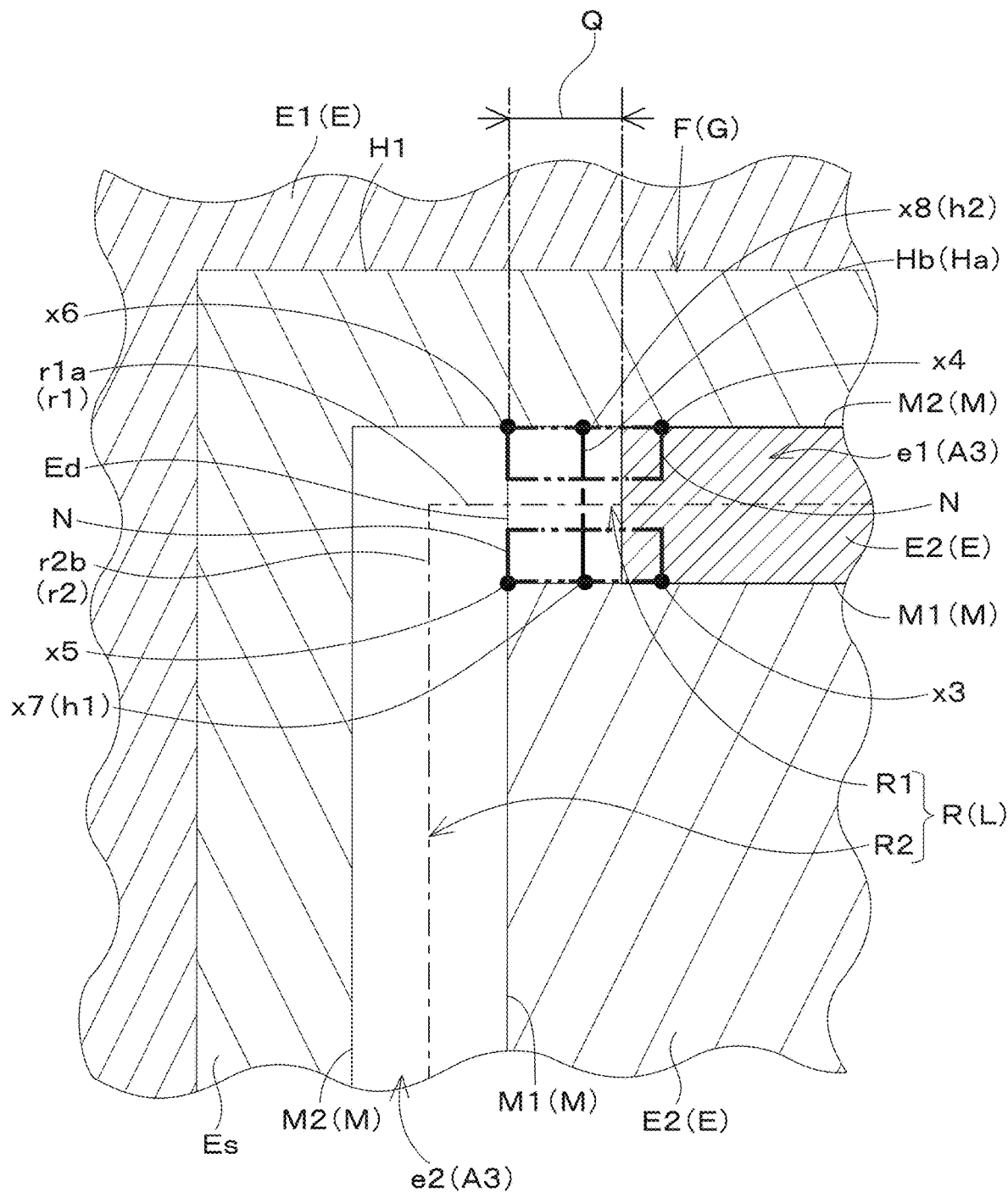
FIG. 17A illustrates the creation of an auxiliary line according to a variation.
Figure 17B:
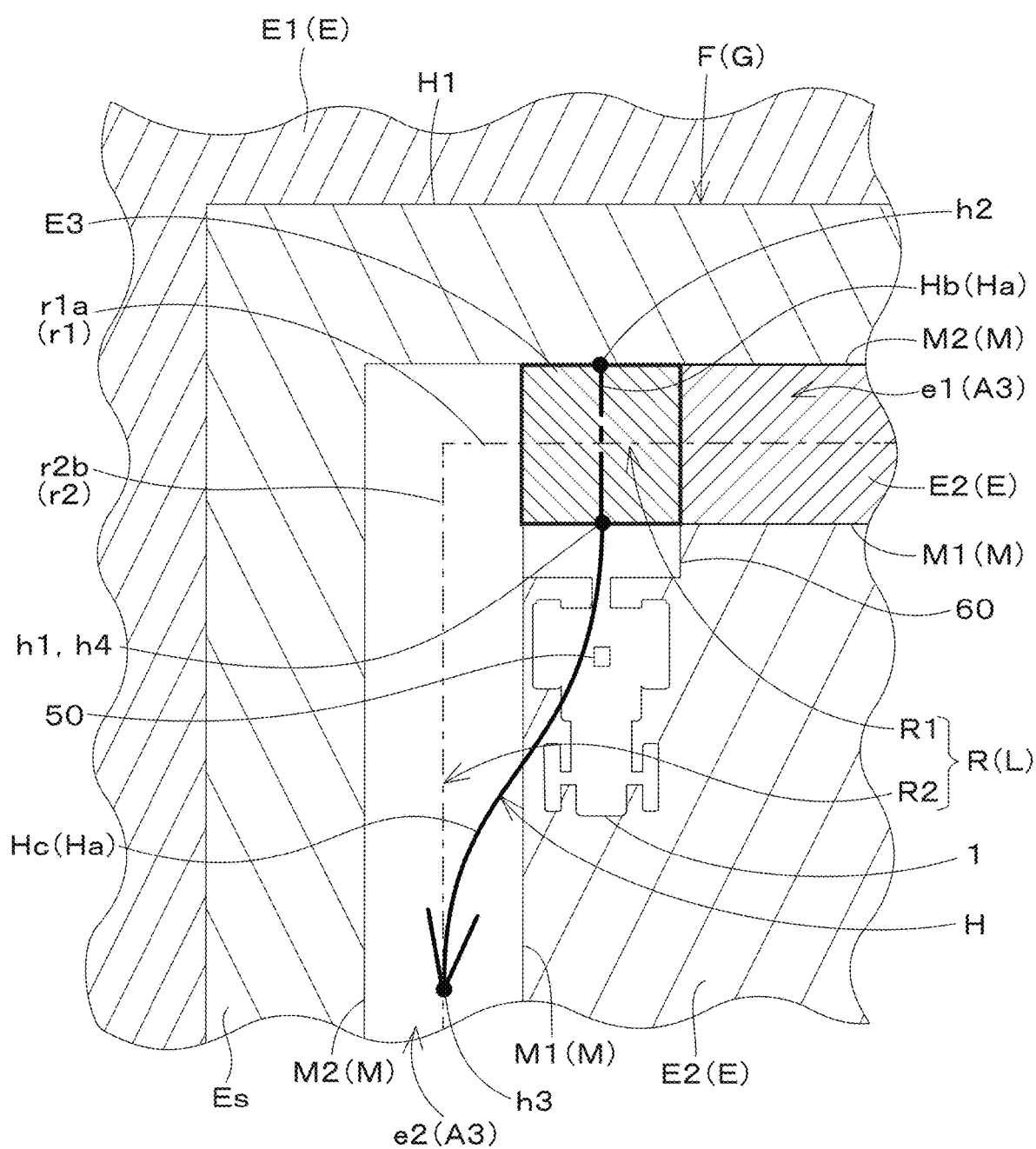
FIG. 17B illustrates an agricultural machine traveling on an auxiliary line according to a variation.

Note that in the example embodiment described above, an example case in which the auxiliary line Ha includes the auxiliary work line Hb and the transition line Hc is described. However, the auxiliary line Ha created by the creator 75b need only be a line extending from the ending portion r1a of the first line R1 (which is one of the lines R shortened by the changer 75a) to the starting portion r2b of the second line R2. For example, a configuration in which only the auxiliary work line Lb in the above example embodiment is created may be used. As shown in FIG. 17A, the creator 75b may create an auxiliary line Ha such that the starting portion of the auxiliary line Ha is perpendicular or substantially perpendicular to the ending portion r1 of the first line R1. As illustrated in FIG. 17B, an intermediate portion of the auxiliary line Ha curves toward the starting portion r2 of the second line R2, and the ending portion of the auxiliary line Ha curves to extend along the second line R2.

Specifically, in a variation shown in FIGS. 17A and 17B, the auxiliary line Ha includes an auxiliary work line Hb which defines a starting portion, and a transition line Hc which defines the intermediate portion and ending portion. In this variation, the auxiliary work line Hb is perpendicular or substantially perpendicular to the first line R1.

As shown in FIG. 17B, the creator 75b defines the starting point h2 of the auxiliary work line Hb at the position corresponding to the eighth reference position x8 when (i) the position on the second boundary M2 that corresponds to the ending point of first boundary M1 coincides with the reference position x4 or the reference position x6 and (ii) the rear edge of the working range N (the straight line passing through the reference position x4, the reference position x6 and the reference position x8) is located on the second boundary M2.

On the other hand, the creator 75b defines the starting point h2 of the auxiliary work line Hb at the position corresponding to the seventh reference position x7, when (i) the position corresponding to the ending point of the first boundary M1 coincides with the third reference position x3 or the fifth reference position x5, and (ii) the front edge of the working range N (the straight line passing through the third reference position x3, the fifth reference position x5 and the seventh reference position x7) coincides with the first boundary M1. With this, the worked region when the agricultural machine 1 is located at the starting point h2 of the auxiliary work line Hb, and the worked region when the agricultural machine 1 is located at the ending point h1 of the auxiliary work line Hb, are located outward of the unworked region Ed. Therefore, the unit work section (first auxiliary work section E3) corresponding to the auxiliary work line Hb covers the unworked region Ed.

The creator 75b connects the starting point h4 of the transition line Hc with the ending point h1 of the auxiliary work line Hb to create the transition line Hc such that the ending point h3 of the transition line Hc joins the second line R2. As shown in FIG. 17B, the transition line Hc is a line that extends from the ending point h1 of the auxiliary work line Hb parallel to the second line R2, curves toward the second line R2 from an intermediate portion, and curves to extend along the second line R2.

Figure 18:
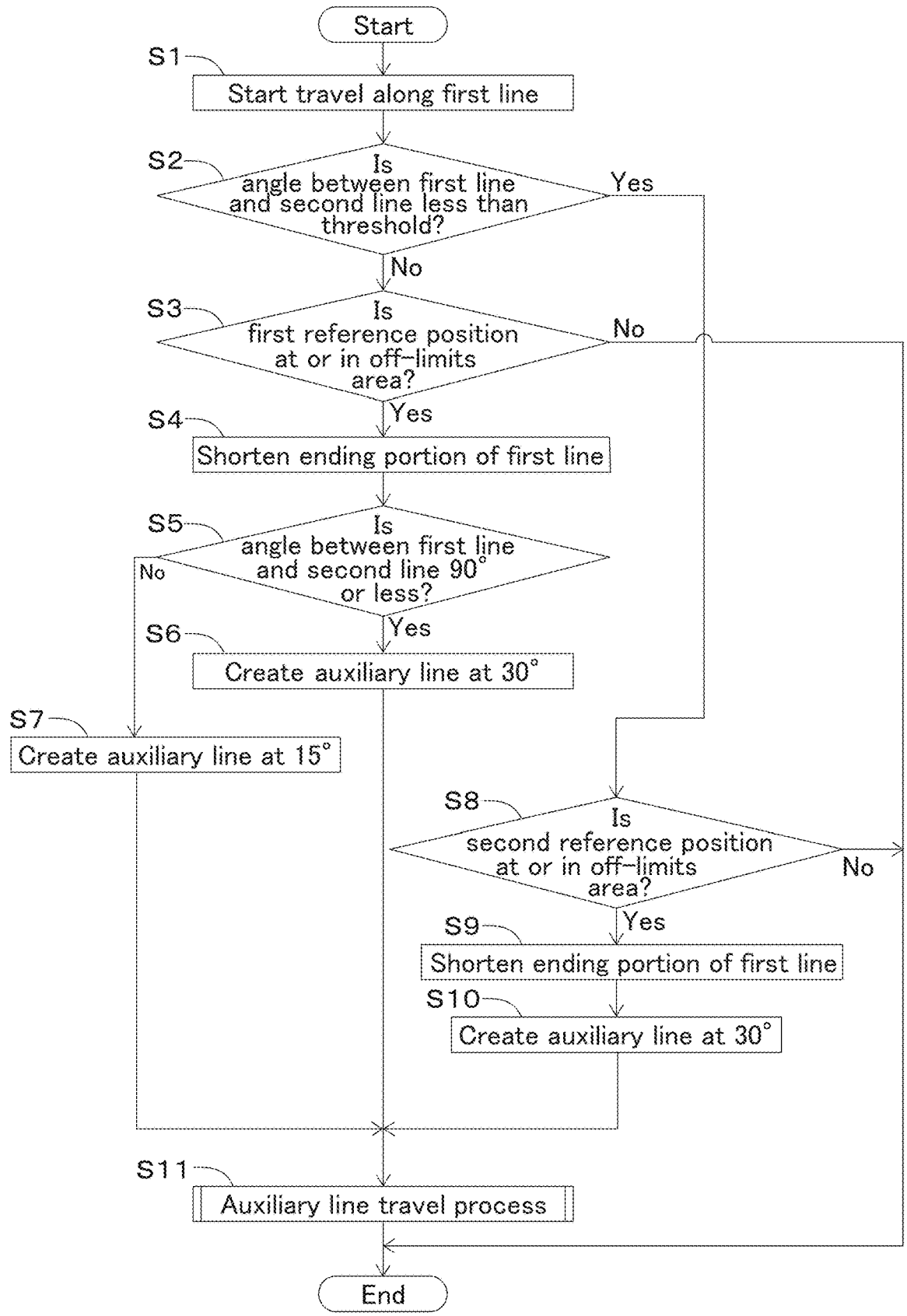
FIG. 18 illustrates a flow of steps in which a corrector corrects a travel route in the first example embodiment of the present invention.
Figure 19:
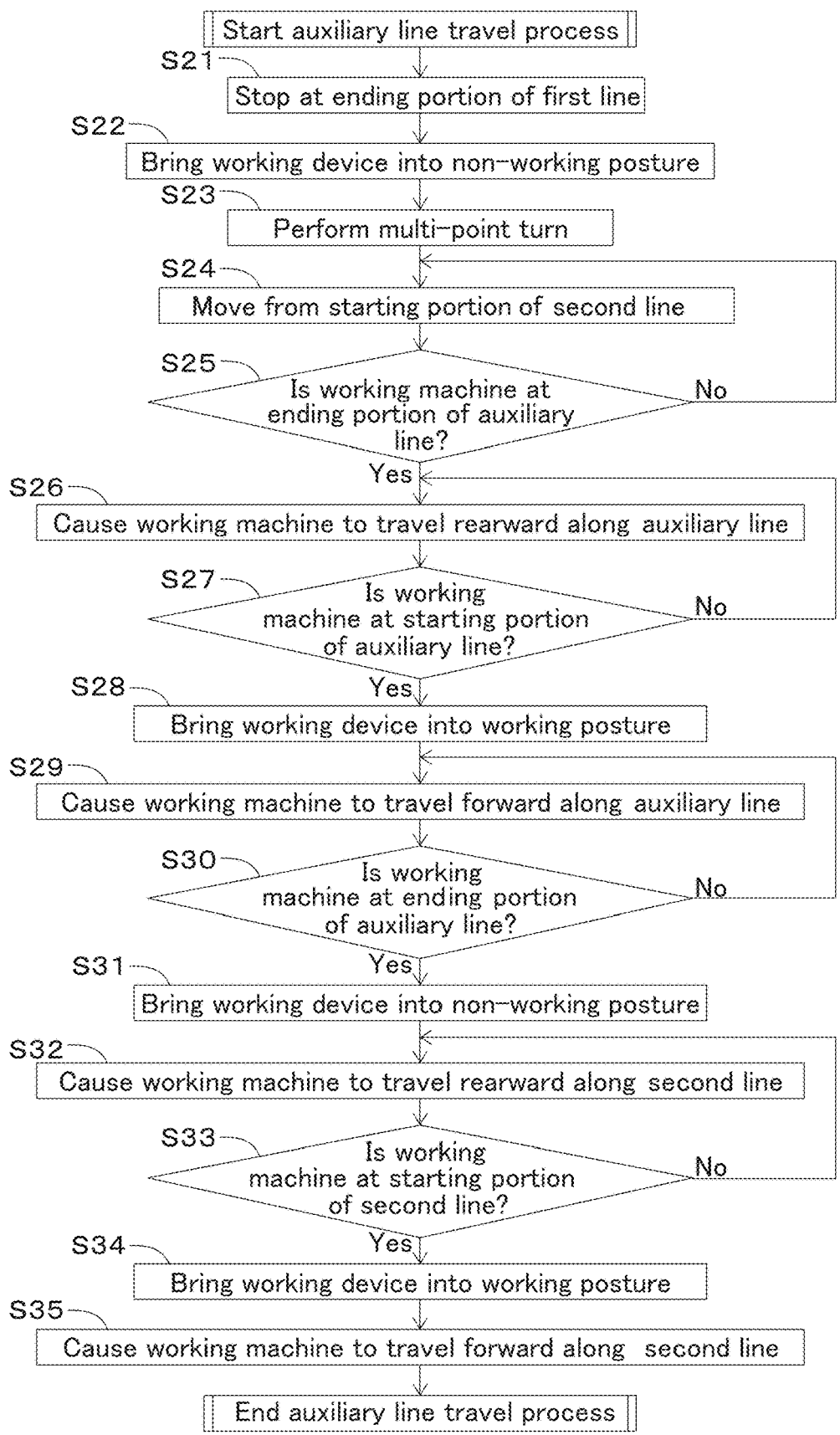
FIG. 19 illustrates a flow of steps of an auxiliary line travel process according to the first example embodiment of the present invention.

The following description discusses, with reference to mainly FIG. 18, the flow of steps in which, while the agricultural machine 1 is traveling along the travel route L, the travel assistance system S for the agricultural machine 1 corrects the travel route L, and the agricultural machine 1 travels based on the corrected travel route L. Note that in the following description, for convenience of description, an example case in which the agricultural machine 1 travels on the first line R1 then moves to the second line R2 is discussed.

First, as shown in FIG. 11A, the automatic-travel controller 40a causes the agricultural machine 1 to travel based on the travel route L created by the route creator 57e (S1). When the automatic-travel controller 40a controls the agricultural machine 1 and the agricultural machine 1 starts traveling on the first line R1 (S1), the changer 75a checks whether the angle θa between the first line R1 and the second line R2 is less than a threshold value (e.g., about 70°) (S2). Specifically, the changer 75a detects the first line R1 of a plurality of lines R on which the agricultural machine 1 is located and the second line R2 which is the next line, based on the travel route L acquired by the first acquirer 71 and the vehicle body position VP acquired by the position acquirer 57a. After the changer 75a detects the first line R1 and the second line R2 from the plurality of lines R, the changer 75a calculates the angle between the first line R1 and the second line R2, and, based on the threshold acquired from the display storing unit 58, the changer 75a checks whether the angle θa between the first line R1 and the second line R2 is less than the threshold (e.g., about 70°).

If the changer 75a determines that the angle θa between the first and second lines R1 and R2 is not less than the threshold (e.g., about 70°) (S2, No), the changer 75a determines whether the first reference position x1 is located on the boundary M of the off-limits area E or in the off-limits area E (S3). Specifically, the changer 75a determines whether the first reference position x1 is located at the boundary M of the or in the off-limits area E based on the vehicle body position VP acquired by the position acquirer 57a, the relative distance between the vehicle body position VP and the first reference position x1 defined by the definer 74, and the position information of the off-limits area E acquired by the third acquirer 73.

If the changer 75a determines that the first reference position x1 is located at the boundary M of the off-limits area E or in the off-limits area E (S3, Yes), the changer 75a makes a correction to shorten the ending portion r1a of the first line R1 (S4). Specifically, the changer 75a moves the work ending point p1 of the first line R1 to the seventh reference position x7 in a direction toward the starting portion (toward the work starting point p2) of the first line R1, at the location where it was determined that the first reference position x1 was located at the boundary M of the off-limits area E or in the off-limits area E. With this, the vehicle body position VP corresponding to the work ending point p1 corrected by the changer 75a is moved from the vehicle body position VP corresponding to the work ending point p1 before the correction, in the direction toward the starting portion (toward the work starting point p2) of the first line R1, by the same amount as the amount of movement of the work ending point p1.

After the changer 75a makes a correction to shorten the ending portion r1a of the first line R1 (S4), the creator 75b determines whether the angle θa between the first line R1 and the second line R2 is an acute or right angle (≤90°) (S5). In the present example embodiment, the creator 75b determines whether the angle θa between the first line R1 and the second line R2 is an acute angle or a right angle (≤90°) based on the angle between the first line and the second line R2 calculated by the changer 75a.

If the creator 75b determines that the angle θa between the first line R1 and the second line R2 is an acute or right angle (≤90°) (S5, Yes), the creator 75b creates an auxiliary line Ha such that the angle (inclination angle) Ob between the starting portion (auxiliary work line) Hb of the auxiliary line Ha and the second line R2 is about 30° (S6), for example. Specifically, the creator 75b defines the starting portion r2 and the ending portion r1 of the auxiliary work line Hb based on the third reference position x3, the fourth reference position x4, the fifth reference position x5, and the sixth reference position x6 defined by the definer 74, the boundary M, and the inclination angle θb, and creates the auxiliary work line Hb. The creator 75b also connects the starting portion r2 of the transition line Hc with the ending portion r1 of the auxiliary work line Hb to create the transition line Hc such that the ending portion r1 of the transition line Hc joins the second line R2. In addition to the auxiliary line Ha, the creator 75b creates a connecting line Hd connecting the starting portion r2 of the auxiliary line Ha to the ending portion r1 (work ending point p1) of the first line R as a portion of the correction route portion H.

On the other hand, if the creator 75b determines that the angle θa between the first line R1 and the second line R2 is an obtuse angle)(>90° (S5, No), the creator 75b creates an auxiliary line La such that the angle (inclination angle) Ob between the starting portion (auxiliary work line) Hb of the auxiliary line Ha and the second line R2 is about 15° (S7), for example. The creator 75b also connects the starting point h4 of the transition line Hc with the ending point h1 of the auxiliary work line Hb to create the transition line Hc such that the ending point h3 of the transition line Hc joins the second line R2. Furthermore, the creator 75b creates, in addition to the auxiliary line Ha, a connecting line Hd which connects the ending portion r1a of the first line R1 to the starting point h2 of the auxiliary work line Hb as a portion of the correction route portion H.

If the changer 75a determines in S2 that the angle θa between the first line R1 and the second line R2 is less than the threshold (e.g., about 70°) (S2, Yes), the changer 75a determines whether the second reference position x2 is located at the boundary M of the off-limits area E or in the off-limits area E (S8). Specifically, the changer 75a determines whether the second reference position x2 is located at the boundary M of the off-limits area E or in the off-limits area E based on the vehicle body position VP acquired by the position acquirer 57a, the relative distance between the vehicle body position VP and the second reference position x2 defined by the definer 74, and the position information of the off-limits area E acquired by the third acquirer 73.

If the changer 75a determines that the second reference position x2 is located at the boundary M of the off-limits area E or in the off-limits area E (S8, Yes), the changer 75a makes a correction to shorten the ending portion r1a of the first line R1 (S9). Specifically, the changer 75a moves the work ending point p1 of the first line R1 to the seventh reference position x7 in a direction toward the starting portion (toward the work starting point p2) of the first line R1, at the location where it was determined that the second reference position x2 was located at the boundary M of the off-limits area E or in the off-limits area E.

After the changer 75a makes the correction to shorten ending portion r1a of the first line R1 (S9), the creator 75b creates an auxiliary line Ha such that the angle (inclination angle) Ob between the starting portion (auxiliary work line)

Hb of the auxiliary line Ha and the second line R2 is 30° (S10). The creator 75b also connects the starting point h4 of the transition line Hc with the ending point h1 of the auxiliary work line Hb to create the transition line Hc such that the ending point h3 of the transition line Hc joins the second line R2. Furthermore, the creator 75b creates, in addition to the auxiliary line Ha, a connecting line Hd that connects the ending portion r1 of the first line R1 to the starting point h2 of the auxiliary work line Hb, as a portion of the correction route portion H.

After the creator 75b creates the auxiliary line Ha in S6, S7, or S10, the travel assistance system S for the agricultural machine 1 transitions to the auxiliary line travel process (S11).

On the other hand, if the changer 75a determines in S3 that the first reference position x1 is not located at the boundary M of the off-limits area E or in the off-limits area E (S3, No) or that the second reference position x2 is not located at the boundary M of the off-limits area E or in the off-limits area E (S8, No), the changer 75a does not change the travel route L and the travel assistance system S does not transition to the auxiliary line travel process.

The following description discusses the auxiliary line travel process with reference to mainly FIGS. 11A to 11H and 19. Once the travel assistance system S for the agricultural machine 1 has transitioned to the auxiliary line travel process, the automatic-travel controller 40a performs control of the traveling device 4 based on the travel route L corrected by the corrector 75. In other words, the controller 40 controls the traveling device 4 based on the travel route L corrected by the corrector 75. In the present example embodiment, the automatic-travel controller 40a controls the steering and vehicle speed of the traveling device 4 based on the travel route L corrected by the corrector 75 and the position of the agricultural machine 1 detected by the position detector 50. Specifically, as shown in FIG. 11B, the automatic-travel controller 40a stops the traveling device 4 at the ending portion r1 of the first line R1 to stop the agricultural machine 1 (S21).

The automatic-travel controller 40a, after stopping the agricultural machine 1 (S21), controls the lift cylinder(s) 31 to bring the linkage 30 from the working posture into non-working posture (S22). The automatic-travel controller 40a, after bringing the linkage 30 into the non-working posture (S22), controls the traveling device 4 to move it from the ending portion r1a of the first line R1 to the connecting line Hd (S23), as shown in FIG. 11D. In other words, the automatic-travel controller 40a causes the agricultural machine 1 to perform a multipoint turn to move from the ending portion r1a of the first line R1 to the starting portion r2b of the second line R2.

Figure 11E:
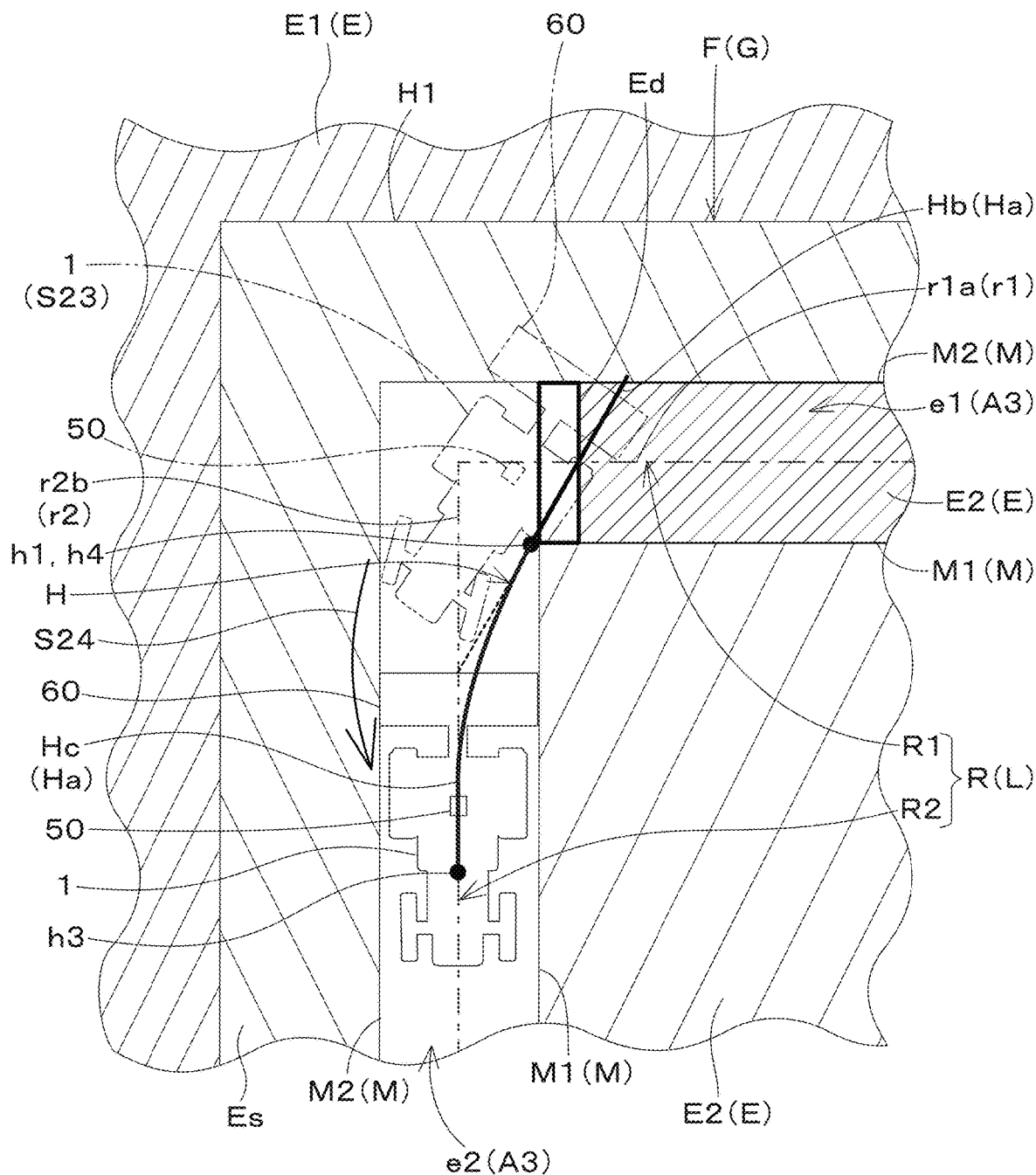
FIG. 11E illustrates an agricultural machine traveling on a connecting line and reaching a second line.

The automatic-travel controller 40a, after moving the agricultural machine 1 from the ending portion r1a of the first line R1 to the starting portion r2b of the second line R2 (S23), controls the traveling device 4 to move it from the starting portion r2b of the second line R2 to the ending portion (transition line) Hc of the auxiliary line Ha (S24), as shown in FIG. 11E. Specifically, the automatic-travel controller 40a moves the agricultural machine 1 to the ending point h3 of the transition line Hc, i.e., the intersection of the transition line Hc and the second line R2.

Figure 11F:
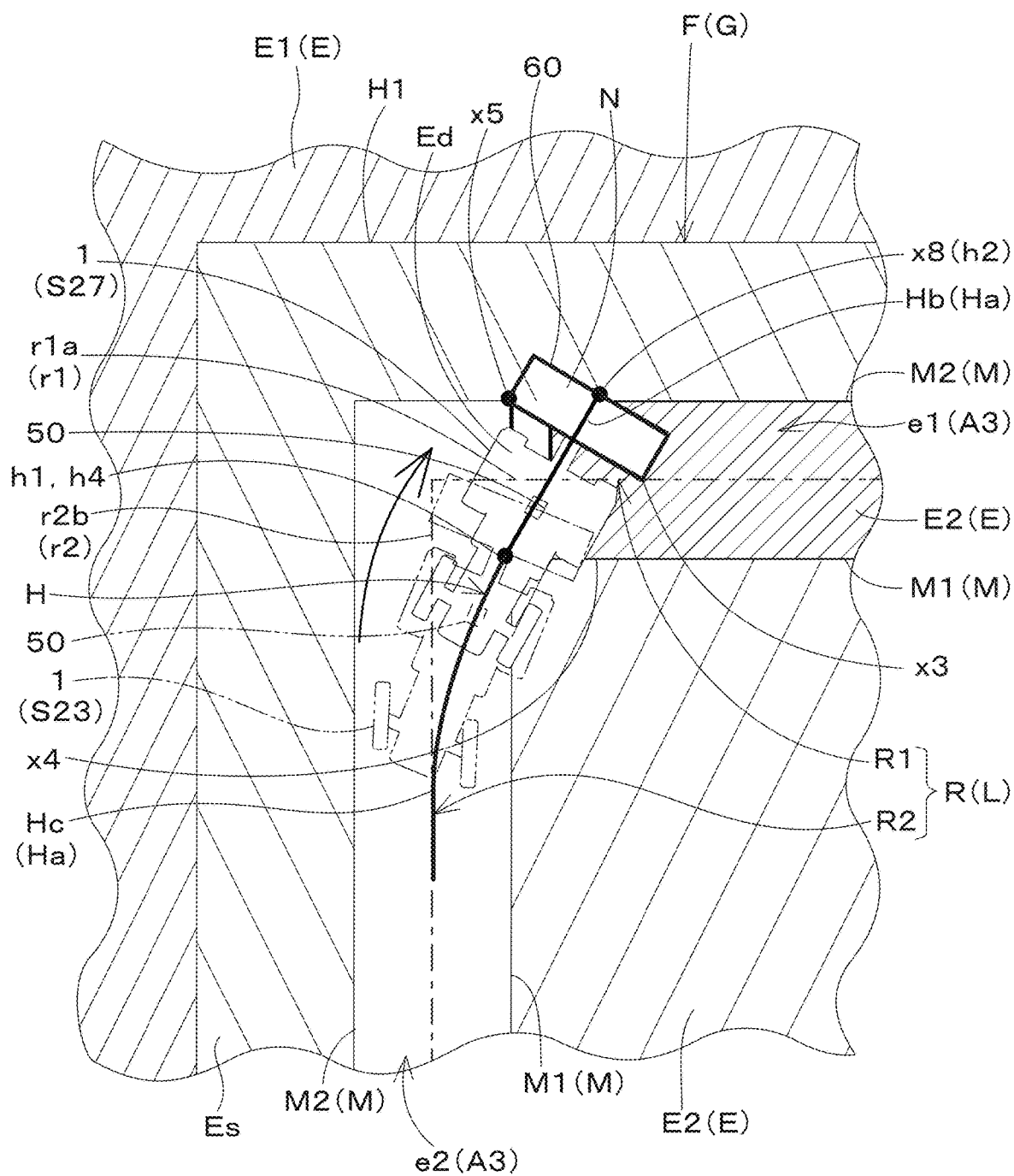
FIG. 11F illustrates an agricultural machine traveling forward on an auxiliary line (auxiliary work line).

The automatic-travel controller 40a, after moving the agricultural machine 1 to the ending point h3 of the transition line Hc (S25, Yes), controls the traveling device 4 to move the agricultural machine 1 back along the auxiliary line Ha (S26), as shown in FIG. 11F. The automatic-travel controller 40a moves the agricultural machine to the starting portion (auxiliary work line Hb) of the auxiliary line Ha. In other words, the automatic-travel controller 40a moves the agricultural machine 1 from the ending point h3 of the transition line Hc to the starting point h2 of the auxiliary work line Hb.

Figure 11G:
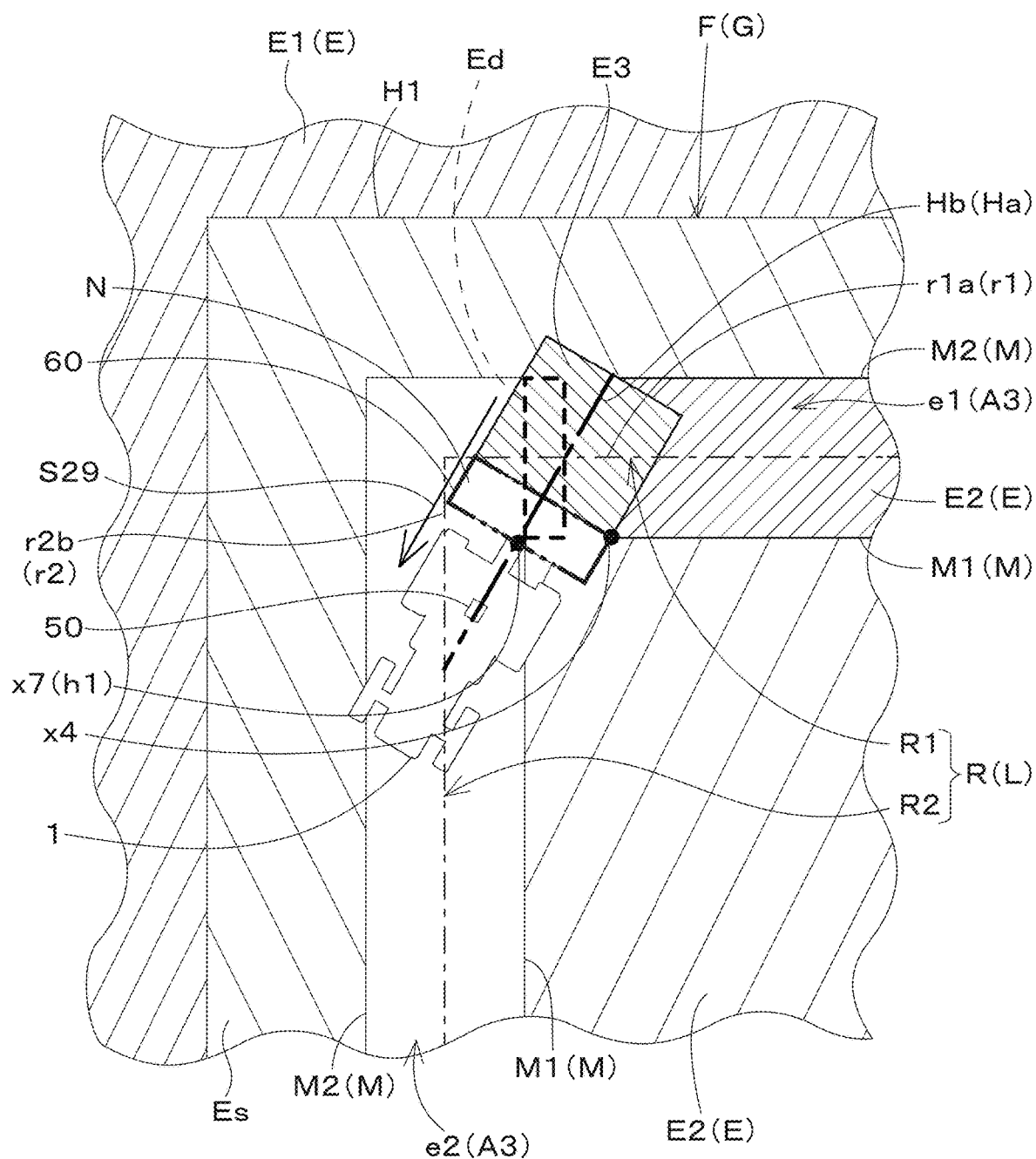
FIG. 11G illustrates an agricultural machine traveling forward on an auxiliary line (auxiliary work line).
Figure 11H:
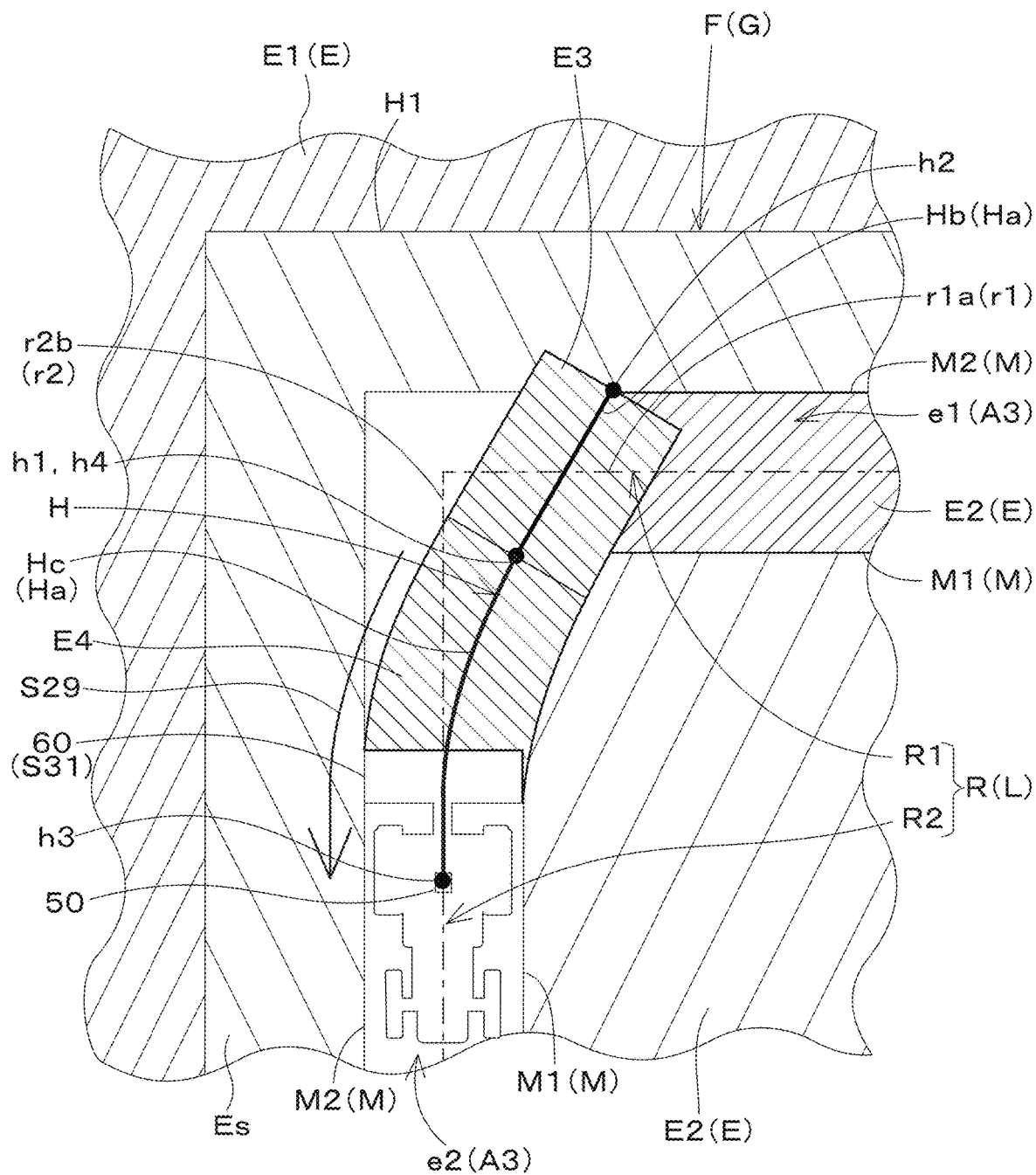
FIG. 11H illustrates an agricultural machine traveling from an auxiliary work line to a transition line.
Figure 11I:
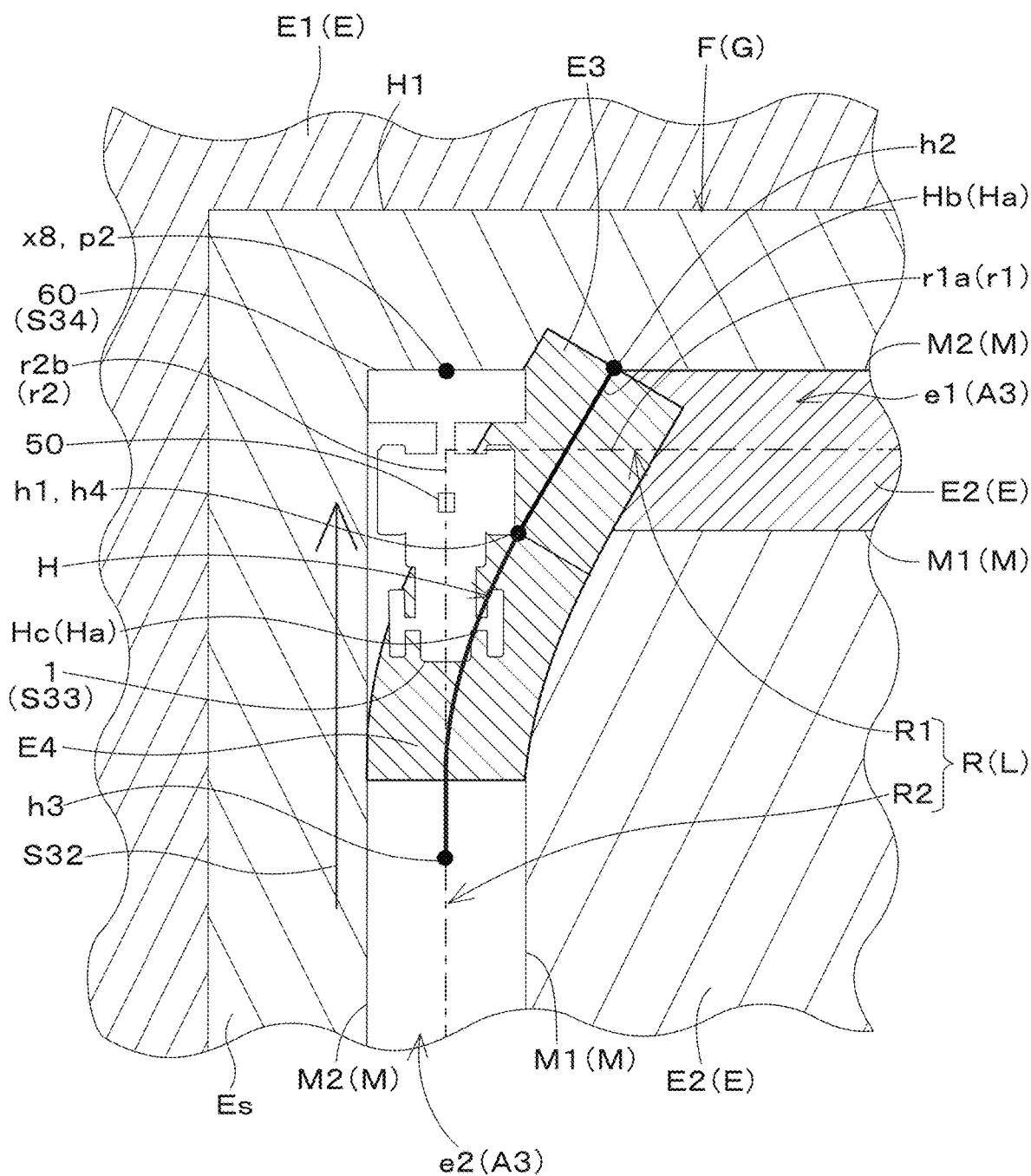
FIG. 11I illustrates an agricultural machine traveling rearward on a second line.
Figure 11J:
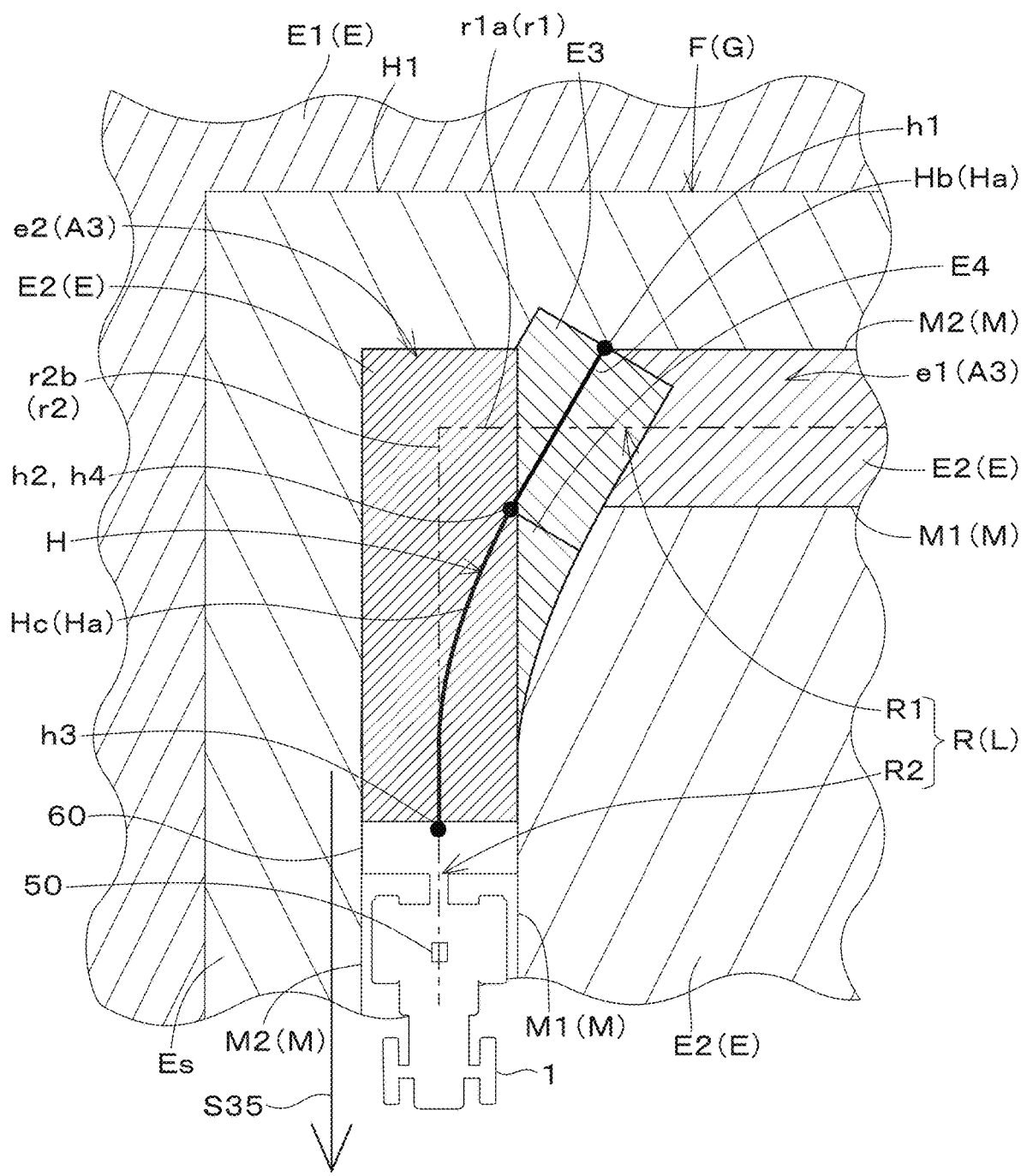
FIG. 11J illustrates an agricultural machine traveling forward on a second line.

The automatic-travel controller 40a, after moving the agricultural machine 1 to the starting point h2 of the auxiliary work line Hb (S27, Yes), controls the lift cylinder(s) 31 to bring the linkage 30 from the non-working posture into the working posture (S28). The automatic-travel controller 40a, after bringing the linkage 30 into the working posture (S28), controls the traveling device 4 to move the agricultural machine 1 forward along the auxiliary line Ha (S29), as shown in FIG. 11G. With this, the working device 60 works on the unworked region Ed by moving along the auxiliary work line Hb of the auxiliary line Ha.

The automatic-travel controller 40a, after the agricultural machine 1 moves forward on the auxiliary line Ha and the working device 60 performs work on the unworked region Ed (S29), determine whether the agricultural machine 1 is located at the ending portion (transition line) Hc of the auxiliary line Ha (S30), as shown in FIG. 11H. In the present example embodiment, the automatic-travel controller 40a determines whether the agricultural machine 1 is located on the second line R2, because the ending point h3 of the transition line Hc joins the second line R2.

If the automatic-travel controller 40a determines that the agricultural machine 1 is located at the ending portion (transition line) Hc of the auxiliary line Ha, i.e., on the second line R2 (S30, Yes), the automatic-travel controller 40a stops the traveling device 4 and controls the lift cylinder(s) 31 to bring the linkage 30 from the working posture into the non-working posture (S31). The automatic-travel controller 40a, after bringing the linkage 30 into the non-working posture (S31), controls the traveling device 4 to move it back from the ending portion (transition line) Hc of the auxiliary line Ha, more specifically from the ending point h3 of the transition line Hc, to the starting portion r2b of the second line R2 (S32), as shown in FIG. 11I.

The automatic-travel controller 40a, after moving the traveling device 4 back from the ending portion (transition line) Hc of the auxiliary line Ha to the starting portion r2b of the second line R2 (S32), determines whether the agricultural machine 1 is located at the starting portion r2b of the second line R2 (S33). In the present example embodiment, the automatic-travel controller 40a determines whether the rear edge of the working range of the working device 60 (the line passing through the fourth reference position x4, the sixth reference position x6, and the eighth reference position x8) is located at the boundary M at the starting portion r2b of the second line R2.

If the automatic-travel controller 40a determines that the agricultural machine 1 is located at the starting portion r2b of the second line R2 (S33, Yes), the automatic-travel controller 40a controls the lift cylinder(s) 31 to bring the linkage 30 from the non-working posture into the working posture (S34). The automatic-travel controller 40a, after bringing the linkage 30 into the working posture (S34), controls the traveling device 4 to move it forward on the second line R2 (S35), as shown in FIG. 11J.

Note that in the above-mentioned example embodiment, the flow of steps in which the travel assistance system S for the agricultural machine 1 corrects the travel route L and the agricultural machine 1 travels based on the corrected travel route L is discussed. However, a process in which the travel route L is corrected and a process in which the agricultural machine 1 travels based on the corrected travel route L may be performed concurrently.

Second Example Embodiment

In the first example embodiment described above, a configuration in which, when the agricultural machine 1 is traveling on the travel route L, the corrector 75 of the travel assistance system S for the agricultural machine 1 corrects the travel route L and the automatic-travel controller 40*a* causes the agricultural machine 1 to automatically travel based on the corrected travel route L is discussed. However, the travel assistance system S for the agricultural machine 1 need only be configured such that the travel route L is corrected and the agricultural machine 1 travels on the corrected travel route L, and may be configured such that the controller 40 controls the automatic steering mechanism 37 without controlling the vehicle speed of the agricultural machine 1.

The following description discusses a travel assistance system S for the agricultural machine 1 according to a second example embodiment, mainly the features that differ from the above-mentioned example embodiment (first example embodiment). The same features as those in the first example embodiment are assigned identical reference signs and detailed descriptions therefor are omitted here.

Figure 20:
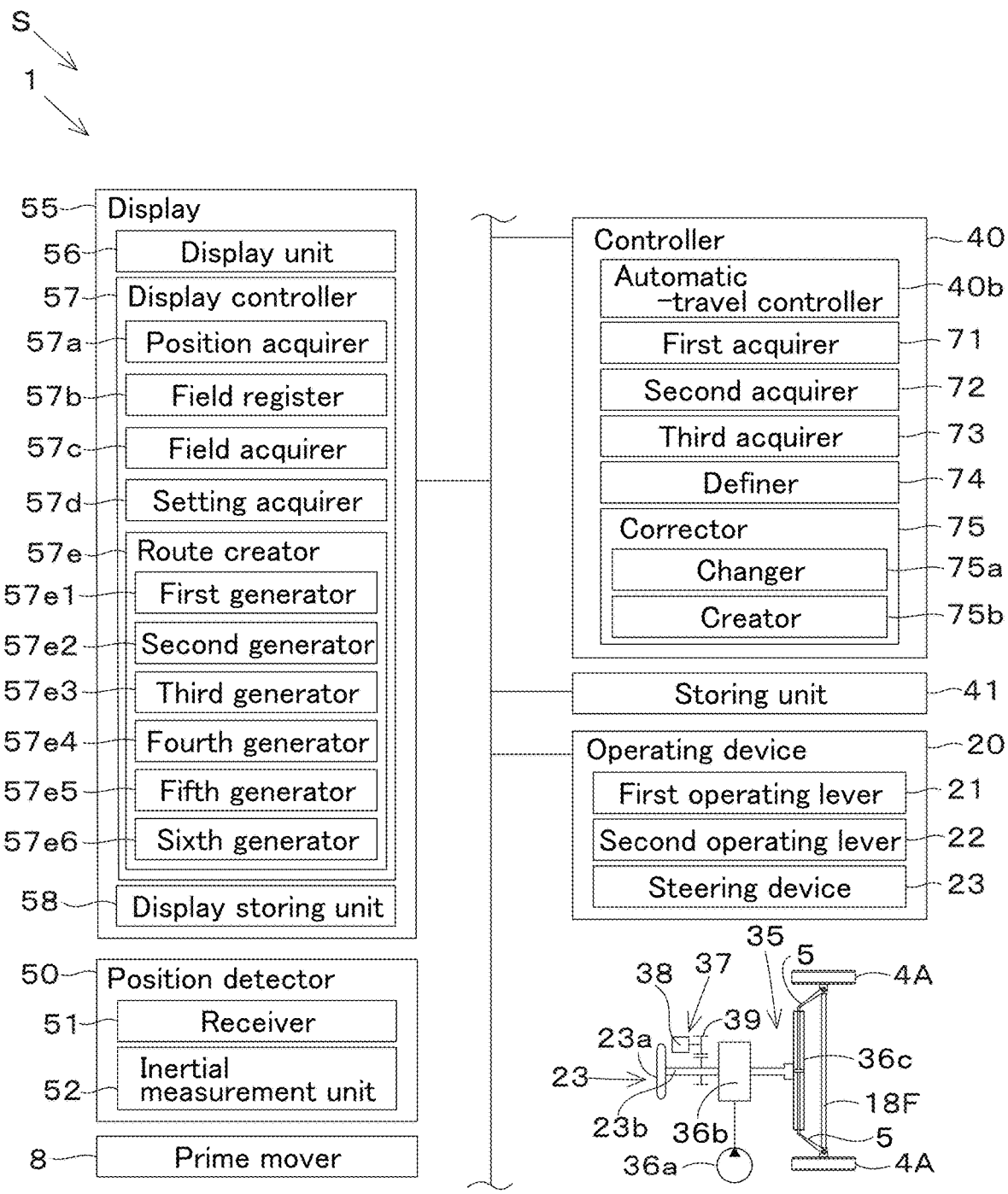
FIG. 20 shows a block diagram of an agricultural machine according to a second example embodiment of the present invention.

As shown in FIG. 20, in the second example embodiment, the controller 40 is configured or programmed to include an automatic-steering controller 40*b* instead of the automatic-travel controller 40*a*. The automatic-steering controller 40*b* includes electrical/electronic circuit(s) in the controller 40, program(s) stored in a CPU or the like, and/or the like. The automatic-steering controller 40*b* is configured or programmed to control the steering motor 38 of the automatic steering mechanism 37 such that the vehicle body 2 travels along the travel route L based on a control signal outputted from the controller 40. Note that the automatic-steering controller 40*b* is configured or programmed to control the steering motor 38 of the automatic steering mechanism 37 such that the agricultural machine 1 travels along the travel route L by a method similar to that for the automatic-travel controller 40*a* described earlier. With this, the automatic-steering controller 40*b* is configured or programmed to control the steering of the traveling device 4 based on the travel route L corrected by the corrector 75 and the position of the agricultural machine 1 detected by the position detector 50.

Note that the flow of steps in which the travel assistance system S for the agricultural machine 1 according to the second example embodiment corrects the travel route L and the agricultural machine 1 travels based on the corrected travel route L differs from the first example embodiment only in that the operator seated in the operator's seat controls vehicle speed and the like and that the automatic-steering controller 40*b* controls the traveling device 4, and therefore detailed descriptions therefor are omitted here.

Third Example Embodiment

In the example embodiments described above, a configuration in which, when the agricultural machine 1 is traveling on the travel route L, the corrector 75 of the travel assistance system S for the agricultural machine 1 corrects the travel route L and the automatic-travel controller 40*a* causes the agricultural machine 1 to automatically travel based on the corrected travel route L, or the automatic-steering controller 40*b* performs automatic steering based on the corrected travel route L, is described. However, the travel assistance system S for the agricultural machine 1 need only make it possible, by correcting the travel route L acquired by the first acquirer 71 based on the information of the field F acquired by the third acquirer 73, to prevent the agricultural machine 1 from traveling in the area where the agricultural machine 1 is prohibited to enter (off-limits area E) while preventing or reducing the generation of the unworked region Ed to achieve efficient work. The display 55 may be configured to display the corrected travel route L and allow the operator to cause the agricultural machine 1 travel along the corrected travel route L. That is, the point in time at which the corrector 75 corrects the travel route L is not limited to a period during which the agricultural machine 1 is traveling on the travel route L, but may be before the agricultural machine 1 travels on the travel route L. In such a case, the corrector 75 corrects the travel route L created by the route creator 57*e* by causing a virtual agricultural machine 1 based on the specification information of the agricultural machine 1 acquired by the second acquirer 72 to travel. Note that the travel route L corrected by the corrector 75 is displayed by the display unit 56 of the display 55 showing a result screen D3.

The following discusses the travel assistance system S for the agricultural machine 1 according to a third example embodiment in detail. Note that the same features as those in the first and second example embodiments are not described here.

Figure 21:
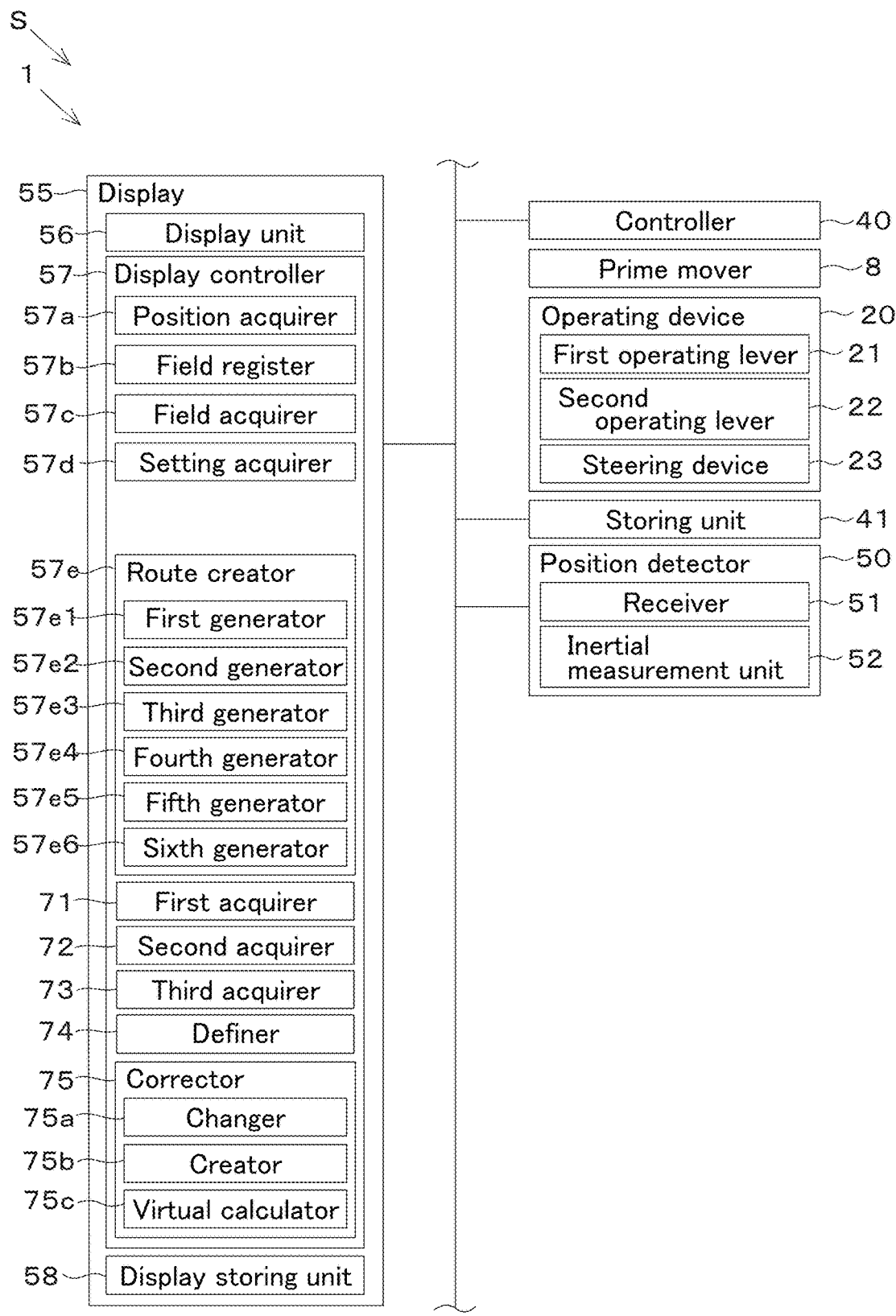
FIG. 21 shows a block diagram of an agricultural machine according to a third example embodiment of the present invention.

As shown in FIG. 21, in the third example embodiment, the first acquirer 71, the second acquirer 72, the third acquirer 73, the definer 74, and the corrector 75 include electrical/electronic circuit component(s) or circuitry, program(s) stored in the display controller 57, and/or the like, and the display controller 57 may also be configured or programmed to function as the first acquirer 71, the second acquirer 72, the third acquirer 73, the definer 74, and the corrector 75.

In the present example embodiment, the second acquirer 72 acquires the specification information of the agricultural machine 1 and/or the working device 60 entered on the settings screen D2 displayed by the display 55 and stored in the display storing unit 58 such that it is associated with the field F. In such a case, the machine input section 114 displayed by the settings screen D2 receives input of the model information of the agricultural machine 1 in addition to the model information of the working device 60.

Note that, unlike the first example embodiment, the second acquirer 72 acquires the specification information of the agricultural machine 1 from the information pre-stored in the display storing unit 58 based on the model information of the agricultural machine 1 inputted via the machine input section 114. Similar to the storing unit 41 in the first example embodiment, the display storing unit 58 stores a table in which the model information of the agricultural machine 1 and the specification information of agricultural machine 1 are associated with each other. For example, the display storing unit 58 stores, as the specification information of the agricultural machine 1, the distance Y1 from the vehicle body position VP to the front end of the agricultural machine 1 (the distal edge of the hood) and the distance Y2 from the vehicle body position VP to the rear end of the agricultural machine 1 (the rear end of the linkage 30).

As shown in FIG. 21, the corrector 75 includes a virtual calculator 75*c* in addition to the changer 75*a* and the creator 75*b*. The virtual calculator 75*c* performs a simulation in which a virtual model of the agricultural machine 1 with the working device 60 connected thereto (virtual machine) travels along the travel route L based on the specification information of the agricultural machine 1 and/or the working device 60 acquired by the second acquirer 72, and the corrector 75 corrects the travel route L based on the simulation. Specifically, the virtual calculator 75c sets a virtual vehicle body position corresponding to the vehicle body position VP. The virtual calculator 75c moves the virtual vehicle body position onto the travel route L acquired by the third acquirer 73 to perform a simulation. That is, the virtual calculator 75c can calculate the position information of the virtual machine.

In the third example embodiment, the definer 74 defines the position information of the first reference position x1, the second reference position x2, the third reference position x3, the fourth reference position x4, the fifth reference position x5, the sixth reference position x6, the seventh reference position x7, and the eighth reference position x8 to define the relative distance from the first reference position x1, the second reference position x2, the third reference position x3, the fourth reference position x4, the fifth reference position x5, the sixth reference position x6, the seventh reference position x7, and the eighth reference position x8 to the virtual vehicle body position instead of the actual vehicle body position VP, differently from the first example embodiment.

In the third example embodiment, the threshold(s) is pre-stored in the display storing unit 58 and can be changed desirably by operating the display 55. If the angle θa between the first line R1 and the second line R2 is greater than or equal to a predetermined angle (threshold), the changer 75a shortens the ending portions r1 of a corresponding one of a plurality of lines R based on the position information of the off-limits area E and the first reference position x1.

Figure 22:
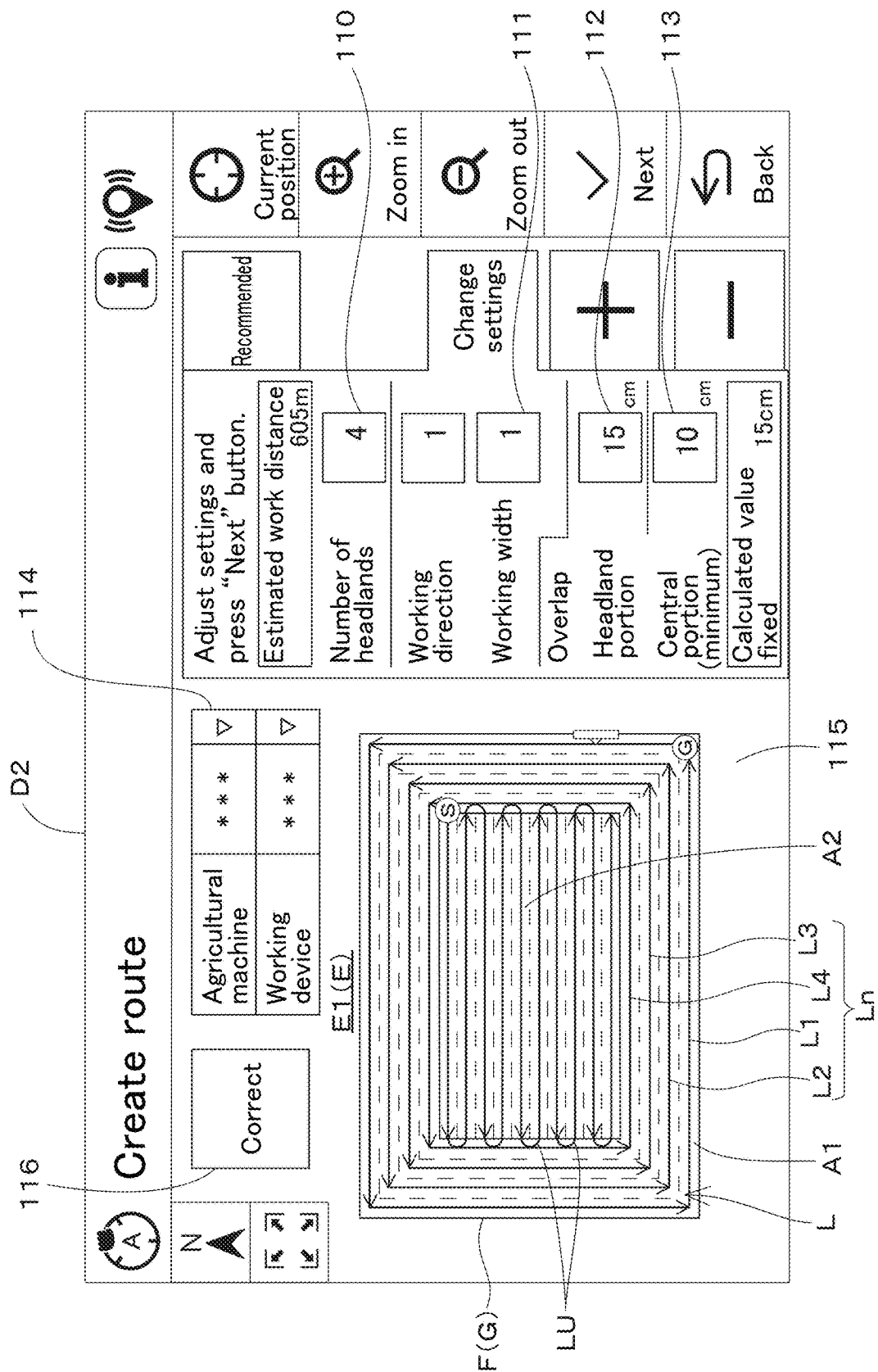
FIG. 22 is a second diagram illustrating an example of a settings screen.
Figure 23:
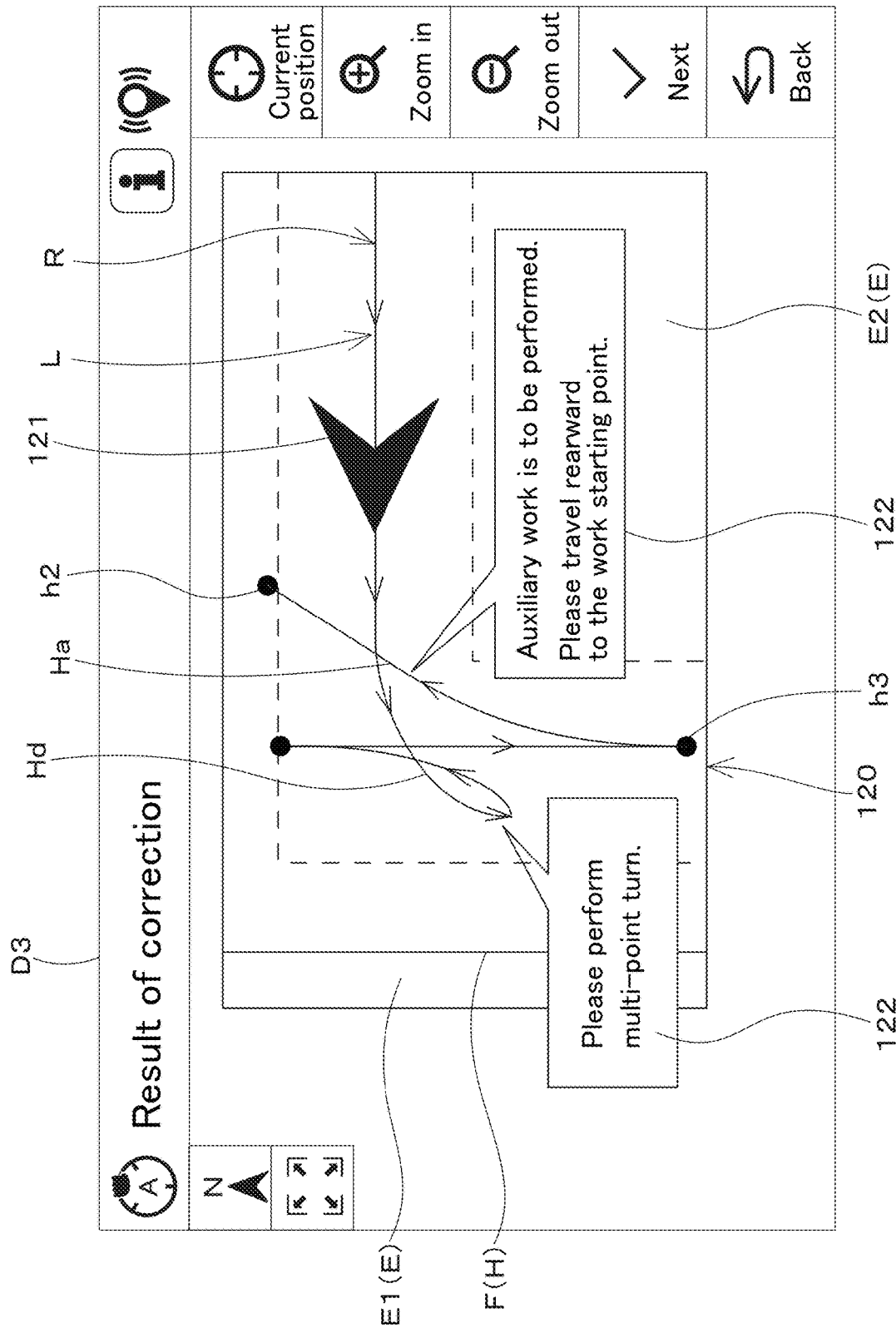
FIG. 23 illustrates an example of a result screen.

As shown in FIG. 22, in the third example embodiment, in the case where the route creator 57e creates a travel route L and the route display section 115 of the settings screen D2 displays the created travel route L on the field F, a correction button 116 is displayed on the settings screen D2. If the operator operates the display 55 and selects the correction button 116, the corrector 75 performs a simulation and starts correcting the travel route L. When the corrector 75 completes the correction of the travel route L, the display storing unit 58 stores the corrected travel route L by overwriting the data of the uncorrected travel route L with the corrected travel route L. As shown in FIG. 23, the display controller 57 displays a result screen D3, which displays the corrected travel route L stored in the display storing unit 58. The result screen D3 displays a result display section 120 which shows the corrected travel route L. The result display section 120 displays the corrected travel route L on the field F and displays an icon 121 at the location where the agricultural machine 1 is currently located, based on the vehicle body position VP acquired by the position acquirer 57a. In the present example embodiment, in the result display section 120, the portion of the corrected travel route L that corresponds to the location where the vehicle body position VP is located is enlarged. The result display section 120 also displays balloon(s) 122 to show a notice at each location of the travel route L.

Figure 24:
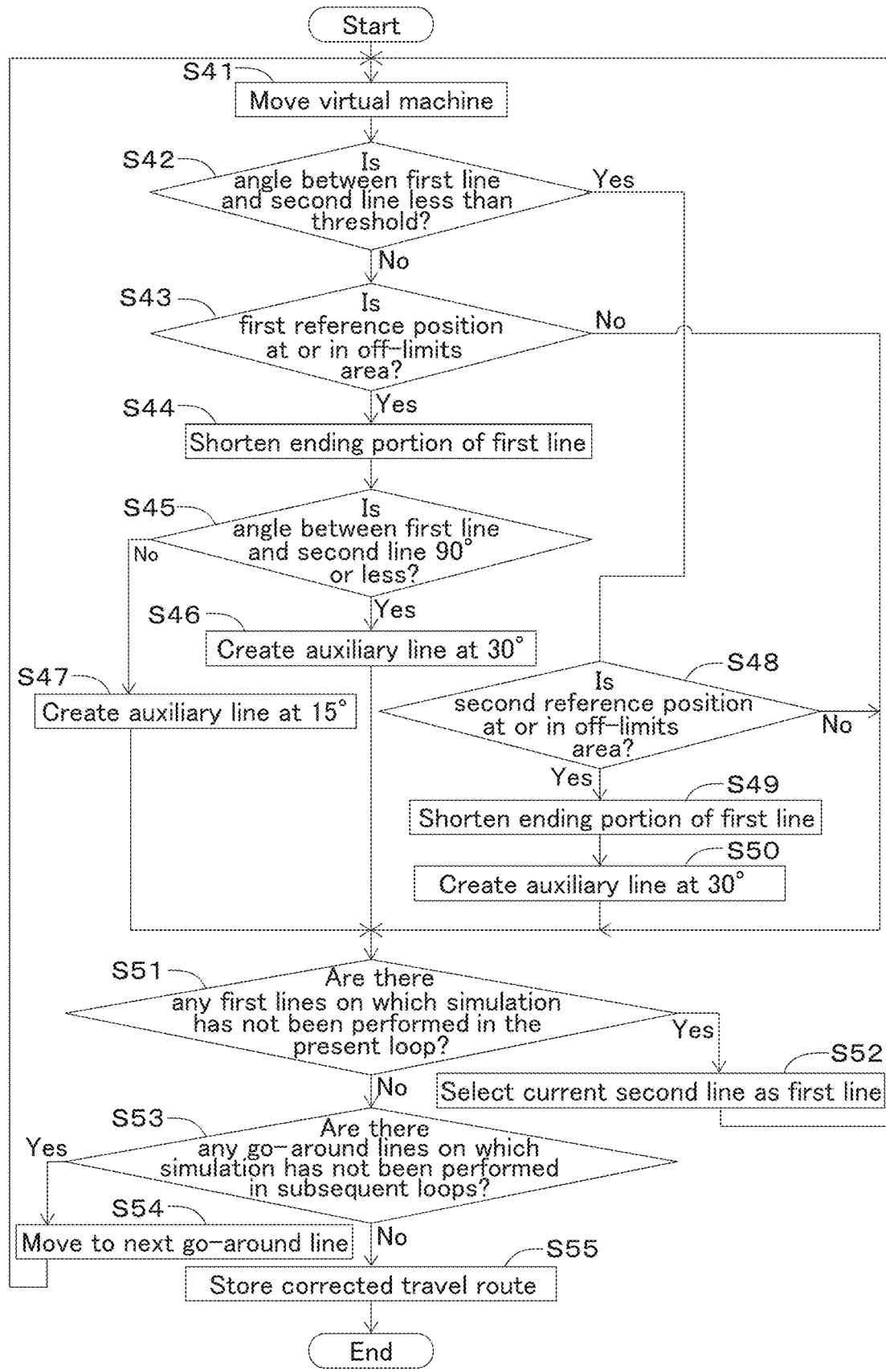
FIG. 24 shows a flow of steps in which a corrector corrects a travel route in the third example embodiment of the present invention.

The following description discusses, with reference to FIG. 24, the flow of steps in which the travel assistance system S for the agricultural machine 1 corrects the travel route L before the agricultural machine 1 travels along the travel route L. Note that in the following description, for convenience of description, an example case in which a virtual agricultural machine 1 travels on the first line R1 of a certain loop and moves to the second line R2 is discussed.

First, the virtual calculator 75c moves the virtual machine based on the travel route L created by the route creator 57e (S41). When the virtual calculator 75c starts moving the virtual machine along the first line R1 (S41), the changer 75a determines whether the angle θa between the first line R1 where the virtual machine is located and the second line R2 is less than a threshold (e.g., about 70°) (S42). Specifically, the changer 75a detects the first line R1 on which the virtual machine is located and the second line R2 which is the next line of the lines R, based on the travel route L acquired by the first acquirer 71 and the position information of the virtual machine calculated by the virtual calculator 75c. Upon detecting the first line R1 and the second line R2 from the lines R, the changer 75a calculates the angle between the first line R1 and the second line R2, and based on the threshold acquired from the display storing unit 58, determines whether the angle θa between the first line R1 and the second line R2 is less than the threshold (e.g., about 70°).

If the changer 75a determines that the angle θa between the first line R1 and the second line R2 is not less than the threshold (e.g., about 70°) (S42, No), the changer 75a determines whether the first reference position x1 is located at the boundary M of the off-limits area E or in the off-limits area E (S43). Specifically, the changer 75a determines whether the first reference position x1 is located at the boundary M of the off-limits area E or in the off-limits area E based on the position information of the virtual machine calculated by the virtual calculator 75c, the relative distance between the virtual vehicle body position and the first reference position x1 defined by the definer 74, and the position information of the off-limits area E acquired by the third acquirer 73.

If the changer 75a determines that first reference position x1 is located at the boundary M of the off-limits area E or in the off-limits area E (S43, Yes), the changer 75a makes a correction to shorten the ending portion r1a of the first line R1 (S44). Specifically, the changer 75a moves the work ending point p1 of the first line R1 to the seventh reference position x7 in a direction toward the starting portion (work starting portion) of the first line R1, at the location at which it was determined that the first reference position x1 was located at the boundary M of the off-limits area E or in the off-limits area E.

After the changer 75a makes a correction to shorten the ending portion r1a of the first line R1 (S44), the creator 75b determines whether the angle θa between the first line R1 and second line R2 is an acute angle or right angle (≤90°) (S45). In the present example embodiment, the creator 75b determines whether the angle θa between the first line R1 and the second line R2 is an acute angle or a right angle (≤90°) based on the angle between the first line and the second line R2 calculated by the changer 75a.

If the creator 75b determines that the angle θa between the first line R1 and the second line R2 is an acute or right angle (≤90°) (S45, Yes), the creator 75b creates an auxiliary line Ha such that the angle (inclination angle) Ob between the starting portion (auxiliary work line) Hb of the auxiliary line Ha and the second line R2 is about 30° (S46), for example. Specifically, the creator 75b defines the starting point h2 and the ending point h1 of the auxiliary work line Hb based on the third reference position x3, the fourth reference position x4, the fifth reference position x5, and the sixth reference position x6 defined by the definer 74, the boundary M, and the inclination angle θb, and creates the auxiliary work line Hb The creator 75b also connects the starting point h4 of the transition line Hc with ending point h1 of the auxiliary work line Hb to create the transition line Hc such that the ending point h3 of the transition line Hc joins the second line R2. In addition to the auxiliary line Ha, the creator 75b creates a connecting line Hd that connects the ending portion r1a of the first line R1 to the starting portion (auxiliary work line) Hb of the auxiliary line Ha, as a portion of the correction route portion H.

On the other hand, if the creator 75b determines that the angle θa between the first line R1 and the second line R2 is an obtuse angle (>90°) (S45, No), the creator 75b creates an auxiliary line Ha such that the angle (inclination angle) Ob between the starting portion (auxiliary work line) Hb of the auxiliary line Ha and the second line R2 is about 15° (S47), for example. The creator 75b also connects the starting point h4 of the transition line Hc with the ending point h1 of the auxiliary work line Hb to create the transition line Hc such that the ending point h3 of the transition line He joins the second line R2. In addition to the auxiliary line Ha, the creator 75b creates a connecting line Hd that connects the ending portion r1a of the first line R1 to the starting portion (auxiliary work line) Hb of the auxiliary line Ha, as a portion of the correction route portion H.

If the changer 75a determines in S42 that the angle θa between the first line R1 and the second line R2 is less than the threshold (e.g., about 70°) (S42, Yes), the creator 75b determines whether the second reference position x2 is located at the boundary M of the off-limits area E or in the off-limits area E (S48). Specifically, the changer 75a determines whether the second reference position x2 is located at the boundary M of the off-limits area E or in the off-limits area E based on the vehicle body position VP acquired by the position acquirer 57a, the relative distance between the vehicle body position VP and the second reference position x2 defined by the definer 74, and the position information of the off-limits area E acquired by the third acquirer 73.

If the changer 75a determines that the second reference position x2 is located at the boundary M of the off-limits area E or in the off-limits area E (S48, Yes), the changer 75a makes a correction to shorten the ending portion r1a of the first line R1 (S49). Specifically, the changer 75a moves the work ending point p1 of the first line R1 to the seventh reference position x7 in a direction toward the starting portion (work starting point p2) of the first line R1, at the location where it was determined that the second reference position x2 was located at the boundary M of the off-limits area E or in the off-limits area E.

After the changer 75a makes the correction to shorten the ending portion r1a of the first line R1 (S49), the creator 75b creates the auxiliary line Ha such that the angle (inclination angle) Ob between the starting portion (auxiliary work line) Hb of the auxiliary line Ha and the second line R2 is 30° (S50). The creator 75b also connects the starting point h4 of the transition line He with the ending point h1 of the auxiliary work line Hb to create the transition line He such that the ending point h3 of the transition line He joins the second line R2. In addition to the auxiliary line Ha, the creator 75b creates a connecting line Hd that connects the ending portion r1a of the first line R1 to the starting portion (auxiliary work line) Hb of the auxiliary line Ha, as a portion of the correction route portion H.

After the creator 75b creates the auxiliary line Ha in S46, S47, or S50, the corrector 75 determines whether there are any lines on which the simulation has not been performed, in the current loop (S51). Specifically, the corrector 75 determines whether there are any lines that have not been traveled by the virtual machine, in the go-around line Ln where the virtual machine is located.

If the corrector 75 determines that there is a line on which the simulation has not been performed in the current loop (S51, Yes), the corrector 75 moves the virtual machine from the first line R1 to the second line R2 and defines the second line R2 as a first line R1 (S52), and returns to S41.

On the other hand, if the corrector 75 determines that there are no lines on which the simulation has not been performed in the current loop (S51, No), the corrector 75 determines whether there are any go-around lines Ln on which the simulation has not been performed in the travel route L acquired by the first acquirer 71, other than the present go-around line Ln (S53). Specifically, the corrector 75 determines whether there are any go-around lines Ln located outward of the go-around line Ln where the virtual machine is present.

If the corrector 75 determines that there is a go-around line Ln on which the simulation has not been performed in a loop other than the present loop (S53, Yes), the corrector 75 moves the virtual machine from the present go-around line Ln to an outer go-around line Ln (S54) and returns to S41.

On the other hand, if the corrector 75 determines that there are no go-around lines Ln on which the simulation has not been performed in loop(s) other than the present loop (S53, No), the corrector 75 ends the correction of the travel route L and the display storing unit 58 stores the corrected travel route L (S55).

A travel assistance system S for an agricultural machine 1 as has been discussed includes a traveling device 4 included in an agricultural machine 1 to which a working device 60 is attachable, a first acquirer 71 configured or programmed to acquire a travel route L to be traveled by the agricultural machine 1 and created on a field F representing an agricultural field G, a corrector 75 configured or programmed to correct the travel route L acquired by the first acquirer 71, and a controller 40 configured or programmed to control the traveling device 4 based on the travel route L corrected by the corrector 75, wherein the travel route L includes a plurality of lines R connected to each other, and the corrector 75 is configured or programmed to include a creator 75b configured or programmed to create an auxiliary line Ha extending from an ending portion r1a of a first line R1 of the plurality of lines R to a starting portion r2b of a second line R2 of the plurality of lines R connected to the ending portion r1a of the first line R1, the auxiliary line Ha being inclined relative to the second line R2. The first acquirer, the corrector, and the creator may be defined by any of electrical or electric circuit components or circuitry, the controller or another controller configured or programmed to execute programs, or an external server. The above configuration achieves the following. There may be cases in which, when the agricultural machine 1 travels from one line R (first line R1) to another line R (second line R2), there is not enough space for the agricultural machine 1 to make a turn, resulting in an unworked region Ed in which work has not been done by the working device 60. In this regard, since the agricultural machine 1 travels along the auxiliary line Ha, the working device 60 performs work in the unworked region Ed. Thus, the travel assistance system S for the agricultural machine 1 makes it possible, since the agricultural machine 1 travels along the corrected travel route L, to eliminate or reduce the likelihood that the unworked region Ed will be generated.

The travel assistance system S for the agricultural machine 1 may further include a position detector 50 to detect a position of the agricultural machine 1. The controller 40 may be configured or programmed to include an automatic-travel controller 40*a* configured or programmed to control steering and a vehicle speed of the traveling device 4 based on the travel route L corrected by the corrector 75 and the position of the agricultural machine 1 detected by the position detector 50. The above configuration allows the agricultural machine 1 to travel automatically while eliminating or reducing the likelihood that the unworked region Ed will be generated. This allows the agricultural machine 1 to autonomously perform work without the operator controlling the steering and vehicle speed of the traveling device 4 using the operating unit 20, making it possible to improve the efficiency of work done by the agricultural machine 1 and achieve more accurate work.

The travel assistance system S for the agricultural machine 1 may further include a position detector 50 to detect a position of the agricultural machine 1. The controller 40 may be configured or programmed to include an automatic-steering controller 40*b* configured or programmed to control steering of the traveling device 4 based on the travel route L corrected by the corrector 75 and the position of the agricultural machine 1 detected by the position detector 50. The above configuration makes it possible to automatically steer the agricultural machine 1 while eliminating or reducing the likelihood that the unworked region Ed will be generated. This allows the operator to cause the agricultural machine 1 to perform work without manually steering the traveling device 4, making it possible to improve the efficiency of work done by the agricultural machine 1 and achieve more accurate work.

A travel assistance system S for an agricultural machine 1 includes a first acquirer 71 configured or programmed to acquire a travel route L to be traveled by an agricultural machine 1 to which a working device 60 is attachable and created on a field F representing an agricultural field G, a corrector 75 configured or programmed to correct the travel route L acquired by the first acquirer 71, and a display 55 to display the travel route L corrected by the corrector 75, wherein the travel route L includes a plurality of lines R connected to each other, and the corrector 75 is configured or programmed to include a creator 75*b* configured or programmed to create an auxiliary line Ha extending from an ending portion r1*a* of a first line R1 of the plurality of lines R to a starting portion r2*b* of a second line R2 of the plurality of lines R connected to the ending portion r1*a* of the first line R1, the auxiliary line Ha being inclined relative to the second line R2. The first acquirer, the corrector, and the creator may be defined by any of electrical or electric circuit components or circuitry, the controller or another controller configured or programmed to execute programs, or an external server. The above configuration achieves the following. There may be cases in which, when the agricultural machine 1 travels from one line R (first line R1) to another line R (second line R2), there is not enough space for the agricultural machine 1 to make a turn, resulting in an unworked region Ed in which work has not been done by the working device 60. In this regard, since the agricultural machine 1 travels along the auxiliary line Ha, the working device 60 performs work in the unworked region Ed. This allows the operator to easily know the corrected travel route L, and makes it possible, since the agricultural machine 1 travels along the corrected travel route L, to eliminate or reduce the likelihood that the unworked region Ed will be generated.

The creator 75*b* may be configured or programmed to create the auxiliary line Ha such that the auxiliary line Ha is at an acute angle to the second line R2. This configuration allows the agricultural machine 1 to travel from the second line R2 to the auxiliary line Ha and travel from the auxiliary line Ha to the second line R2 without having to make a sharp turn. This makes it possible to eliminate or reduce the likelihood that, for example, the agricultural machine 1 will damage the agricultural field G when traveling between the second line R2 and the auxiliary line Ha.

The creator 75*b* may be configured or programmed to create the auxiliary line Ha such that a starting portion (auxiliary work line) Hb of the auxiliary line Ha intersects the ending portion r1*a* of the first line R1 and extends straight from the ending portion r1*a* of the first line R1 and that an ending portion (transition line) Hc of the auxiliary line Ha curves to extend along the starting portion r2*b* of the second line R2. The starting portion (auxiliary work line) Hb of the auxiliary line Ha may be at an acute angle to the second line R2. The auxiliary line Ha may be inclined relative to the second line R2. The above configuration allows the working device 60 to perform work in a linear manner at least from the intersection of the first line R1 and the starting portion (auxiliary work line) Hb of the auxiliary line Ha, making it possible to reliably perform work in the unworked region Ed. With this, when the agricultural machine 1 travels along the auxiliary line Ha, the working device 60 more reliably eliminates or reduces the likelihood that the unworked region Ed will be generated.

The creator 75*b* may be configured or programmed to create the auxiliary line Ha such that an angle θb between a starting portion of the auxiliary line Ha and the second line R2 is smaller than an angle θa between the first line R1 and the second line R2. With the above configuration, the auxiliary line Ha intersects the portion of the first line R1 that is closer to the ending portion r1*a* than the other portion is. Thus, the auxiliary line Ha is relatively compact, making it possible to relatively reduce the distance traveled by the agricultural machine 1 along the auxiliary line Ha.

The creator 75*b* may be configured or programmed to create, when an angle between the first line R1 and the second line R2 is an obtuse angle, the auxiliary line Ha that is inclined such that an angle θb between a starting portion (auxiliary work line) Hb of the auxiliary line Ha and the second line R2 is smaller than when the angle between the first line R1 and the second line R2 is an acute angle or a right angle. The above configuration ensures that the angle between the first line R1 and the auxiliary line Ha is larger than zero, making it possible to eliminate or reduce the likelihood that the auxiliary line Ha will overlap the first line R1. This makes it possible, since the agricultural machine 1 travels along the auxiliary line Ha, to more reliably eliminate or reduce the likelihood that the unworked region Ed will be generated.

The travel assistance system S for the agricultural machine 1 may further include a second acquirer 72 configured or programmed to acquire specification information of the agricultural machine 1 and/or the working device 60, and a third acquirer 73 to acquire information of the field F. The corrector 75 may be configured or programmed to include a changer 75*a* to shorten an ending portion r1 of a corresponding one of the plurality of lines R based on the specification information acquired by the second acquirer 72 and the information of the field F acquired by the third acquirer 73 to prevent the agricultural machine 1 from entering an off-limits area E of the field F, the off-limits area E being an area where the agricultural machine 1 is prohibited from entering. The creator 75*b* may be configured or programmed to create the auxiliary line Ha such that the auxiliary line Ha extends from the ending portion r1a of the first line R1 shortened by the changer 75a to the starting portion r2b of the second line R2 and is inclined relative to the second line R2. The second acquirer and the changer may be defined by any of electrical or electric circuit components or circuitry, the controller or another controller configured or programmed to execute programs, or an external server. With the above configuration, since the travel route L is corrected so that the agricultural machine 1 will not enter the off-limits area E and the agricultural machine 1 travels along the auxiliary line Ha, the working device 60 performs work in the unworked region Ed resulting from the correction of the travel route L. Thus, the travel assistance system S for the agricultural machine 1 makes it possible, since the agricultural machine 1 travels along the corrected travel route L, to eliminate or reduce the likelihood that the agricultural machine 1 will enter the off-limits area E and to also eliminate or reduce the likelihood that the unworked region Ed will be generated.

The travel assistance system S for the agricultural machine 1 may further include a definer 74 configured or programmed to define an imaginary first reference position x1 in front of the agricultural machine 1 based on the specification information acquired by the second acquirer 72. The third acquirer 73 may be configured or programmed to acquire position information of the off-limits area E as the information of the field F. The changer 75a may be configured or programmed to shorten the ending portion r1 of the corresponding one of the plurality of lines R based on the position information of the off-limits area E and the first reference position x1 to prevent the first reference position x1 from entering the off-limits area E. The definer may be defined by any of electrical or electric circuit components or circuitry, the controller or another controller configured or programmed to execute programs, or an external server. With the above configuration, since the first reference position x1 is defined as a sensed region in front of the agricultural machine 1, it is possible to more reliably eliminate or reduce the likelihood that the agricultural machine 1 traveling along the travel route L will enter the off-limits area E.

The definer 74 and the changer 75a may be configured or programmed such that, when an angle between the first line R1 and the second line R2 is an acute angle less than a predetermined angle, the definer 74 defines an imaginary second reference position x2 in front of the first reference position x1, and the changer 75a shortens the ending portion r1 of the corresponding one of the plurality of lines R based on position information of the plurality of lines R, the position information of the off-limits area E, and the second reference position x2. An amount by which the corresponding one of the plurality of lines R is shortened by the changer 75a based on the second reference position x2 may be greater than an amount by which the corresponding one of the plurality of lines R is shortened by the changer 75a based on the first reference position x1. This configuration achieves the following. There may be cases in which, when the angle θa between the first line R1 and the second line R2 is an acute angle less than a predetermined angle, there is not enough space for the agricultural machine 1 to make a turn in the vicinity of the ending portion r1a of the first line R1 and the starting portion r2b of the second line R2. In this regard, since the corresponding one of the plurality of lines R is shortened using as the sensed region the second reference position x2 which is more distant from the agricultural machine 1 than the first reference position x1 is, the agricultural machine 1, when traveling along the corresponding one of the plurality of lines R, can make a turn at a location short of the corresponding location on the non-shortened line R. Thus, even in cases where the angle θa between the first line R1 and the second line R2 is an acute angle less than a predetermined angle and there is not enough space for the agricultural machine 1 to make a turn, the agricultural machine 1, when traveling along the travel route L, can reliably make a turn.

The creator 75b may be configured or programmed to, when an amount by which the corresponding one of the plurality of lines R is shortened by the changer 75a is equal to or more than a predetermined amount, create a plurality of the auxiliary lines Ha which are adjacent to each other. With the above configuration, the working device 60 performs work in the unworked region Ed in batches. Therefore, even if the unworked region Ed is relatively large, the working device 60 can perform work in the unworked region Ed without any omission.

The third acquirer 73 may be configured or programmed to acquire, as position information of the off-limits area E of the information of the field F, position information of a region E1 other than the agricultural field G and/or position information of a region of the agricultural field G where the working device 60 has performed work. With the above configuration, since the agricultural machine 1 travels along the travel route L corrected by the corrector 75, the agricultural machine 1 is prevented from entering the region E1 other than the agricultural field G, such as a footpath outside the agricultural field G or a region around the periphery of the agricultural field G where a fence or the like is provided. This makes it possible to eliminate or reduce the likelihood that the agricultural machine 1 or the working device 60 will contact the footpath, the fence or the like when the agricultural machine 1 makes a turn.

The creator 75b may be configured or programmed to create the auxiliary line Ha that is inclined such that a starting portion (auxiliary work line) Hb of the auxiliary line Ha is perpendicular or substantially perpendicular to the ending portion r1a of the first line R1, an intermediate portion of the auxiliary line Ha curves toward the starting portion r2b of the second line R2, and an ending portion (transition line) Hc of the auxiliary line Ha curves to extend along the second line R2. With the above configuration, the starting portion (auxiliary work line) Hb of the auxiliary line Ha is perpendicular or substantially perpendicular to the ending portion r1a of the first line R1. Therefore, the boundary between a region where the working device 60 does work when the agricultural machine 1 travels along the starting portion (auxiliary work line) Hb of the auxiliary line Ha and a region where the working device 60 does work when the agricultural machine 1 travels along the ending portion r1a of the first line R1 is perpendicular or substantially perpendicular to the first line R1. This makes it possible to achieve good appearance of the regions after work. Furthermore, the agricultural machine 1 travels along the auxiliary line Ha relatively smoothly. This allows the agricultural machine 1 to travel to the second line R2 while preventing or reducing damage to the worked region. Furthermore, in cases where the working width W of the working device 60 extends in the widthwise direction of the agricultural machine 1, even if the ending portion r1a of the first line Ra is shortened by a relatively large amount, the working device 60 can perform work efficiently in the unworked region Ed while preventing or reducing omission.

The creator 75b may be configured or programmed to create the auxiliary line Ha such that, when the agricultural machine 1 is located at a starting portion (auxiliary work line) Hb of the auxiliary line Ha, a working range of the working device 60 and a starting portion of a unit work section in which the working device 60 performs work along the second line R2 overlap each other. With the above configuration, the working device 60 travels from the outside of the unworked region Ed through the unworked region Ed, and therefore the working device 60 can more reliably perform work without any omission in the unworked region Ed.

The travel assistance system S for the agricultural machine 1 may further include a route creator 57e configured or programmed to define the plurality of lines R on the field F to create the travel route L. The route creator 57e may be configured or programmed to create the first line R1 and the second line R2 such that an ending portion of a unit work section (first unit work section) e1 in which the working device 60 performs work along the first line R1 coincides with or overlaps a starting portion of a unit work section (second unit work section) e2 in which the working device 60 performs work along the second line R2. The route creator may be defined by any of electrical or electric circuit components or circuitry, the controller or another controller configured or programmed to execute programs, or an external server. The above configuration allows the agricultural machine 1, by traveling along the travel route L, to efficiently perform work such that no unworked region Ed is generated between the first line R1 and the second line R2. Thus, the agricultural machine 1 also prevents or reduces the generation of the unworked region Ed both at the location where the auxiliary line Ha is created and the location where no auxiliary lines Ha are created.

The travel assistance system S for the agricultural machine 1 may further include a route creator 57e configured or programmed to define the plurality of lines R on the field F to create the travel route L. The route creator 57e may be configured or programmed to create the travel route L along which the agricultural machine 1 is to travel in the agricultural field G in a predetermined circumferential direction. A starting portion r2 of each of the plurality of lines R may be connected to an ending portion r1 of an adjacent one of the plurality of lines R included in the same loop of the travel route to obtain the travel route with a plurality of loops. The route creator may be defined by any of electrical or electric circuit components or circuitry, the controller or another controller configured or programmed to execute programs, or an external server. The above configuration achieves the following. There may be cases in which, when the agricultural machine 1 travels along one of the loops, an adjacent loop is a region where work has been done (worked region E2 such as a tilled area in which tillage has been done). In this regard, since the agricultural machine 1 travels along the corrected travel route L, it is possible to eliminate or reduce the likelihood that the agricultural machine 1 will enter the worked region E2 and damage the worked region E2, whereas, since the agricultural machine 1 travels along the auxiliary line Ha, it is possible to prevent or reduce the generation of the unworked region Ed.

The route creator 57e may be configured or programmed to create the travel route L such that the agricultural machine 1 travels inner loops of the plurality of loops first. With the above configuration, when the agricultural machine 1 travels on one of the loops, the adjacent inner loop is a region where work has been done. In this regard, since the agricultural machine 1 travels along the corrected travel route L, it is possible to eliminate or reduce the likelihood that the agricultural machine 1 will enter the worked region E2 and damage the worked region E2, whereas, since the agricultural machine 1 travels along the auxiliary line Ha, it is possible to prevent or reduce the generation of the unworked region Ed.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A travel assistance system for an agricultural machine, the travel assistance system comprising:
    a traveling device included in an agricultural machine to which a working device is attachable;
    a first acquirer configured or programmed to acquire a travel route to be traveled by the agricultural machine and created on a field representing an agricultural field;
    a corrector configured or programmed to correct the travel route acquired by the first acquirer; and
    a controller configured or programmed to control the traveling device based on the travel route corrected by the corrector; wherein
    the travel route includes a plurality of lines connected to each other;
    the corrector is configured or programmed to include a creator configured or programmed to create an auxiliary line extending from an ending portion of a first line of the plurality of lines to a starting portion of a second line of the plurality of lines connected to the ending portion of the first line, the auxiliary line being inclined relative to the second line;
    the first acquirer, the corrector, and the creator are defined by any of electrical or electric circuit components or circuitry, the controller or another controller configured or programmed to execute programs, or an external server; and
    the controller is configured or programmed to cause the agricultural machine to automatically travel along the auxiliary line.

2. The travel assistance system according to claim 1, further comprising a position detector to detect a position of the agricultural machine; wherein
    the controller is configured or programmed to include an automatic-travel controller configured or programmed to control steering and a vehicle speed of the traveling device based on the travel route corrected by the corrector and the position of the agricultural machine detected by the position detector.

3. The travel assistance system according to claim 1, further comprising a position detector to detect a position of the agricultural machine; wherein
    the controller is configured or programmed to include an automatic-steering controller configured or programmed to control steering of the traveling device based on the travel route corrected by the corrector and the position of the agricultural machine detected by the position detector.

4. The travel assistance system according to claim 1, wherein the creator is configured or programmed to create the auxiliary line such that the auxiliary line is at an acute angle to the second line.

5. The travel assistance system according to claim 4, wherein
    the creator is configured or programmed to create the auxiliary line such that a starting portion of the auxiliary line intersects the ending portion of the first line and extends straight from the ending portion of the first line and that an ending portion of the auxiliary line curves to extend along the starting portion of the second line; and the starting portion of the auxiliary line is at an acute angle to the second line, and the auxiliary line is inclined relative to the second line.

6. The travel assistance system according to claim 1, wherein the creator is configured or programmed to create the auxiliary line such that an angle between a starting portion of the auxiliary line and the second line is smaller than an angle between the first line and the second line.

7. The travel assistance system according to claim 1, wherein the creator is configured or programmed to create, when an angle between the first line and the second line is an obtuse angle, the auxiliary line that is inclined such that an angle between a starting portion of the auxiliary line and the second line is smaller than when the angle between the first line and the second line is an acute angle or a right angle.

8. The travel assistance system according to claim 1, further comprising:
a second acquirer configured or programmed to acquire specification information of the agricultural machine and/or the working device; and
a third acquirer configured or programmed to acquire information of the field; wherein
the corrector is configured or programmed to include a changer configured or programmed to shorten an ending portion of a corresponding one of the plurality of lines based on the specification information acquired by the second acquirer and the information of the field acquired by the third acquirer to prevent the agricultural machine from entering an off-limits area of the field, the off-limits area being an area where the agricultural machine is prohibited from entering;
the creator is configured or programmed to create the auxiliary line such that the auxiliary line extends from the ending portion of the first line shortened by the changer to the starting portion of the second line and is inclined relative to the second line; and
the second acquirer, the third acquirer, and the changer are defined by any of electrical or electric circuit components or circuitry, the controller or another controller configured or programmed to execute programs, or an external server.

9. The travel assistance system according to claim 8, further comprising:
a definer configured or programmed to define an imaginary first reference position in front of the agricultural machine based on the specification information acquired by the second acquirer; wherein
the third acquirer is configured or programmed to acquire position information of the off-limits area as the information of the field;
the changer is configured or programmed to shorten the ending portion of the corresponding one of the plurality of lines based on the position information of the off-limits area and the first reference position to prevent the first reference position from entering the off-limits area; and
the definer is defined by any of electrical or electric circuit components or circuitry, the controller or another controller configured or programmed to execute programs, or an external server.

10. The travel assistance system according to claim 9, wherein
the definer and the changer are configured or programmed such that, when an angle between the first line and the second line is an acute angle less than a predetermined angle:
the definer defines an imaginary second reference position in front of the first reference position; and
the changer shortens the ending portion of the corresponding one of the plurality of lines based on position information of the plurality of lines, the position information of the off-limits area, and the second reference position; and
an amount by which the corresponding one of the plurality of lines is shortened by the changer based on the second reference position is greater than an amount by which the corresponding one of the plurality of lines is shortened by the changer based on the first reference position.

11. The travel assistance system according to claim 8, wherein the creator is configured or programmed to, when an amount by which the corresponding one of the plurality of lines is shortened by the changer is equal to or more than a predetermined amount, create a plurality of the auxiliary lines which are adjacent to each other.

12. The travel assistance system according to claim 8, wherein the third acquirer is configured or programmed to acquire, as position information of the off-limits area of the information of the field, position information of a region other than the agricultural field and/or position information of a region of the agricultural field where the working device has performed work.

13. The travel assistance system according to claim 1, wherein the creator is configured or programmed to create the auxiliary line that is inclined such that a starting portion of the auxiliary line is perpendicular or substantially perpendicular to the ending portion of the first line, an intermediate portion of the auxiliary line curves toward the starting portion of the second line, and an ending portion of the auxiliary line curves to extend along the second line.

14. The travel assistance system according to claim 1, wherein the creator is configured or programmed to create the auxiliary line such that, when the agricultural machine is located at a starting portion of the auxiliary line, a working range of the working device and a starting portion of a unit work section in which the working device performs work along the second line overlap each other.

15. The travel assistance system according to claim 1, further comprising a route creator configured or programmed to:
define the plurality of lines on the field to create the travel route; and
create the first line and the second line such that an ending portion of a unit work section in which the working device performs work along the first line coincides with or overlaps a starting portion of a unit work section in which the working device performs work along the second line; wherein
the route creator is defined by any of electrical or electric circuit components or circuitry, the controller or another controller configured or programmed to execute programs, or an external server.

16. The travel assistance system according to claim 1, further comprising a route creator configured or programmed to:
define the plurality of lines on the field to create the travel route; and create the travel route along which the agricultural machine is to travel in the agricultural field in a predetermined circumferential direction; wherein a starting portion of each of the plurality of lines is connected to an ending portion of an adjacent one of the plurality of lines included in the same loop of the travel route to obtain the travel route with a plurality of loops; and the route creator is defined by any of electrical or electric circuit components or circuitry, the controller or another controller configured or programmed to execute programs, or an external server.

17. The travel assistance system according to claim 16, wherein the route creator is configured or programmed to create the travel route such that the agricultural machine travels inner loops of the plurality of loops first.

18. A travel assistance system for an agricultural machine, the travel assistance system comprising:

a first acquirer configured or programmed to acquire a travel route to be traveled by an agricultural machine to which a working device is attachable and created on a field representing an agricultural field;

a corrector configured or programmed to correct the travel route acquired by the first acquirer;

a display to display the travel route corrected by the corrector; and a controller configured or programmed to control travel of the agricultural machine based on the travel route corrected by the corrector; wherein the travel route includes a plurality of lines connected to each other;

the corrector is configured or programmed to include a creator configured or programmed to create an auxiliary line extending from an ending portion of a first line of the plurality of lines to a starting portion of a second line of the plurality of lines connected to the ending portion of the first line, the auxiliary line being inclined relative to the second line;

the first acquirer, the corrector, and the creator are defined by any of electrical or electric circuit components or circuitry, the controller or another controller configured or programmed to execute programs, or an external server; and the controller is configured or programmed to cause the agricultural machine to automatically travel along the auxiliary line.

\* \* \* \* \*